(12) United States Patent
Hayashi et al.

(10) Patent No.: US 7,223,490 B2
(45) Date of Patent: May 29, 2007

(54) FUEL CELL EMPLOYING LOCAL POWER GENERATION WHEN STARTING AT LOW TEMPERATURE

(75) Inventors: Katsumi Hayashi, Utsunomiya (JP); Hideo Kato, Utsunomiya (JP); Yosuke Fujii, Kawachi-gun (JP); Yasushi Kanai, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/116,603

(22) Filed: Apr. 4, 2002

(65) Prior Publication Data

US 2002/0146610 A1    Oct. 10, 2002

(30) Foreign Application Priority Data

Apr. 6, 2001 (JP) .............................. 2001-108330
Apr. 13, 2001 (JP) .............................. 2001-115382
Apr. 13, 2001 (JP) .............................. 2001-115383
Apr. 17, 2001 (JP) .............................. 2001-118195

(51) Int. Cl.
*H01M 8/10* (2006.01)
*H01M 8/12* (2006.01)

(52) U.S. Cl. ........................... 429/30; 429/38; 429/39; 429/26

(58) Field of Classification Search ............... 429/30, 429/34, 38, 39, 40, 24, 23, 22, 12, 26, 120
See application file for complete search history.

(56) References Cited

U.S. PATENT DOCUMENTS

| | | | | |
|---|---|---|---|---|
| 4,548,875 A | * | 10/1985 | Lance et al. ................... | 429/26 |
| 5,527,632 A | * | 6/1996 | Gardner ........................ | 429/27 |
| 5,607,785 A | * | 3/1997 | Tozawa et al. ................ | 429/33 |
| 6,103,410 A | * | 8/2000 | Fuller et al. ................... | 429/13 |
| 6,649,293 B1 | * | 11/2003 | Jones ............................ | 429/26 |
| 6,663,994 B1 | * | 12/2003 | Fly et al. ....................... | 429/30 |

FOREIGN PATENT DOCUMENTS

WO    WO 97/48142    12/1997

* cited by examiner

*Primary Examiner*—Raymond Alejandro
(74) *Attorney, Agent, or Firm*—Lahive & Cockfield, LLP; Anthony A. Laurentano, Esq.

(57) ABSTRACT

A fuel cell which can self-heat in a short time, in which no reaction gas is necessary for combustion, thereby improving the starting performance at low temperatures. The fuel cell comprises a cell structure in which an anode and a cathode are provided on either side of a solid polymer electrolyte membrane. This cell structure has a power generation plane and at least a part of the generation plane is defined as a local generation area so as to locally generate power. The fuel cell may include a pair of separators between which the cell structure is placed, and a reaction gas passage may be formed between the cell structure and each separator. One of a system for supplying a reaction gas to only a part of the reaction gas passage, and a system for supplying a reaction gas to the entire reaction gas passage is switchably selected.

8 Claims, 32 Drawing Sheets

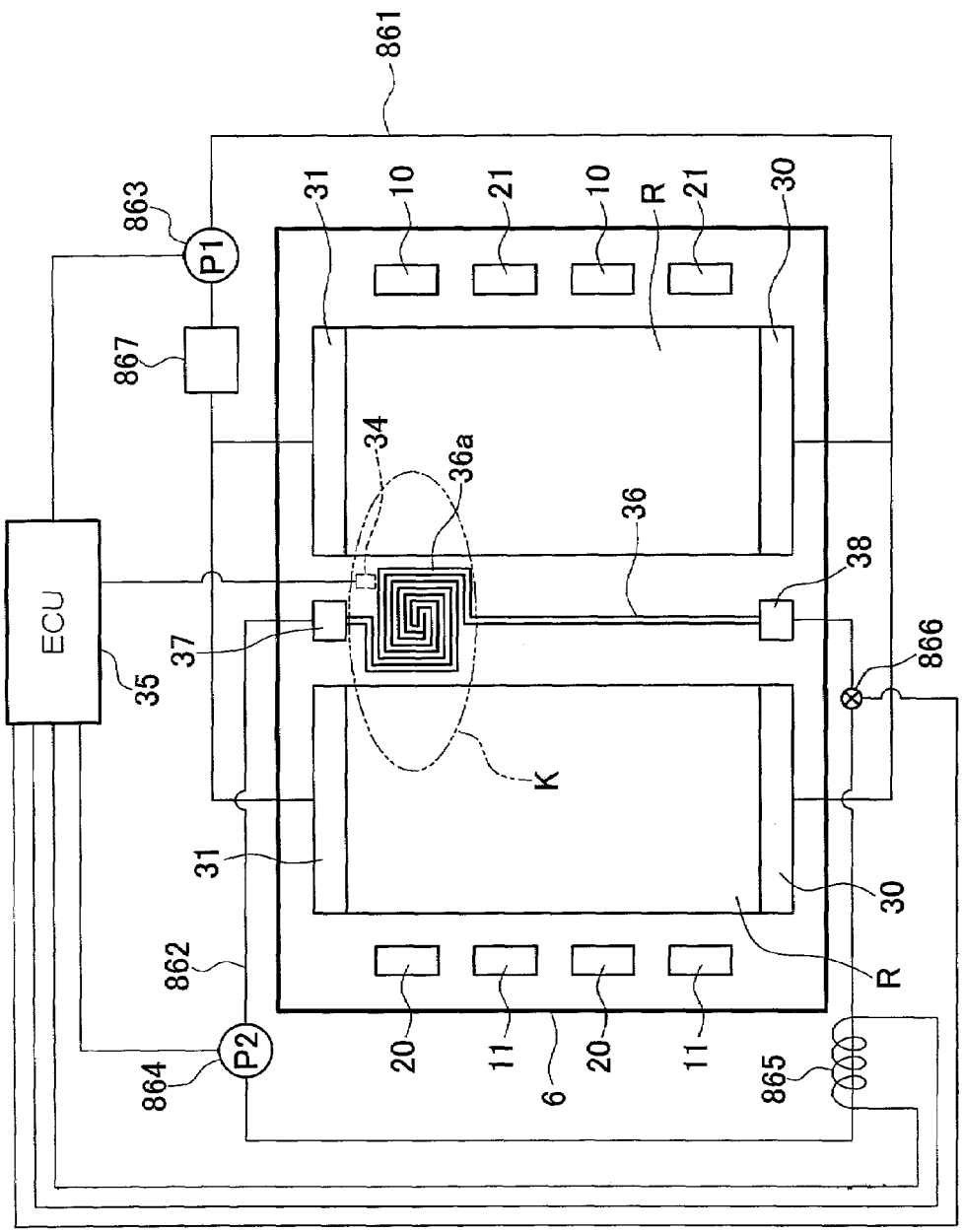

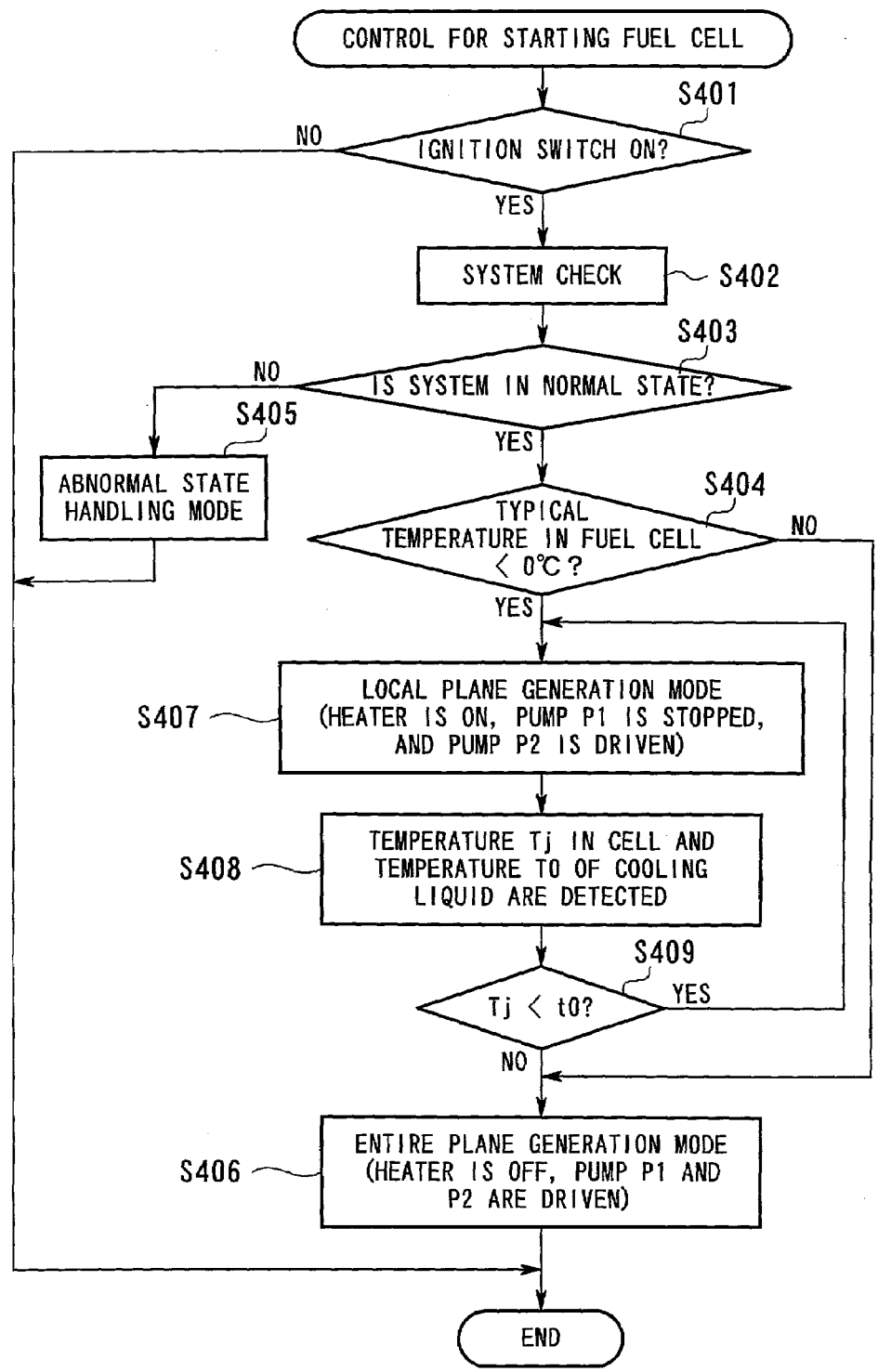

FUEL CELL EMPLOYING LOCAL POWER GENERATION WHEN STARTING AT LOW TEMPERATURE

BACKGROUND OF THE INVENTION

1. Field of the Invention

The present invention relates to a technique for activating a fuel cell in a low-temperature atmosphere.

2. Description of the Related Art

A typical example fuel cell has a membrane electrode assembly in which an anode and a cathode are provided on either side of a solid polymer electrolyte membrane. The membrane electrode assembly is placed between a pair of separators so as to support the membrane electrode assembly. In such a fuel cell, a fuel gas (e.g., hydrogen) is supplied to a power generation plane of the anode, while an oxidizing gas (e.g., air including oxygen) is supplied to a power generation plane of the cathode, so as to produce a chemical reaction. The electrons generated in the chemical reaction flow to an external circuit, providing DC (direct current) electrical energy. An oxidizing gas such as oxygen or air is supplied to the cathode, and the hydrogen gas, electrons, and oxygen gas react at the cathode, thereby generating water. Therefore, the fuel cell has less effect on the surrounding environment and thus has become the focus of attention as a driving source for vehicles.

Generally, the operating temperature of this kind of fuel cell is approximately 70 to 80° C. However, at low temperatures, the power generating efficiency is degraded; thus, it is difficult to obtain satisfactory starting performance at a low temperature. Accordingly, when such a fuel cell employed in a vehicle is activated in a low outer temperature (e.g., below the freezing point), the starting operation requires considerable time.

In order to solve this problem, Published Japanese Translation No. 2000-512068, of PCT International Publication No. WO97/48142, discloses a system in which electric power is supplied to an external load of a fuel cell so as to promote the reaction and increase the temperature due to self heating, thereby improving the starting performance.

On the other hand, U.S. Pat. No. 6,103,410 discloses a system in which a portion of hydrogen which functions as a reaction gas is mixed with air so as to produce a reaction by using a catalyst at the cathode and to generate heat of combustion, thereby improving the starting performance.

However, in the former method of using the self heating, if the temperature of the fuel cell to be started is below the freezing point, considerable time is necessary for self-heating the entire fuel cell which has a large heat capacity. In the latter method of burning a part of the hydrogen, extra hydrogen used in the starting operation is necessary in addition to hydrogen consumed in power generation; thus, a larger tank for storing hydrogen is necessary and the space for arranging peripheral components is limited.

In addition, the heat obtained by the self heating of the fuel cell may be insufficient for warming up the fuel cell at the start of the operation, and water generated in the fuel cell during the warming up may freeze in the fuel cell.

SUMMARY OF THE INVENTION

In consideration of the above circumstances, an object of the present invention is to provide a fuel cell which can self-heat in a short time, in which no reaction gas is necessary for combustion, thereby improving the starting performance at low temperatures.

Therefore, the present invention provides a fuel cell comprising:

a membrane electrode assembly (e.g., a membrane electrode assembly 5 in an embodiment explained below) in which an anode (e.g., an anode 2 in the embodiment explained below) and a cathode (e.g., a cathode 3 in the embodiment explained below) are provided on either side of a solid polymer electrolyte membrane (e.g., a solid polymer electrolyte membrane 4 in the embodiment explained below); wherein:

the membrane electrode assembly has a generation plane for outputting power and at least a part of the generation plane is defined as a local generation area (e.g., a local generation area K in the embodiment explained below) to which a reaction gas is supplied so as to locally generate power.

According to this structure, when the operation of the fuel cell is started at low temperatures, local power generation can be performed in a local area in the generation plane of the membrane electrode assembly, so that self heating can be concentratedly performed in the local area, thereby quickly increasing the temperature. A produced high-temperature portion expands over the entire generation plane, thereby increasing the fuel cell.

Therefore, in comparison with the case in which the entire power generation plane is heated and thus the heated is broadened, the time necessary for the starting the fuel cell can be reduced, thereby improving the starting performance of the fuel cell at low temperatures. If the fuel cell is heated by combusting a combustion gas, a large tank for storing the combustion gas is necessary. However, in the present invention, such a large tank is unnecessary and sufficient space for placing peripheral functional elements can be obtained.

Typically, one of an entire plane generation mode, in which the entire generation plane is used for generation, and a local plane generation mode, in which the local generation area is used for locally generating power, is switchably selected based on a temperature of the generation plane. Therefore, optimum operation control can be performed according to the temperature of the generation plane of the membrane electrode assembly, thereby always obtaining optimum output and performing suitable energy management.

The present invention also provides a fuel cell comprising:

a membrane electrode assembly in which an anode and a cathode are provided on either side of a solid polymer electrolyte membrane; and a pair of separators (e.g., separators 6 and 7 in an embodiment explained below) between which the membrane electrode assembly is placed, wherein the membrane electrode assembly is supported by the separators, wherein:

a reaction gas passage (e.g., a reaction gas passage C or A in the embodiment explained below) is formed between the membrane electrode assembly and each separator, wherein a starting-mode reaction gas passage system for supplying a reaction gas to a part of the reaction gas passage so as to locally generate power, and a normal-mode reaction gas passage system for supplying a reaction gas to the entire reaction gas passage so as to normally generate power are defined, and one of the starting-mode reaction gas passage system and the normal-mode reaction gas passage system is switchably selected.

According to this structure, if the starting-mode reaction gas passage system is used when the operation of the fuel cell is started at low temperatures, the reaction gas is concentratedly supplied to a part of the reaction gas passage which substantially has a shorter passage length, where the amount of the reaction gas supplied to the shorter passage is the same as that of the reaction gas supplied in the normal-mode reaction gas passage system.

Therefore, in comparison with the case in which the power generation using the entire generation plane is performed by supplying the reaction gas to the normal-mode reaction gas passage system and thus the heated is broadened, the time necessary for the starting the fuel cell can be reduced, thereby improving the starting performance.

In the case of using the starting-mode reaction gas passage system, the flow velocity in the reaction gas passage is increased because the shortened passage has lass resistance. According to the increase of the flow velocity, the draining efficiency of water generated in the fuel cell is improved, and the residence time of the cooling liquid is reduced, thereby avoiding refreezing of the generated water.

Accordingly, also in this structure, local power generation can be performed in a local area of the generation plane of the membrane electrode assembly; thus, self heating can be concentratedly performed in the local area, thereby quickly heating this area. Such a high-temperature portion expands over the entire generation plane, thereby increasing the temperature of the fuel cell.

Typically, one of the starting-mode reaction gas passage system and the normal-mode reaction gas passage system is switchably selected based on a temperature of the generation plane. For example, the starting-mode reaction gas passage system may be used while the temperature of the generation plane is a predetermined temperature (e.g., 0° C.) or below, and the system may be switched to the normal-mode reaction gas passage system when the temperature exceeds the predetermined temperature. Therefore, it is possible to always obtain optimum output and perform suitable energy management.

The present invention also provides a fuel cell comprising:

a cell (e.g., a call 500 in an embodiment explained below) in which an anode and a cathode are provided on either side of a solid polymer electrolyte membrane, and a reaction gas passage is formed at each outer side of the pair of the anode and the cathode, wherein:

the cell has a generation plane for outputting power, and a heating device (e.g., an electric heater 33 or 53, a catalyst 65, or an oxidizing and reducing agent 72 in the embodiment explained below) for locally heating the generation plane is provided at a part of the generation plane.

According to this structure, when the fuel cell is started at low temperatures, a part of the generation plane can be quickly heated. Therefore, the resistance of the ions which pass through this portion of the solid polymer electrolyte membrane can be reduced and the efficiency of power generation can be improved. Accordingly, self heating can be improved in the portion and the temperature of the portion can be quickly increased. This high-temperature portion then expands over the entire generation plane.

Typically, the heating device is an electric heater. In this case, the heating device can be driven by electrical energy.

The fuel cell may comprise a plurality of the cells which are stacked; and a stud bolt (e.g., a stud bolt 40A in the embodiment explained below) for fastening the stacked cells, wherein the electric heater (e.g., an electric heater 53 in an embodiment explained below) may be built in the stud bolt. In this structure, the vicinity of the stud bolt can be locally heated.

The heating device may be a catalytic combustor (e.g., a catalyst 65 in an embodiment explained below). In this case, when an oxidizing gas (e.g., oxygen or air) and a reducing gas (e.g., hydrogen) are supplied to the catalytic combustor, these gases quickly burn and thus a portion of the generation plane can be quickly heated. Therefore, the heating device can have a simple structure, and such quick heating can further improve the starting performance of the fuel cell at low temperatures.

The heating device may include an oxidizing and reducing agent (e.g., an oxidizing and reducing agent 72 in an embodiment explained below) which generates heat when being oxidized. Accordingly, a part of the generation plane can be quickly heated only by supplying an oxidizing gas (oxygen or air). Therefore, also in this case, the heating device can have a simple structure, and the starting performance of the fuel cell at low temperatures can be further improved.

The present invention also provides a fuel cell system comprising a fuel cell as explained above, and a controller for controlling the heating device according to a temperature in the fuel cell. Accordingly, the heating device can be driven only when the temperature of the fuel cell is low, so as to locally heat the generation plane of the cell, and while the temperature of the fuel cell is high, the heating device is not driven so that the local heating of the cell can be stopped, thereby reducing energy consumption.

The present invention also provides a fuel cell system comprising a fuel cell as explained above, and a controller for controlling the heating device according to an output voltage of the fuel cell. Accordingly, the heating device can be driven only when the output voltage of the fuel cell is low, so as to locally heat the generation plane of the cell, and while the output voltage of the fuel cell is high, the heating device is not driven so that the local heating of the cell can be stopped, thereby reducing energy consumption.

The present invention also provides a fuel cell system comprising a fuel cell as explained above, which includes a plurality of the cells which are stacked; and a controller for controlling the heating device according to a temperature of each cell. In this structure, the heating device can be driven or stopped in accordance with the temperature of each cell, thereby reducing energy consumption.

The present invention also provides a fuel cell system comprising a fuel cell as explained above, which includes a plurality of the cells which are stacked; and a controller for controlling the heating device according to an output voltage of each cell. In this structure, the heating device can be driven or stopped in accordance with the output voltage of each cell, thereby reducing energy consumption.

The present invention also provides a fuel cell system comprising a fuel cell as explained above, which includes a plurality of the cells which are stacked, and in at least one pair of the adjacent cells, the heating device is provided at a different position in the generation plane. According to this structure, when current flows between these cells, the current flows in a direction perpendicular to the stacking direction of the cells. Therefore, Joule heat is generated due to the electric resistance of the current passage, so that the fuel cell is further heated. Accordingly, quicker heating can be performed and the starting performance of the fuel cell at low temperatures can be further improved.

The present invention also provides a fuel cell system comprising a fuel cell as explained above; and a controller for controlling the heating device to generate a quantity of heat by which refreezing of generated water in the fuel cell is avoided. Accordingly, heating using the heating device can be effectively performed, and the blockage of the reaction gas passage due to the freezing of water generated in the fuel cell can be gradually released, thereby reducing the time necessary for starting the fuel cell.

The present invention also provides a fuel cell comprising:

a cell in which an anode and a cathode are provided on either side of a solid polymer electrolyte membrane, and a reaction gas passage is formed at each outer side of the pair of the anode and the cathode, and a first cooling liquid passage (e.g., a cooling liquid passage R in an embodiment explained below), separated from the reaction gas passage, is formed at a further outer side, wherein:

the cell has a generation plane for outputting power;

a second cooling liquid passage (e.g., a second cooling liquid passage 36 in the embodiment explained below), independent of the first cooling liquid passage, is formed on a part of the generation plane; and cooling liquid, heated by an external heating device (e.g., an electric heater 755 or 865 in the embodiment explained below) which is provided outside the cell, is suppliable to the second cooling liquid passage.

According to this structure, when the operation of the fuel cell is started at low temperatures, heated cooling liquid can be supplied to the second cooling liquid passage, thereby quickly heating a part of the generation plane. Therefore, the resistance of the ions which pass through this portion of the solid polymer electrolyte membrane can be reduced and the efficiency of power generation can be improved. Accordingly, self heating can be improved in the portion and the temperature of the portion can be quickly increased. This high-temperature portion then expands over the entire generation plane. Therefore, the time necessary for starting the fuel cell can be reduced.

The present invention also provides a fuel cell system comprising a fuel cell as claimed above; and a controller for determining whether the heated cooling liquid is supplied to the second cooling liquid passage.

This fuel cell system may further comprise:

a first cooling liquid circuit (e.g., a first cooling liquid circuit 751 in the embodiment explained below) to which the first cooling liquid passage is connected;

a second cooling liquid circuit (e.g., cooling liquid passages 753 and 754 in the embodiment explained below) which has said heating device (e.g., the electric heater 755) for heating the cooling liquid, wherein the second cooling liquid passage is connected via the second cooling liquid circuit to the first cooling liquid circuit in parallel to the first cooling liquid passage; and a passage switching section (e.g., control valves V1 and V2 in the embodiment explained below) for permitting or prohibiting communication of the cooling liquid through the first cooling liquid passage.

According to this structure, when the communication of the cooling liquid through the first cooling liquid passage is prohibited by the passage switching section, the cooling liquid of the first cooling liquid circuit can be made to flow only through the second cooling liquid passage via the second cooling liquid circuit. In addition, this cooling liquid supplied to the second cooling liquid passage can be heated by the heating device provided at the second cooling liquid circuit. On the other hand, when the communication of the cooling liquid through the first cooling liquid passage is permitted by the passage switching section, the cooling liquid through the first cooling liquid circuit can be made to flow through the first cooling liquid passage. Therefore, a common device such as a pump can be used for supplying heated cooling liquid to the first or second cooling liquid passage, thereby reducing the number of necessary parts and suppressing the cost.

Typically, the passage switching section is controlled according to a temperature in the fuel cell. Accordingly, when the temperature of the fuel cell is lower than a predetermined temperature, the communication of the cooling liquid through the first cooling liquid passage can be prohibited by the passage switching section, and when the temperature of the fuel cell is equal to or above the predetermined temperature, the communication of the cooling liquid through the first cooling liquid passage can be permitted by the passage switching section. Therefore, it is possible to easily perform switching between the entire plane generation and the local plane generation.

Instead of providing the second cooling liquid circuit and the passage switching section, the fuel cell system may comprise:

a first cooling liquid circuit (e.g., a first cooling liquid circuit 861 in an embodiment explained below) to which the first cooling liquid passage is connected;

a third cooling liquid circuit (e.g., a third cooling liquid circuit 862 in the embodiment explained below) to which the second cooling liquid passage is connected, wherein the third cooling liquid circuit has said heating device (e.g., an electric heater 865 in the embodiment explained below) for heating the cooling liquid and is independent of the first cooling liquid circuit. Accordingly, the amount of the cooling liquid maintained in the third cooling liquid circuit can be small; thus, the cooling liquid can be rapidly heated, thereby quickly heating the fuel cell.

The present invention also provides a fuel cell system comprising a fuel cell as explained above; and a controller for controlling the heating device to generate a quantity of heat by which refreezing of generated water in the fuel cell is avoided. Accordingly, heating using the heating device can be effectively performed, and the blockage of the reaction gas passage due to the freezing of water generated in the fuel cell can be gradually released, thereby reducing the time necessary for starting the fuel cell.

The present invention also provides a fuel cell comprising:

a membrane electrode assembly in which an anode and a cathode are provided on either side of a solid polymer electrolyte membrane, wherein:

the membrane electrode assembly has a generation plane for outputting power and at least a part of the generation plane is defined as a local generation area to which a reaction gas is supplied so as to locally generate power; and the local generation area is defined as a starting-mode power output area (e.g., a starting-mode power output area D in an embodiment explained below), and power is output from only the starting-mode power output area in the local plane generation mode. Accordingly, power is concentratedly output from the starting-mode power output area which is defined in a local area of the generation plane. Therefore, this power output area is concentratedly self-heated and the temperature of the portion is quickly increased.

BRIEF DESCRIPTION OF THE DRAWINGS

FIG. 37 is a plan view showing a separator at the anode of the fuel cell in the fourteenth embodiment according to the present invention.

FIG. 38 is a flowchart showing an example of the control operation for starting the fuel cell in the fourteenth embodiment.

DESCRIPTION OF THE PREFERRED EMBODIMENTS

Hereinafter, embodiments according to the present invention will be explained with reference to the drawings.

First, an embodiment showing a basic structure of the present invention will be explained with reference to FIGS. 1 and 2.

Figure 2:
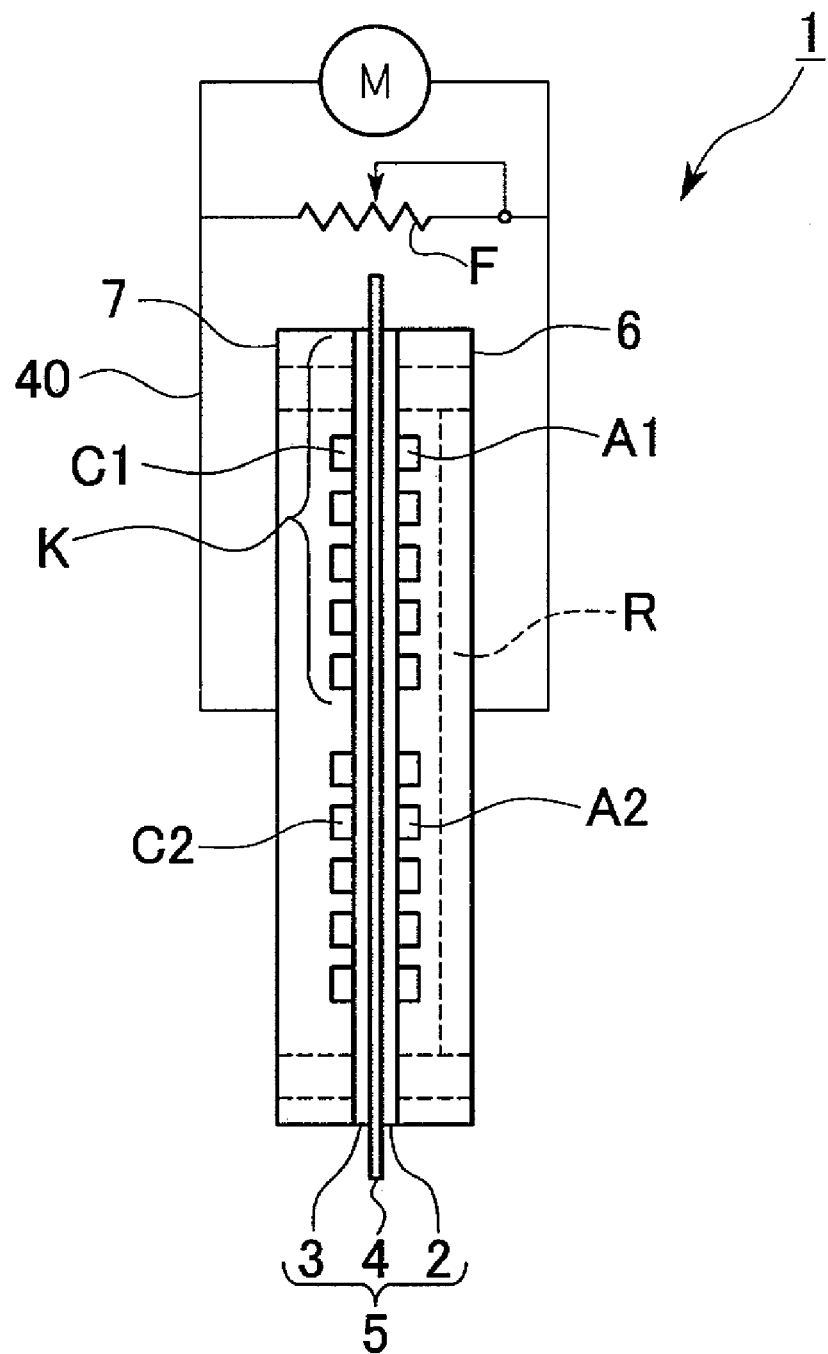
FIG. 2 is a sectional view along line A-A in FIG. 1.

As shown in FIG. 2, a fuel cell 1 has a membrane electrode assembly 5 in which an anode 2 and a cathode 3 are provided on either side of a solid polymer electrolyte membrane 4. Each membrane electrode assembly 5 is placed between a separator 6 at the anode 2 and a separator 7 at the cathode 3 so as to support the membrane electrode assembly 5. Plural membrane electrode assemblys 5 are stacked to obtain, for example, a fuel cell stack for vehicles. The stacked structure is fastened using stud bolts or the like. In this embodiment, a unit fuel cell having a pair of separators 6 and 7 between which the membrane electrode assembly 5 is placed will be explained for convenience.

The solid polymer electrolyte membrane 4 is made of, for example, a perfluorosulfonic acid polymer. The main constituent of anode 2 and cathode 3 is platinum (Pt), which is placed on a diffusion layer made of a porous carbon cloth or paper. The separators 6 and 7 are made of compacted carbon or metal. Electric power is output via the separators 6 and 7.

Figure 1:
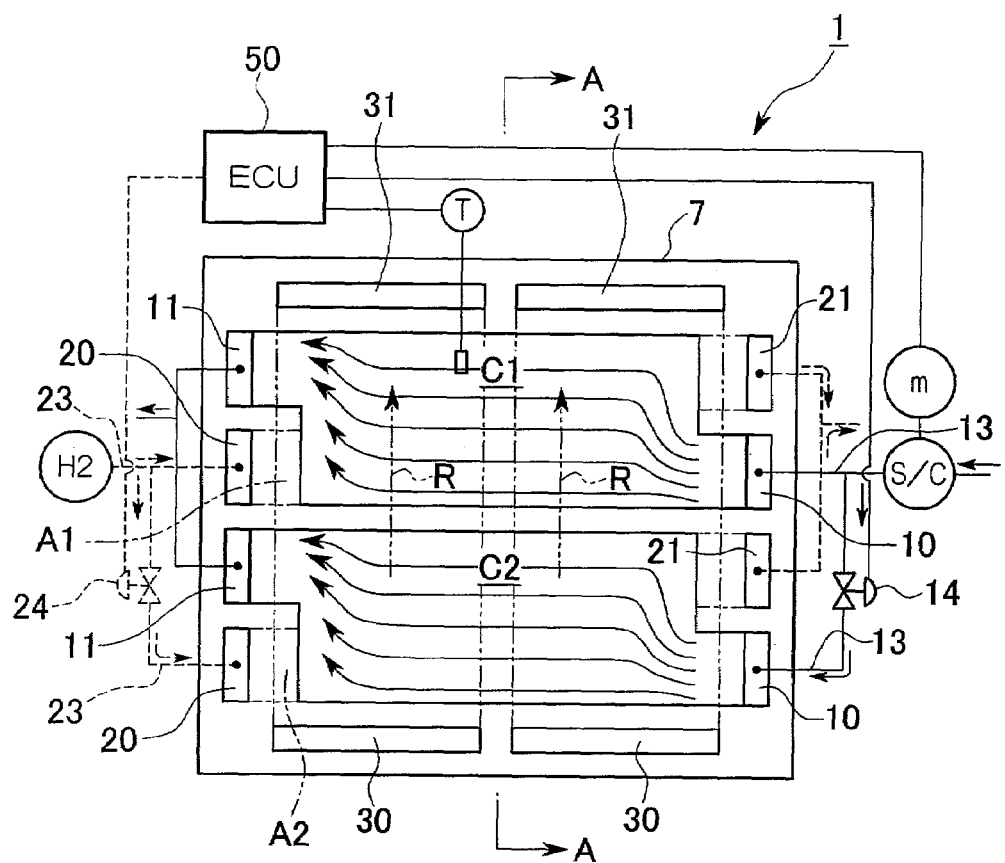
FIG. 1 is a plan view showing the structure of the basic embodiment according to the present invention.

FIG. 1 is a plan view showing the separator 7 observed from the side which faces the membrane electrode assembly 5. This separator 7 at the cathode comprises an upper reaction gas passage C1 and a lower reaction gas passage C2, that is, the reaction gas passage is divided into an upper half (i.e., C1) and a lower half (i.e., C2). If the separator is made of compacted carbon, a plurality of grooves function as the reaction gas passage, whereas if the separator is made of metal, a plurality of grooves formed by press molding or a passage formed between sealing materials functions as the reaction gas passage. In addition, the forms of the reaction gas passages C1 and C2 are not limited, that is, the reaction gas passages C1 and C2 may be formed in a zigzag, or they may be U-shaped. For convenience of explanation, the reaction gas passages of the separator 6 at the anode are also shown in FIG. 1 by chain lines.

The upper reaction gas passage C1 of the separator 7 at the cathode starts from an oxidizing gas inlet communication hole 10, which is provided at the right side of the separator 7 and at a lower position in the area assigned to C1, and ends at an oxidizing gas outlet communication hole 11, which is provided at the left side of the separator 7 and in a diagonal direction with respect to the inlet communication hole 10.

The lower half of the separator 7 at the cathode also has the reaction gas passage C2 having a structure similar to that of C1, the inlet oxidizing gas communication hole 10, and the oxidizing gas outlet communication hole 11.

The oxidizing gas inlet communication hole 10 is connected to a supercharger S/C via a supply passage 13; thus, air as an oxidizing gas is supplied to the oxidizing gas inlet communication hole 10 from the supercharger S/C which is driven by a motor "m". Here, a valve 14 for shutting off the air supply is attached to the supply passage 13 connected to the lower reaction gas passage C2.

On the other hand, the separator 6 at the anode comprises an upper reaction gas passage A1 and a lower reaction gas passage A2, that is, the reaction gas passage is divided into the upper half (i.e., A1) and the lower half (i.e., A2) which respectively correspond the above-explained reaction gas passages C1 and C2. More specifically, the upper reaction gas passage A1 of the separator 6 at the anode starts from a fuel gas inlet communication hole 20, which is provided at the left side of the separator 6 and at a lower position in the area assigned to A1, and ends at a fuel gas outlet communication hole 21, which is provided at the right side of the separator 6 and in a diagonal direction with respect to the inlet communication hole 20. The lower half of the separator 6 also has the reaction gas passage A2 having a structure similar to that of A1, the fuel gas inlet communication hole 20, and the fuel gas outlet communication hole 21. Accordingly, the reaction gas passage C1 and A1 have a crossing positional relationship, and the reaction gas passage C2 and A2 also have a crossing positional relationship.

The fuel gas inlet communication hole 20 is connected to a hydrogen tank H2 via a supply passage 23, and a valve 24 for shutting off the hydrogen gas supply is attached to the supply passage 23 connected to the lower reaction gas passage A2. Instead of the hydrogen tank, a methanol tank having a methanol gas reformer may be used.

A pair of cooling liquid inlet communication holes 30 and 30 are formed in the vicinity of the lower sides of the separator 6 (at the anode) and the separator 7 (at the cathode). Similarly, a pair of cooling liquid outlet communication holes 31 and 31 are formed in the vicinity of the upper sides of the separators 6 and 7. In addition, a cooling liquid passage R for connecting the inlet and outlet communication holes 30 and 31 (which face each other) and cooling the fuel cell, is formed in the separator 7 at the anode. The cooling liquid passages R are connected to piping for the cooling liquid (not shown). The cooling liquid may be pure water, ethylene glycol, oil or the like.

FIG. 2 is a sectional view along line A-A in FIG. 1. As shown in FIG. 2, a closed circuit 40 for outputting power of the fuel cell 1 is formed via terminals (not shown) connected to the above-explained separator 7 (at the cathode) and separator 6 (at the anode). The motor M used for driving the vehicle and an external load F (which includes an electric heater explained below) are driven by the power output from the fuel cell 1.

In FIG. 1, reference numeral 50 indicates an ECU (electric control unit) connected to the hydrogen tank H2, the motor m provided for the supercharger S/C, the valve 24 attached to the supply passage 23 which is connected to the hydrogen tank H2, the valve 14 attached to the supply passage 13 which is connected to the supercharger S/C, and a temperature sensor T in the fuel cell 1.

In each power generation plane of the cathode 3 and the anode 2, the area corresponding to the upper half of the separator (7 or 6) functions as a local generation area K, and the upper reaction gas passages C1 and A1 of the separators 7 and 6 of the cathode 3 and anode 2 function as starting-mode reaction gas passages (i.e., used when the operation of the fuel cell is started).

Below, the functions of this basic embodiment will be explained.

In a lower-temperature atmosphere in which the outside air temperature is, for example, below the freezing point (e.g., −10° C.), water, which is generated in the fuel cell 1 and which cannot be removed at the system stop, tends to freeze in a portion of the grooves of the reaction gas passages C1, C2, A1, and A2.

Therefore, when the operation of the fuel cell 1 is started, if it is determined by the ECU 50 that the temperature of the fuel cell 1 is equal to or below a predetermined temperature (e.g., 0° C.) based on the detected temperature by the temperature sensor T, then the valves 14 and 24 are closed. Here, the above temperature of the fuel cell 1 is actually the temperature of the cooling liquid or the separator. According to the above control of closing the valves, the oxidizing gas and the fuel gas are supplied to only the upper reaction gas passages C1 and A1 which belong to the upper half of the separators 6 and 7.

Under these conditions, various auxiliary machines are activated by a dedicated battery (not shown) for the auxiliary machines, and the supercharger S/C is activated by a capacitor (not shown; a battery may be used instead), so that air is supplied from the supercharger S/C via the supply passage 13 and hydrogen is supplied from the hydrogen tank H2 via the supply passage 23. Accordingly, a predetermined amount of air and hydrogen (i.e., corresponding to the flow rate, not assigned to the local-plane generation, but assigned to the entire plane generation) is concentratedly supplied to the upper reaction gas passages C1 and A1 which function as the starting-mode reaction gas passages. Therefore, each reaction gas (i.e., air or hydrogen) flows through the communicable reaction gas passage (among all the reaction gas passages), thereby locally generating power. In this process, the electrical energy is extracted via the external load F which includes the supercharger S/C; thus, only the upper half of the power generation planes self-heats due to the reaction. Accordingly, the blockage of the reaction gas passages C1 and A1 due to the freezing of the generated water (which was generated in the fuel cell 1) can be effectively released.

In the portion where the local generation is performed, more generated water is generated. Therefore, the self heating should be performed while the freezing of the newly-generated water is avoided. Accordingly, the following relationship must be satisfied:

$$\text{(quantity of heat for avoiding freezing of generated water+quantity of discharged heat)<quantity of reaction heat (i.e., quantity of self heating)} \quad \text{formula (1)}$$

When the quantity of reaction heat (i.e., self heating) for satisfying the above relationship is generated, the temperature of the local generation area K can exceed a predetermined temperature (e.g., 0° C.) before the operation of the fuel cell 1 stops due to decrease of the voltage which is caused by the freezing of the generated water. Therefore, even if the remaining area (other than the local generation area) is equal to or below the predetermined temperature (e.g., 0° C.), the generation of the fuel cell 1 can be maintained.

Figure 3:
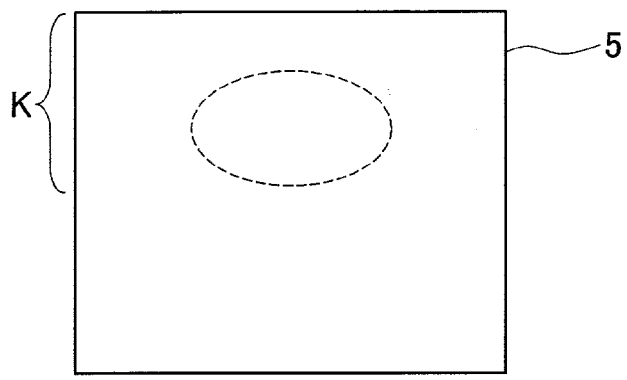
FIG. 3 is a diagram for explaining the expansion of the high-temperature portion.
Figure 4:
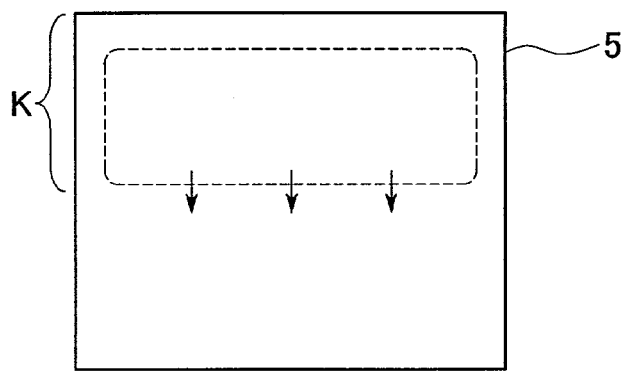
FIG. 4 is also a diagram for explaining the expansion of the high-temperature portion.
Figure 5:
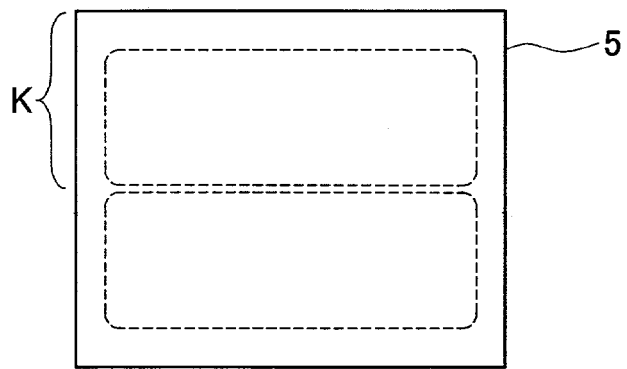
FIG. 5 is also a diagram for explaining the expansion of the high-temperature portion.

The supply of each reaction gas is concentrated to the local generation area K (i.e., ½ the area of the entire generation plane); thus, the amount of the reaction gas supplied to the upper reaction gas passages C1 and A1 is increased (i.e., twice the amount in the entire-plane generation) and the self heating is further concentratedly performed. For example, the temperature of a part of the generation plane (see the area surrounded by a dashed line in FIG. 3) is quickly increased, thereby producing a high-temperature portion. Once such a high-temperature portion is produced, the high-temperature portion gradually expands due to the heat conduction, so that the frozen generated water is further released and the function of the reaction gas passages C1 and A1 is gradually recovered. This high-temperature portion expands over the upper half (see the area surrounded by a dashed line in FIG. 4), and then towards the lower half, so that finally the entire power generation plane of the fuel cell 1 is in the high-temperature portion (see the area surrounded by a dashed line in FIG. 5).

When the temperature of the fuel cell 1, detected by the temperature sensor T, reaches a predetermined temperature (e.g., 5° C.), the ECU 50 determines that the local generation operation of the fuel cell 1 should be terminated, and the ECU 50 opens the valves 14 and 24. Accordingly, hydrogen and air are supplied from the supply passages 13 and 23 to both the upper reaction gas passages C1 and A1 and the lower reaction gas passages C2 and A2, thereby switching the operation mode from the local plane generation to the entire plane generation. That is, the reaction gases are supplied to all the reaction gas passages C1, A1, C2, and A2 of the fuel cell 1, so that rated output power can be obtained from the fuel cell 1 which has been transferred from the local plane generation.

As explained above, the local plane generation (i.e., the operation of the fuel cell 1 for performing local plane generation) and the entire plane generation (i.e., the operation of the fuel cell 1 for performing entire plane generation) can be switched by the control of the ECU 50 according to the temperature of the power generation plane of the membrane electrode assembly 5, thereby performing operation control suitable for the temperature of the power generation plane of the membrane electrode assembly 5. Therefore, optimum power can always be obtained, and preferable energy management can be realized.

According to the above basic embodiment, a predetermined amount of the reaction gases supplied from the supercharger S/C and the hydrogen tank H2 are concentratedly supplied to the upper reaction gas passages C1 and A1, which function as starting-mode reaction gas passages, so as to perform local power generation. Therefore, the self heating is also concentratedly performed in the target area to which a larger amount of the reaction gas is supplied. The temperature of the target area quickly increases, and such high-temperature portion expands over the entire power generation plane, thereby increasing the temperature of the fuel cell 1. If the reaction gases are supplied to all the reaction gas passages since the starting of the fuel cell 1 and the entire power generation plane is used, the heated portion is broadened. In comparison with this operation, in the present embodiment, the self-heated portion can be concentrated so that the time necessary for staring the fuel cell can be reduced and the starting performance can be improved.

Even with the local plane generation, electric power necessary for the supercharger S/C or the other auxiliary machines can be acquired; thus, no problem occurs in the energy management for the starting of the fuel cell. In addition, a predetermined amount of the reaction gas flows through each of the starting-mode reaction gas passages C1 and A1; thus, the flow velocity in the reaction gas passage increases and the remaining generated water in the passage can be quickly drained. Furthermore, the concentrated power generation can minimize the quantity of the discharged heat, so that the quantity of heat can be increased and the fuel cell can be warmed in a short time.

First Embodiment

The first embodiment based on the above basic embodiment will be explained with reference to FIG. 6.

Figure 6:
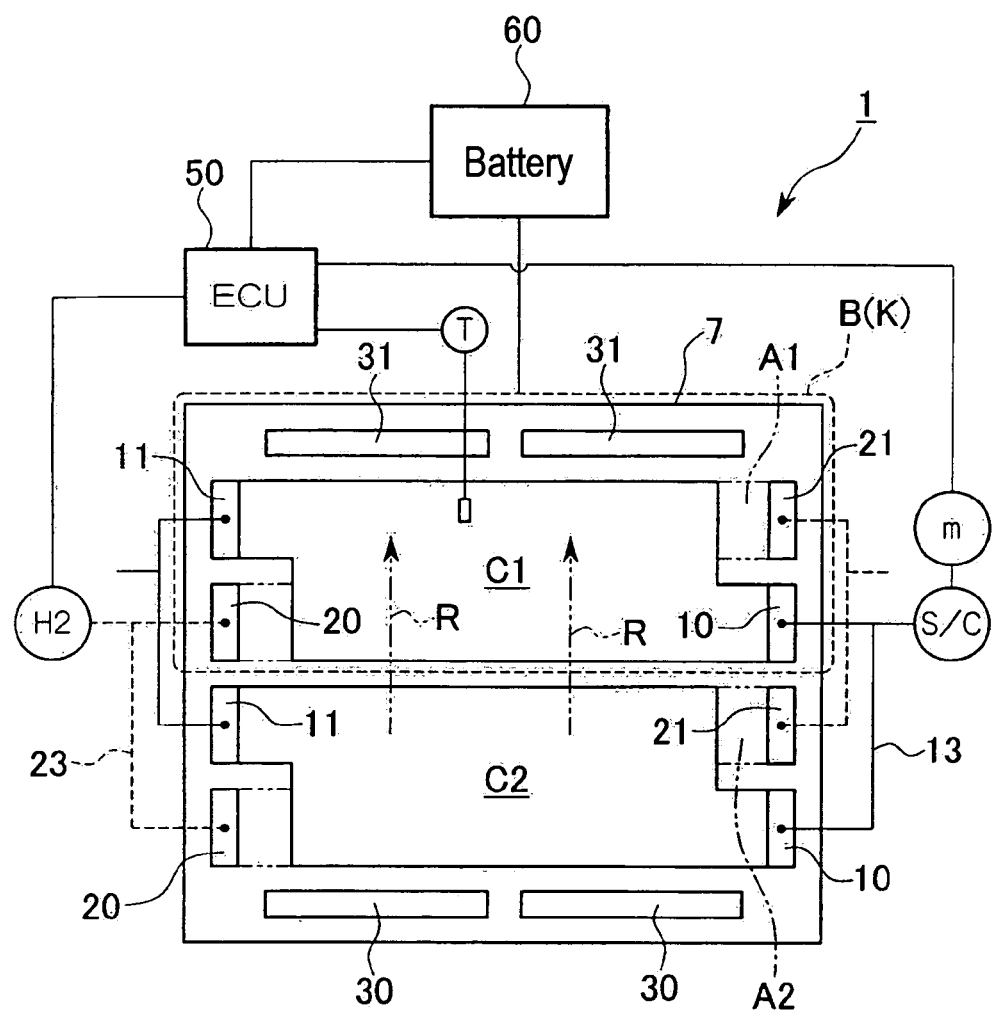
FIG. 6 is a plan view showing the structure of the first embodiment (based on the basic embodiment) according to the present invention.

FIG. 6 is a plan view showing the separator 7 at the cathode, observed from the side which faces the membrane electrode assembly. Similar to the above embodiment, the separator 7 also has the upper and lower reaction gas passages C1 and C2, which respectively correspond to the upper and lower reaction gas passages A1 and A2 formed in the separator at the anode (not shown in FIG. 6). Here, the parts identical to those in the above-explained FIG. 2 are given identical reference numerals.

The upper half of each power generation plane where the upper reaction gas passages C1 and A1 are formed is defined as a partially heated area B indicated by a dashed line, which thus functions as a local generation area K. An electric heater (i.e., heating device not shown) such as a thin film heater is provided in an area corresponding to the partially heated area B. Here, power is supplied from a power source (i.e., battery 60) to the electric heater; however, power may be supplied from the output power of the fuel cell.

In addition, a warm air blower for blowing warm air may be used instead of the electric heater.

Each oxidizing gas inlet communication hole 10, having a structure similar to that in the basic embodiment, is connected via the supply passage 13 to the supercharger S/C, so that air as the oxidizing gas is equally supplied to the reaction gas passages C1 and C2 from the supercharger S/C which is driven by the motor "m". On the other hand, each fuel gas inlet communication hole 20 is connected via the supply passage 23 to the hydrogen tank H2, and the hydrogen gas from the tank H2 is supplied to the upper and lower reaction gas passages A1 and A2.

The hydrogen tank H2, the motor m of the supercharger S/C, the battery 60, and the temperature sensor T for measuring the temperature of the fuel cell 1 are connected to the ECU 50.

The function of the first embodiment will be explained below.

When the operation of the fuel cell 1 is started, if it is detected that the temperature of the fuel cell 1 is equal to or below a predetermined temperature (e.g., 0° C.) base on the detected result of the temperature sensor T, the ECU 50 switches the electric heater on, so that the upper half of the fuel cell 1 is heated. Under these conditions, the auxiliary machines are activated using a battery for these machines, and air is supplied from the supercharger S/C via the supply passage 13 to the reaction gas passages C1 and C2, while hydrogen is supplied from the hydrogen tank H2 via the supply passage 23 to the reaction gas passages A1 and A2.

According to the concentrated heating of the upper portion by using the electric heater, the target portion of the solid polymer electrolyte membrane is heated, and simultaneously, the catalyst of the anode and the cathode is activated, thereby improving the power generation efficiency. Therefore, local generation is quickly performed in the partially heated area B. According to the quick generation, self heating due to the reaction is promoted, so that the target area is quickly heated by the heating using the electric heater and the self heating. This high-temperature portion then expands over the entire power generation plane, so that the temperature of the entire fuel cell 1 is increased.

In the portion where the local generation is performed, more generated water is generated after the generation starts. Therefore, the self heating should be performed while the heating using the electric heater is performed and freezing of the newly-generated water is avoided. Accordingly, the following relationship must be satisfied:

(quantity of heat for avoiding freezing of generated water+quantity of discharged heat)<(quantity of reaction heat (i.e., quantity of self heating)+ quantity of heating using the heater)    formula (2)

When the temperature detected by the temperature sensor T reaches a predetermined temperature (e.g., 5° C.), the ECU 50 determines that the local generation should be terminated and stops the electric heater, so that the local plane generation is switched to the entire plane generation. Accordingly, the entire plane power generation without using the electric heater is performed, and rated power can be output from the fuel cell 1.

In addition to the effects obtained by the basic embodiment, in the first embodiment, self heating of the fuel cell 1 can be assisted using the electric heater and the temperature of the partially heated area B can be quickly increased. This high-temperature portion expands over the entire power generation plane, thereby efficiently increasing the temperature of the fuel cell 1. Therefore, in comparison with the case in which the entire power generation plane is heated, a concentrated self-heated portion is obtained and thus the time necessary for the starting the fuel cell can be reduced, thereby improving the starting performance. In particular, the quantity of heating using the electric heater can be controlled so as to prevent the freezing of the newly-generated water, thereby performing effective heating. Therefore, the blockage of the reaction gas passages due to the freezing of the generated water can be gradually released and the time for starting the fuel cell can be reduced.

Second Embodiment

The second embodiment based on the basic embodiment will be explained with reference to FIGS. 7 and 8.

Figure 7:
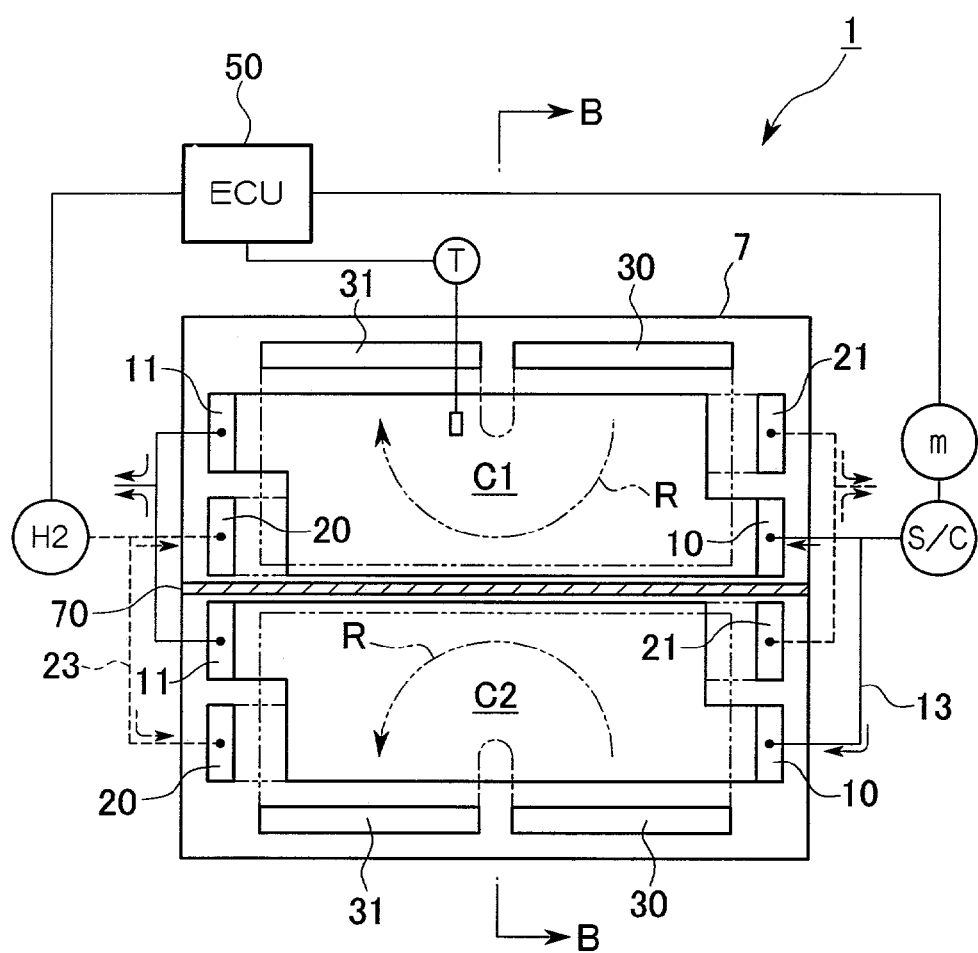
FIG. 7 is a plan view showing the structure of the second embodiment according to the present invention.

FIG. 7 is a plan view showing the separator 7 at the cathode, observed from the side which faces to the membrane electrode assembly 5.

In this embodiment, each of the separator 7 at the cathode and the separator 6 at the anode is divided into an upper half and a lower half via an insulating material 70, and thus the upper half and the lower half are electrically insulated. Therefore, power can be independently output from the upper half, that is, the upper half functions as a starting-mode power output area D.

As shown by FIG. 7, the separator 7 at the cathode in the present embodiment also comprises upper and lower reaction gas passages C1 and C2 assigned to the upper and lower halves, where the reaction gas passages C1 and C2 respectively correspond to reaction gas passages A1 and A2 which are formed in the upper and lower halves of the separator 6 at the anode. In FIG. 7, parts identical to those in the basic embodiment are given identical reference numerals.

The upper half of each power generation plane, where the upper reaction gas passages C1 and A1 are provided, is defined as the starting-mode power output area D (i.e., local generation area K).

Figure 8:
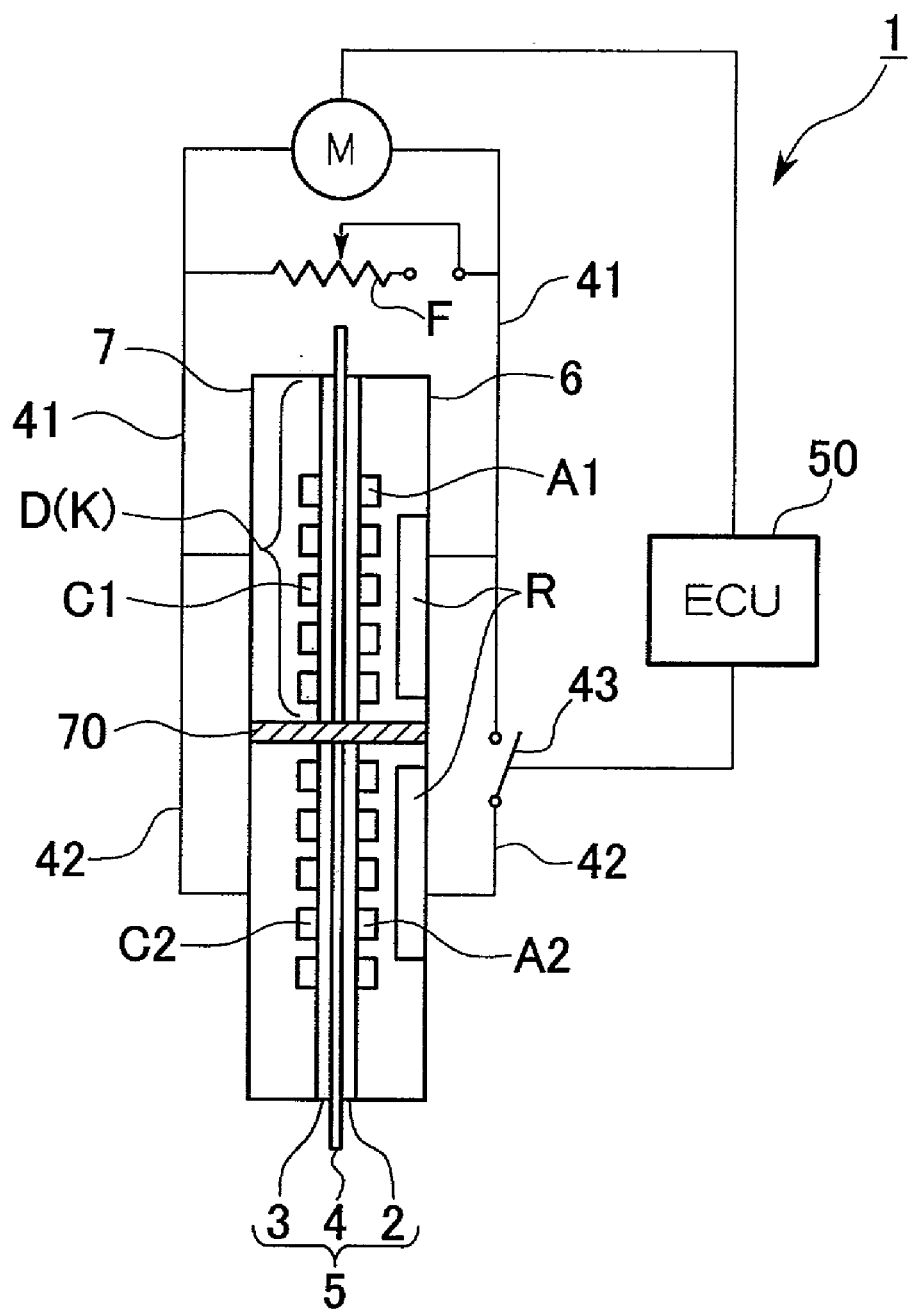
FIG. 8 is a sectional view along line B-B in FIG. 7.

FIG. 8 is a sectional view along line B-B in FIG. 7. As shown in FIG. 8, closed circuits 41 and 42 for outputting power from the fuel cell 1 are formed by attaching terminals (not shown) to the upper and lower halves of the separators 7 and 6. The output power from the fuel cell 1 is supplied to the driving motor M and the battery for the auxiliary machines, and used for driving the external load F which includes the motor "m" for supercharger S/C. A switch 43 is inserted in the closed circuit 42 at the lower half side.

Each oxidizing gas inlet communication hole 10, having a structure similar to that in the basic embodiment, is connected via the supply passage 13 to the supercharger S/C, so that air as the oxidizing gas is equally supplied to the reaction gas passages C1 and C2 from the supercharger S/C which is driven by the motor m. On the other hand, each fuel gas inlet communication hole 20 is connected via the supply passage 23 to the hydrogen tank H2, and the hydrogen gas from the tank H2 is supplied to the upper and lower reaction gas passages A1 and A2.

The hydrogen tank H2, the motor m of the supercharger S/C, the battery 60, the temperature sensor T for measuring the temperature of the fuel cell 1, and the switch 43 in the lower half portion are connected to the ECU 50.

A cooling liquid inlet communication hole 30 and a cooling liquid outlet communication hole 31 which communicates with the inlet communication hole 30 are formed in the vicinity of each lower side of the separators 6 and 7, and a U-shaped cooling liquid passage R is formed in the lower half of the separator 6 at the anode. Also in the vicinity of each upper end of the separators 6 and 7, a cooling liquid inlet communication hole 30 and a cooling liquid outlet communication hole 31 which communicates with the inlet communication hole 30 are formed, and a U-shaped cooling liquid passage R is formed in the upper half of the separator 6 at the anode. That is, the separators 6 and 7 are divided into upper and lower halves by the insulating material 70 as explained above; thus, the communicable cooling liquid passages R are respectively and independently formed in the upper and lower halves. Each cooling liquid passage R is connected to piping (not shown) for the cooling liquid.

The function of the second embodiment will be explained below.

When the fuel cell 1 is started, if it is detected that the temperature of the fuel cell 1 is equal to or lower than a predetermined temperature (e.g., 0° C.), the switch 43 is switched off by the ECU 50, so that the closed circuit 42 at the lower halves of the separators 6 and 7 is shut off and the power output is performed only via the closed circuit 41 at the upper halves of the separators 6 and 7.

Under these conditions, the auxiliary machines are activated by the dedicated battery, and air is supplied from the supercharger S/C via the supply passage 13 to the reaction gas passages C1 and C2, while hydrogen is supplied from the hydrogen tank H2 via the supply passage 23 to the reaction gas passages A1 and A2.

As the closed circuit 42 is shut off, power is not output from the lower halves of the separators 6 and 7, that is, power generation is not performed in the lower area. In contrast, in the upper halves of the separators 6 and 7, power is output while the reaction gases are supplied; thus, in the upper area, the resistance of the ions which pass through the solid polymer electrolyte membrane 4 is large even in a low-temperature atmosphere, and self heating is concentratedly performed. That is, dispersion of the self heating, which is observed in the entire plane power generation, can be avoided and the self heating can be concentratedly performed in the upper half of each separator. Accordingly, the blockage of the reaction gas passages due to the frozen generated water can be efficiently released.

Similar to the above embodiments, in the portion where the local generation is performed, more generated water is generated. Therefore, the self heating should be performed while the freezing of the newly-generated water is avoided. Accordingly, the following relationship must be satisfied:

(quantity of heat for avoiding freezing of generated water+quantity of discharged heat)<quantity of reaction heat (i.e., quantity of self heating)  formula (3)

Therefore, the self heating is further concentratedly performed, and the temperature of the upper half is quickly increased, thereby producing a high-temperature portion. Once such a high-temperature portion is produced, the high-temperature portion gradually expands due to the heat conduction, so that the freezing of the generated water is further released and the function of the reaction gas passages C1 and A1 is gradually retrieved. This high-temperature portion expands over the upper half, and then towards the lower half, so that finally, the entire power generation plane of the fuel cell 1 belongs to the high-temperature portion.

When the temperature of the fuel cell 1, detected by the temperature sensor T, reaches a predetermined temperature (e.g., 5° C.), the termination of the local plane generation is determined by the ECU 50 and the ECU 50 switches the switch 43 on so as to release the shut-off state of the closed circuit 42 at the lower halves of the separators. Accordingly, power is also output from the lower halves of the separators 6 and 7, thereby switching from the local generation operation to the entire generation operation, and rated power can be obtained from the entire fuel cell 1.

According to the second embodiment, in addition to the above-explained embodiments, the self heating portion can be efficiently concentrated in comparison with the case in which power is output from the entire generation plane, so that the time necessary for starting the fuel cell 1 can be reduced, thereby improving the starting performance.

Third Embodiment

Figure 9:
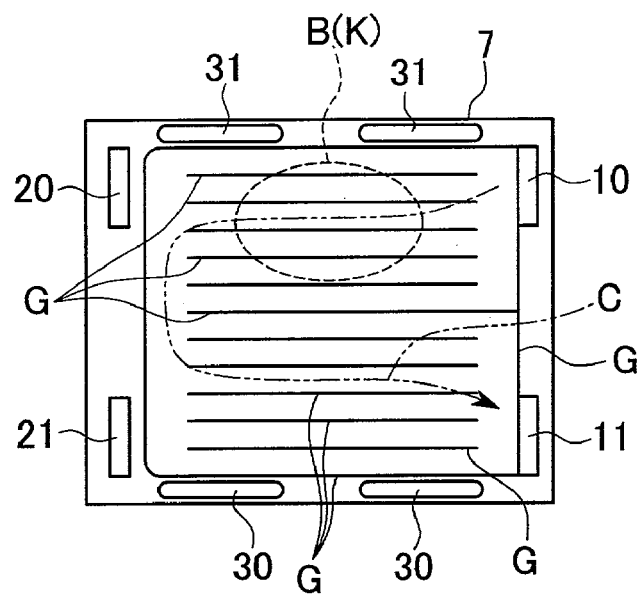
FIG. 9 is a plan view showing the structure of the third embodiment according to the present invention.

Another embodiment will be explained below. FIG. 9 is a plan view showing the separator 7 at the cathode, observed from the side which faces the membrane electrode assembly. In the above embodiments, the reaction gas passages are divided into upper and lower portions so as to form a local generation area. However, as shown in FIG. 9, the local generation area K may be defined without dividing the reaction gas passages.

The separator 7 at the cathode is made of metal, and the reaction gas passage is formed by using seal members G. Reference numeral 30 indicates a cooling liquid inlet communication hole, while reference numeral 31 indicates a cooling liquid outlet communication hole. Here, explanations of the separator at the anode are omitted.

The separator 7 at the cathode has an oxidizing gas inlet communication hole 10 formed in an upper portion on the right side, and an oxidizing gas outlet communication hole 11 formed in a lower portion on the right side, where a U-shaped reaction gas passage C is formed. The separator 7 also has a fuel gas inlet communication hole 20 formed in an upper portion on the left side, and a fuel gas outlet communication hole 21 formed in a lower portion on the left side, where a U-shaped reaction gas passage is formed in the separator at the anode (not shown).

In this embodiment, an electric heater is attached to the area surrounded by a dashed line, that is, to a part of the upper half of the power generation plane. This area is a partially heated area B, that is, a local generation area K.

In addition to the effects obtained by the above embodiments, according to the present embodiment in which the local generation area K is close to the oxidizing gas inlet communication hole 10 and fuel gas inlet communication hole 20, each reaction gas is reliably consumed for the power generation. Therefore, the high-temperature portion due to the self heating can be reliably formed. Additionally, the generated water tends to remain downstream of the reaction gas passage C; thus, in the local generation area K at the upstream side, generated water is not easily frozen, so that the reaction gas can be reliably supplied.

Fourth Embodiment

Figure 10:
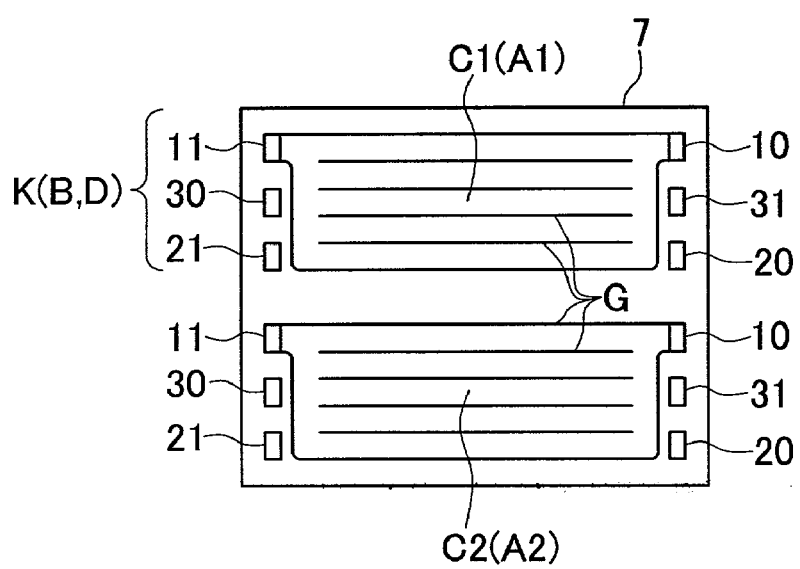
FIG. 10 is a plan view showing the structure of an example in the fourth embodiment according to the present invention.
Figure 11:
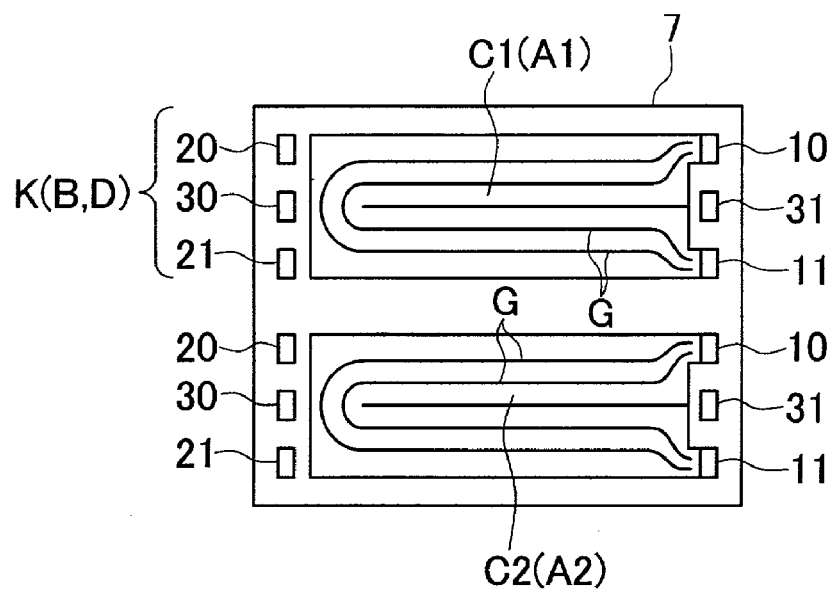
FIG. 11 is a plan view showing the structure of another example in the fourth embodiment.
Figure 12:
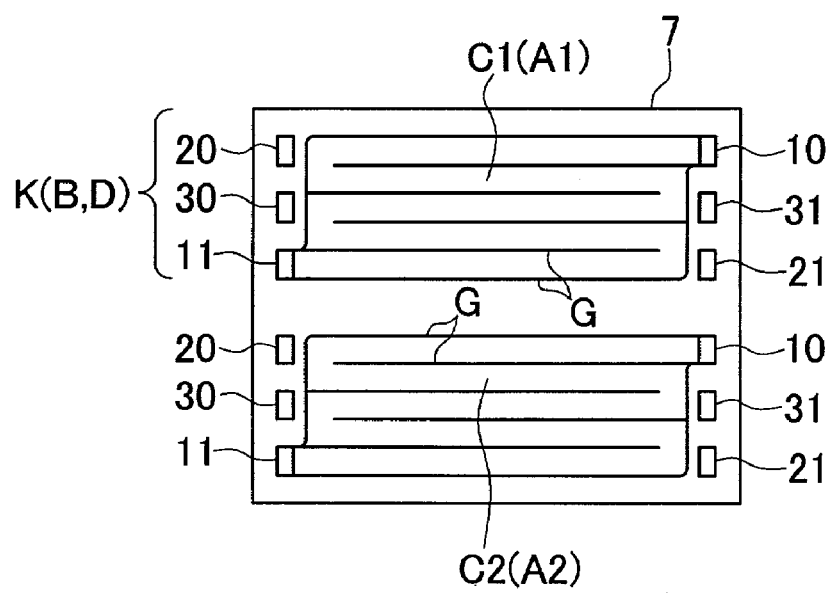
FIG. 12 is a plan view showing the structure of another example in the fourth embodiment.

In the fourth embodiment shown in FIGS. 10 to 12, the reaction gas passages are divided into the upper and lower halves. Similar to the previous embodiment, the following examples have a separator made of metal, and the passage is formed by sealing materials G. Also in the following examples, the cooling liquid inlet communication hole 30 and the cooling liquid outlet communication hole 31 are respectively provided at the left and right sides of the separator.

Also in the present embodiment, the upper (or lower) half can be defined as a local generation area. That is, starting-mode reaction gas passages C1 and A1, a partially heated area B, and a starting-mode power output area D can be defined, so that similar to the above embodiments, the starting time of the fuel cell can be reduced and the starting performance can be improved.

More specifically, in the example shown in FIG. 10, the oxidizing gas inlet communication hole 10 and the oxidizing gas outlet communication hole 11 are provided in an upper portion at either side, while the fuel gas inlet communication hole 20 and the fuel gas outlet communication hole 21 are provided in a lower portion at either side. In this example, the generated water does not easily remain in an upper portion of the upper reaction gas passage C1; thus, the local generation can be effectively performed by using this upper portion.

In another example shown in FIG. 11, an oxidizing gas inlet communication hole 10 and an oxidizing gas outlet communication hole 11 are respectively provided in upper and lower portions on the right side, while a fuel gas inlet communication hole 20 and a fuel gas outlet communication hole 21 are respectively provided in upper and lower portions on the left side, where a U-shaped reaction gas passage C1 is formed (refer to the U-shaped reaction gas passage in FIG. 9).

In another example shown in FIG. 12, an oxidizing gas inlet communication hole 10 and an oxidizing gas outlet communication hole 11 are respectively provided in an upper portion on the right side and a lower portion on the left side, while a fuel gas inlet communication hole 20 and a fuel gas outlet communication hole 21 are respectively provided in an upper portion on the left side and a lower portion on the right side, where reaction gas passages C1 and C2 are formed in a zigzag.

In the embodiments explained above, the power generation plane is generally divided into upper and lower halves, so as to form a local generation area. However, the division form is not limited, for example, the power generation plane may be divided into right and left halves, or any small area may be defined as a local generation area. Since the generated water tends to remain in a lower portion, the local generation is preferably performed in an upper portion where less generated water remains. In addition, the generated water tends to remain downstream of each reaction gas passage; thus, the local generation is preferably performed in the upstream of each reaction gas passage.

Fifth Embodiment

Figure 13:
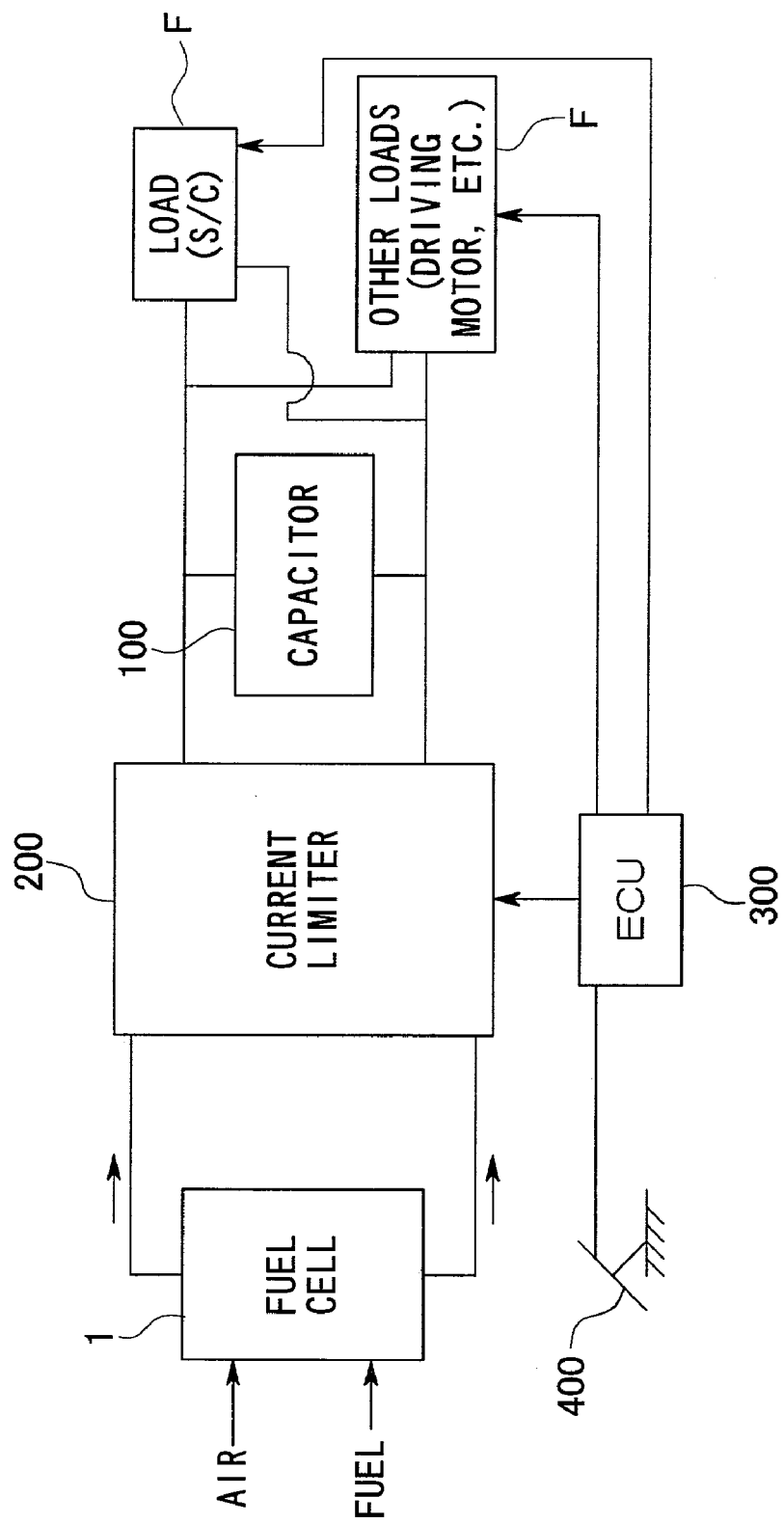
FIG. 13 is a block diagram showing a fuel cell system for vehicles, as the fifth embodiment according to the present invention.

FIG. 13 is a block diagram showing a fuel cell system for vehicles, in the fifth embodiment based on the basic embodiment.

In all the following embodiments, parts identical to those explained in the above embodiments are basically given identical reference numerals.

The fuel cell 1 is connected in parallel to a capacitor 100, which functions as a battery device (so that a battery may be used instead), and a current limiter 200. To the current limiter 200, a supercharger S/C for supplying air, and other loads including a driving motor, are connected as load F.

The current limiter 200 is provided for protecting the fuel cell 1 in an abnormal state in which the generation voltage or the state of gas supply has a problem. The protection by the current limiter 200 is performed by limiting the output power of the fuel cell 1. In the normal state, the fuel cell 1 and each electric load are electrically and directly coupled with each other.

Reference numeral 300 indicates an ECU for driving the driving motor based on the degree of opening of an accelerator pedal 400, where the degree of opening reflects the intention of the driver of the vehicle. The ECU 300 also controls the rotation speed of the supercharger S/C according to a required power value for the fuel cell 1, which is determined by adding the power of the driving motor and the power of the electric loads which include the supercharger S/C.

That is, according to a output request signal from the ECU 300, a required amount of power is supplied from the fuel cell 1 to each electric load, within the range limited by the current limiter 200. Therefore, if a specific required power value is output from the ECU 300 at the starting of the system, the supercharger S/C operates according to an idle output (i.e., output in the idle mode) so that a specific amount of air is supplied to the fuel cell 1 and a corresponding amount of hydrogen gas is also supplied to the fuel cell 1. During this process for satisfying the required idle output, an amount of the reaction gas is supplied to a portion of the reaction gas passage (explained below), where this amount is equivalent to that supplied when the entire reaction gas passage is used. Therefore, the self heating is concentratedly performed because the consumption of the reaction gas is the same as that in the entire generation, and power equal to that output in the entire generation is output.

Figure 14:
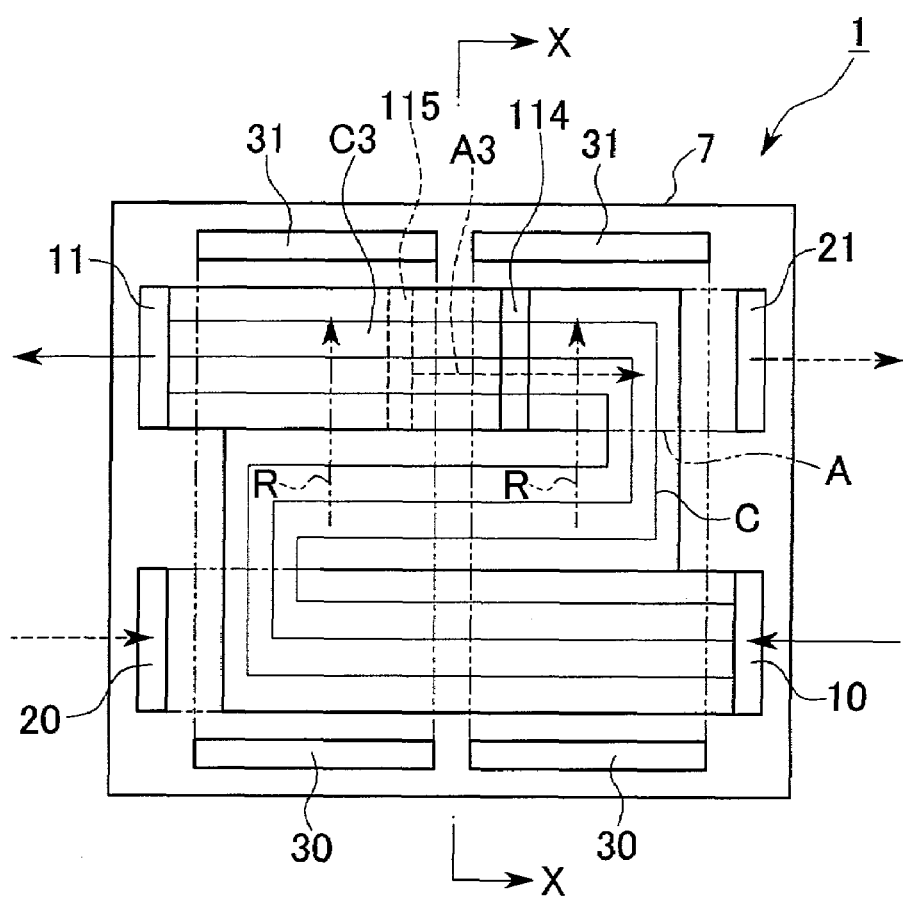
FIG. 14 is a plan view showing the distinctive portion of the fifth embodiment.
Figure 15:
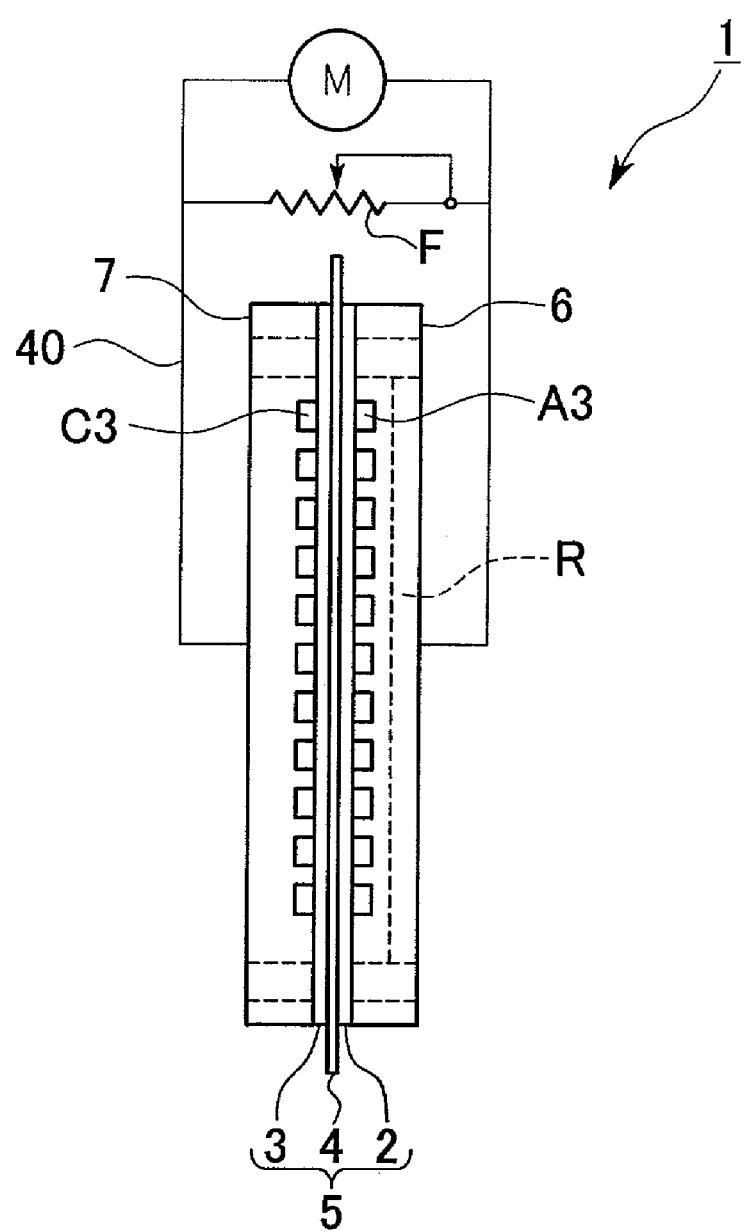
FIG. 15 is a sectional view along line X-X in FIG. 14.

FIGS. 14 and 15 show distinctive elements in the present embodiment. As shown in FIG. 14, the separator 7 at the cathode has a reaction gas passage C formed in a zigzag. This reaction gas passage C starts from an oxidizing gas inlet communication hole 10 provided in a lower portion at the right side, and ends at an oxidizing gas outlet communication hole 11 provided in an upper portion at the left side, that is, in a diagonal direction with respect to the inlet communication hole 10.

The separator 6 at the anode also has a reaction gas passage A (shown by a chain line) which also has a zigzag form corresponding to the reaction gas passage C. More specifically, the reaction gas passage A and the reaction gas passage C have a crossing positional relationship. Therefore, the reaction gas passage A starts from a fuel gas inlet communication hole 20 provided in a lower portion at the left side, and ends at a fuel gas outlet communication hole 21 provided in an upper portion at the right side, that is, in a diagonal direction with respect to the inlet communication hole 20. A pair of cooling liquid inlet communication holes 30 and 30 is formed at the lower sides of the separators 6 and 7, while a pair of cooling liquid outlet communication holes 31 and 31 is formed at the upper sides of the separators 6 and 7. A cooling liquid passage R for connecting the cooling liquid inlet and outlet communication holes 30 and 31, which face each other, is formed in the separator 6 at the anode.

As shown in FIG. 15, which is a sectional view along line X-X in FIG. 14, a closed circuit 40 for outputting power from the fuel cell 1 is formed via terminals attached to the separators 7 and 6.

An auxiliary gas supply inlet 114 is provided relatively close to the oxidizing gas outlet communication hole 11 for the reaction gas passage C, where the auxiliary gas supply inlet 114 is connected to a branch end 113 of a branch passage 112 (explained below). Also for the reaction gas passage A of the separator 6, an auxiliary gas supply inlet 115 is formed at a symmetrical position with respect to the auxiliary gas supply inlet 114 (see FIG. 14). The auxiliary gas supply inlet 115 is also connected to a branch end of a branch passage.

The portion between the auxiliary gas supply inlet 114 and the oxidizing gas outlet communication hole 11 functions as a local generation reaction gas passage C3, while the portion between the auxiliary gas supply inlet 115 and the fuel gas outlet communication hole 21 functions as a local generation reaction gas passage A3. In the power generation plane of the membrane electrode assembly 5, the area corresponding to the local generation reaction gas passages C3 and A3 functions as a local generation area K. The auxiliary gas supply inlets 114 and 115 are positioned in order that the local generation reaction gas passages C3 and A3 partially overlap with each other.

Figure 16:
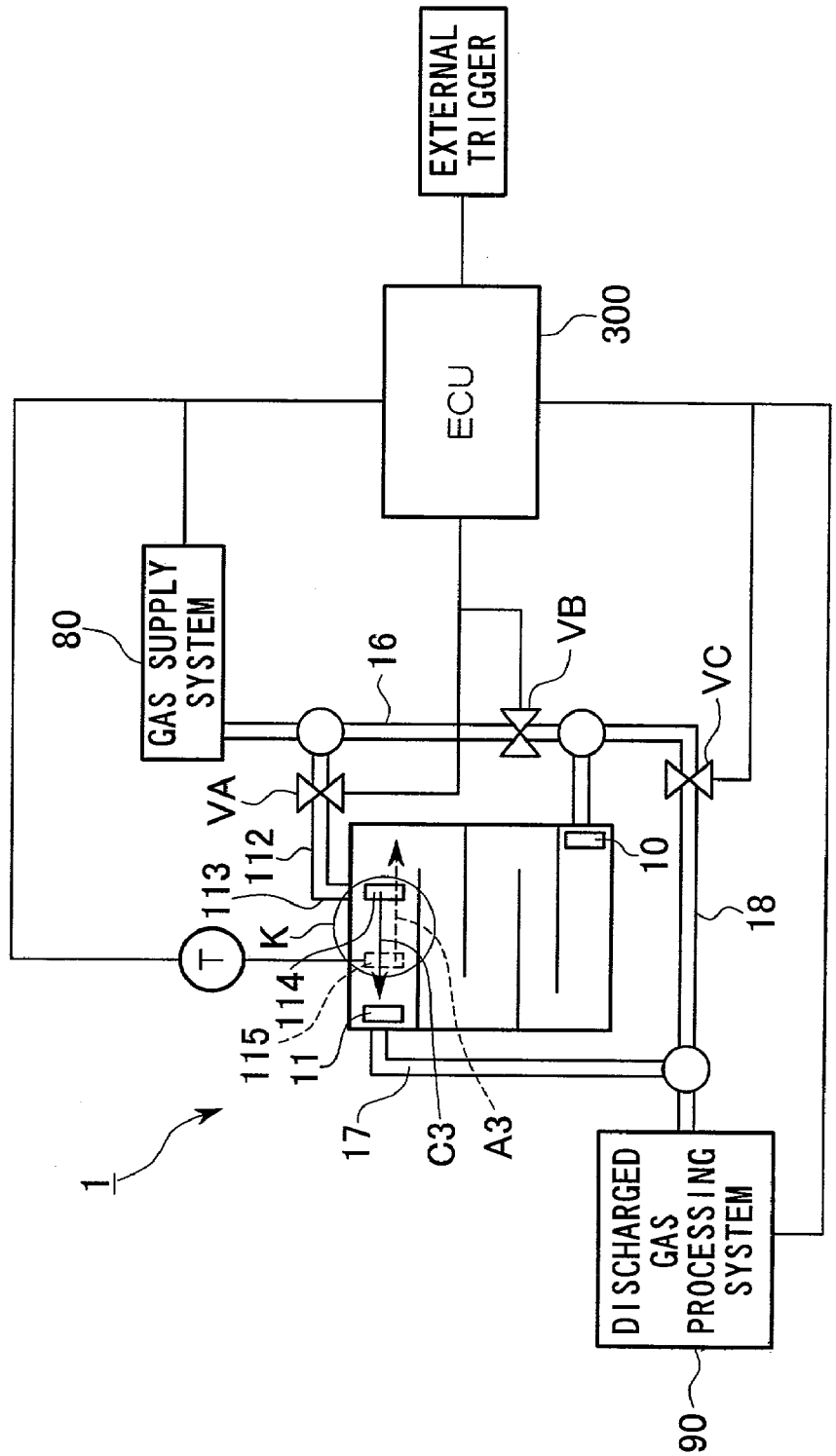
FIG. 16 is a diagram showing the general structure of the fuel cell system in the fifth embodiment.

As shown in FIG. 16 in which the fuel cell 1 is simplified, a gas supply passage 16 is connected to the oxidizing gas inlet communication hole 10 and a gas discharge passage 17 is connected to the oxidizing gas outlet communication hole 11 in the separator 7 at the cathode. In addition, a branch passage 112 is connected to the gas supply passage 16, and the (branch) end 113 of the branch passage 112 is connected to the auxiliary gas supply inlet 114 provided in the middle of the reaction gas passage C.

A valve VB is inserted in the gas supply passage 16, while a valve VA is inserted in the branch passage 112. According to the opening and closing control of the valves VA and VB, the air as the oxidizing gas can be supplied, not from the gas supply passage 16, but from the branch passage 112 to the auxiliary gas supply inlet 114.

A gas supply system 80 including the supercharger S/C and the like is attached to the gas supply passage 16 which is connected to the oxidizing gas inlet communication hole 10, and a discharged gas processing system 90 is attached to the gas discharge passage 17 which is connected to the oxidizing gas outlet communication hole 11. The gas supply system 80, the discharged gas processing system 90, and the valves VA and VB are connected to the ECU 300. A temperature sensor T for detecting the temperature in the fuel cell is also connected to the ECU 300.

Accordingly, the starting-mode reaction gas passage system for generating power by supplying the reaction gas to the local generation reaction gas passage C3 and the normal-mode reaction gas passage system for generating power by supplying the reaction gas to the entire reaction gas passage are switchable by using the valves VA and VB.

In this embodiment, a communication passage 18 is provided between the gas supply passage 16 (here, the portion between the valve VB and the oxidizing gas inlet communication hole 10) and the gas discharge passage 17. A valve VC, which is also connected to the ECU 300, is inserted in the communication passage 18.

The anode side also has a gas supply system which includes a hydrogen tank and the like, a gas supply passage connected to the fuel gas inlet communication hole 20, and a gas discharge passage connected to the fuel gas outlet communication hole 21, where the end of a branch passage is connected to the auxiliary gas supply inlet 115. That is, the anode side has a structure similar to that of the cathode side; thus, explanations thereof are omitted.

The operation of the present embodiment will be explained with reference to the flowchart in FIG. 17.

Figure 17:
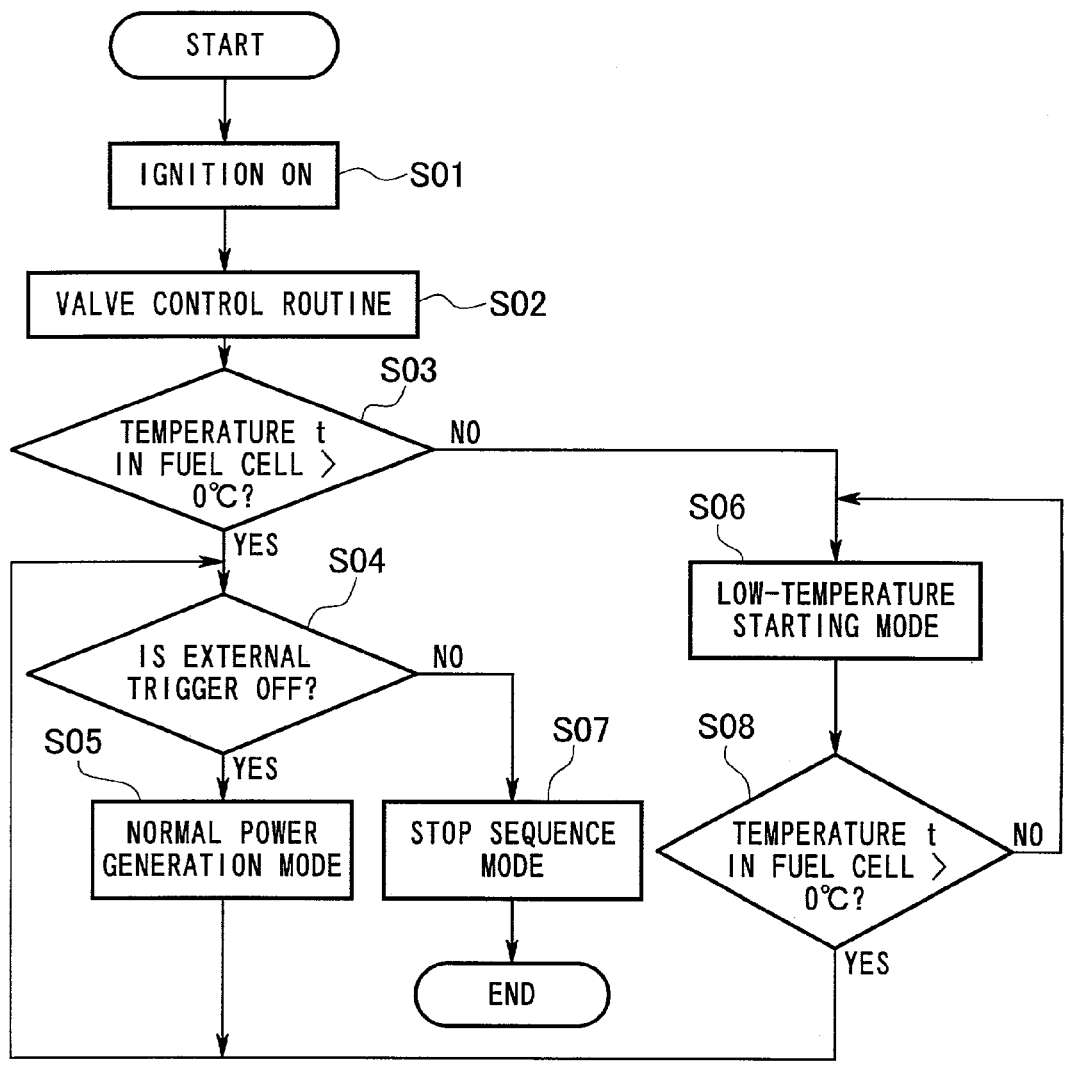
FIG. 17 is a flowchart showing the operation of the fifth embodiment.

In the first step S01 in FIG. 17, when an ignition switch is switched on, a specific valve control routine is executed (see step S02). Specifically, this control routine is a valve control operation necessary for starting the fuel cell, such as purging of the generated water by using a purge valve (not shown).

In step S03, it is determined whether temperature "t" in the fuel cell 1, measured using the temperature sensor T, is above 0° C. If the result of the determination is "YES", the operation proceeds to step S04, while if the result of the determination is "NO", the operation proceeds to step S06, where the operation mode is shifted to a low-temperature starting mode, which will be explained below.

After step S06, step S08 is executed. In step S08, it is determined whether the temperature "t" measured by the temperature sensor T is above 0° C. If the result of the determination is "YES", the operation proceeds to step S04, while if the result of the determination is "NO", the operation proceeds to step S06, where the low-temperature starting mode is maintained.

The threshold used in the above step S08 may be changeable according to the quantity of the load connected to the fuel cell. For example, when a high load is connected, the operation proceeds to step S04 if the temperature in the fuel cell exceeds 0° C.; however, when a low load is connected, the operation does not proceed to step S204 until the temperature in the fuel cell exceeds 5° C. This is because the low load has a relatively low heating value in comparison with the high load, and thus it is preferable to shift the normal power generation mode after the temperature reaches a higher level.

In step S04, it is determined whether an external trigger, which is an operation button for shifting to a stop sequence mode, is off. If the result of the determination is "YES", that is, if the operation button has not been pushed, then the operation proceeds to step S05 so as to shift to the normal power generation mode. After step S05, the determination in step S04 is repeated. If the result of the determination is "NO", that is, if the operation button has been pushed, then the operation proceeds to step S07 so as to shift to the stop sequence mode (explained below). The operation of this flow is then completed.

Each operation mode will be explained with reference to FIG. 16.

In the normal power generation mode in step S05, the valves VA and VC are closed, while the valve VB is opened. Therefore, the air supplied from the gas supply system 80 is supplied from the gas supply passage 16 and the oxidizing gas inlet communication hole 10 to the entire reaction gas passage C. This supplied air reacts with the hydrogen gas which is similarly supplied to the reaction gas passage A at the anode (not shown), so that the entire plane generation of the membrane electrode assembly 5 is performed and electrical energy is generated. This electrical energy is supplied via the closed circuit 40 (see FIG. 15) to the load F and the driving motor M. The gas which has been used in the reaction is then discharged via the oxidizing gas outlet communication hole 11 from the gas discharge passage 17 to the discharged gas processing system 90.

In the low-temperature starting mode in step S06, the valve VA is opened, while the valves VB and VC are closed. Therefore, the air supplied from the gas supply system 80 is supplied via the branch passage 112 and the auxiliary gas supply inlet 114 to the local generation reaction gas passage C3. This supplied air reacts with the hydrogen gas which is similarly supplied to the local generation reaction gas passage A3 at the anode (not shown), so that the local plane generation using a part of the generation plane of the membrane electrode assembly 5 is performed and electrical energy is generated. This electrical energy is supplied via the closed circuit 40 (see FIG. 15) to the loads F which includes the motor for driving the supercharger S/C, which is necessary in the idle mode. The gas which has been used in the reaction is then discharged via the oxidizing gas outlet communication hole 11 from the gas discharge passage 17 to the discharged gas processing system 90.

In the above process, the reaction gas, whose amount is equal to that supplied in the entire generation, is concentratedly supplied to the local generation reaction gas passage C3 (or A3) which has a shorter passage. Therefore, self heating is concentratedly performed. In addition, the flow velocity in the reaction gas passage is increased because the shortened passage has lass resistance. Therefore, the temperature in the relevant area quickly increases, and the high-temperature portion then expands over the entire generation plane, thereby increasing the temperature of the fuel cell 1.

When the increasing temperature of the fuel cell 1 exceeds a predetermined temperature (e.g., 0° C.), that is, if the result of the determination in steps S03 and S08 is "YES", the operation mode is shifted to the normal power generation mode. When this mode shift is performed, the valve VC may be slightly opened so as to increase the amount of the reaction gas which passes through the passage connected to the auxiliary gas supply inlet 114, so that the defrosted generated water in this passage can be drained.

In the stop sequence mode in step S07, in order to improve the restarting performance of the (stopped) fuel cell 1, the generated water remains in the reaction gas passage C is drained before stopping the fuel cell 1. In this mode, the valve VA is opened, the valve VB is closed or slightly opened, and the valve VC is closed. Accordingly, the flow velocity in the local generation reaction gas passage C3 is increased, so that the draining efficiency of the generated water is improved. Therefore, it is possible to reliably prevent the generated water in the reaction gas passage C3 from freezing. In addition, the flow velocity of the reaction gas in the reaction gas passage C3 can be controlled by controlling the degree of opening of the valve VB. Furthermore, the generated water generated at the lower side of the power generation plane of the membrane electrode assembly 5 can be drained by slightly opening the valve VB.

According to the present embodiment, in the operation using the starting-mode reaction gas passage, the reaction gas is supplied to a shorter reaction gas passage (i.e., C3 and A3). Therefore, the same electric power as that output in the entire plane generation is output from a portion of the power generation plane, so that self heating is concentratedly performed. Therefore, the flow velocity in the shorter reaction gas passage is increased, thereby improving the draining capability of the generated water. In addition, the reaction gas stays in the shorter reaction gas passage for a shorter time, thereby avoiding refreezing of the generated water.

If the fuel cell is heated by combusting a combustion gas, a large tank for storing the combustion gas is necessary. However, in the present embodiment, such a large tank is unnecessary and sufficient space for placing peripheral functional elements can be obtained.

In addition, according to the temperature of the fuel cell 1, the starting-mode reaction gas passage system and the normal-mode reaction gas passage system can be switchably used in the operation of the fuel cell. Typically, based on a threshold temperature (e.g., 0° C.), the starting-mode reaction gas passage system is used when the temperature of the fuel cell is equal to or below the threshold temperature, while the normal-mode reaction gas passage system is used when the temperature of the fuel cell is above the threshold temperature, thereby always obtaining optimum output according to the temperature of the fuel cell and performing suitable energy management.

In the present embodiment, the local generation can be performed using a simple structure in which the branch passage 112 is used and the branch end 113 of this branch passage 112 is connected to the auxiliary gas supply inlet 114; thus, the fuel cell system can be easily manufactured.

Sixth Embodiment

Figure 18:
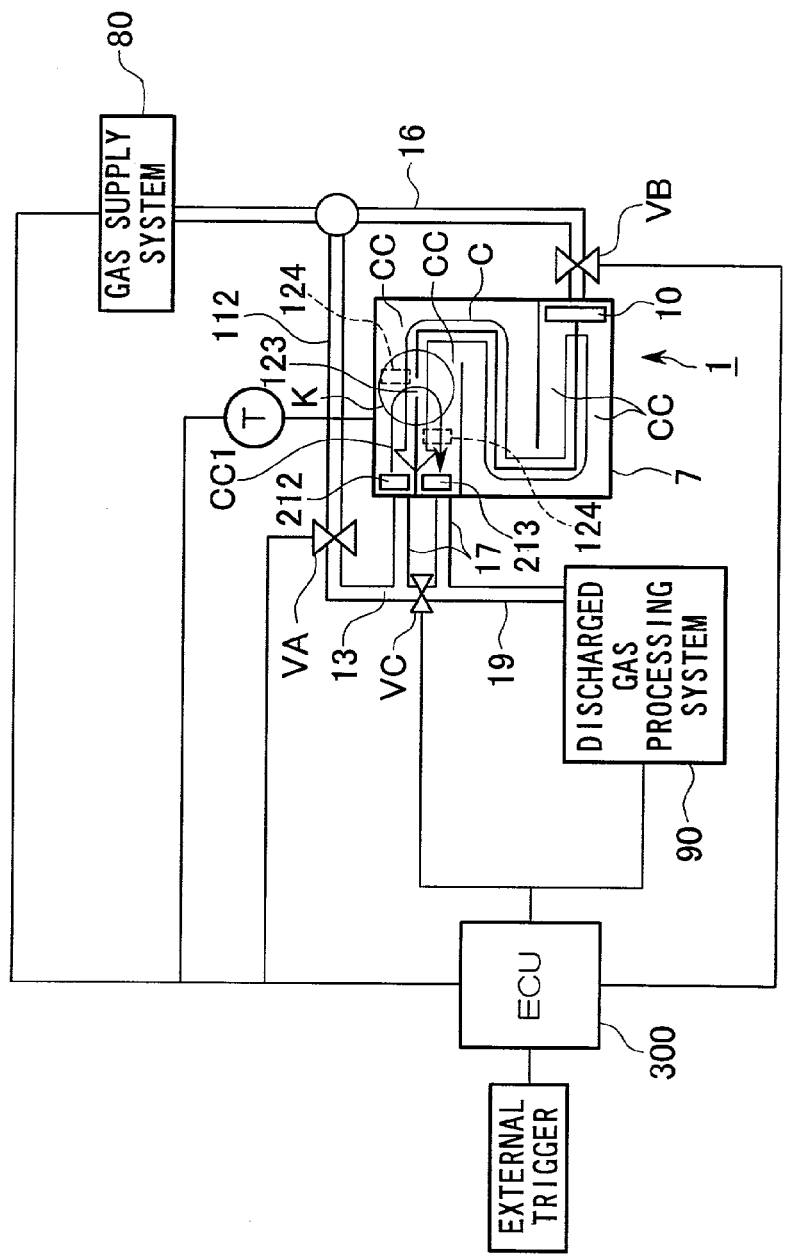
FIG. 18 is a diagram showing the general structure of the fuel cell system as the sixth embodiment according to the present invention.

FIG. 18 shows the sixth embodiment, in which the separator 7 at the cathode has a reaction gas passage C consisting of plural reaction gas passages CC (e.g., two reaction gas passages) which are adjacent with each other. Similar to the previous embodiment, a gas supply passage 16 is connected to the oxidizing gas inlet communication hole 10, a branch passage 112 having a valve VA is connected to the gas supply passage 16, and the gas supply system 20 is connected to the gas supply passage 16.

In this embodiment, two oxidizing gas outlet communication holes 212 and 213 are formed in correspondence to two reaction gas passages CC, and two gas discharge passages 17 and 17 are connected to these oxidizing gas outlet communication holes 212 and 213. Each gas discharge passage 17 is connected via a junction passage 19 to the discharged gas processing system 90. In the junction passage 19, a valve VC is inserted at the position where two flows from the gas discharge passages meet. The branch end 113 of the branch passage 112 is connected to the gas discharge passage 17 between the valve VC and the upper oxidizing gas inlet communication hole 212.

A bypass portion 123 for making the adjacent reaction gas passages CC communicate with each other is formed in the vicinity of the oxidizing gas outlet communication holes 212 and 213. Therefore, a U-shaped local generation reaction gas passage CC1 is formed between the oxidizing gas outlet communication holes 212 and 213 and the bypass portion 123. Accordingly, the starting-mode reaction gas passage system for performing the local generation by supplying the reaction gas to the reaction gas passage CC1, and the normal-mode reaction gas passage system for generating power by supplying the reaction gas to the entire reaction gas passage C can be switchably used using valves VA, VB, and VC. Therefore, a portion of the membrane electrode assembly 5, which corresponds to the local generation reaction gas passage CC1, is defined as a local generation area K (see the circle indicated by "K" in FIG. 18).

The anode side has a similar structure, and explanations thereof are also omitted in this embodiment.

The function of the present embodiment will be explained below.

In this embodiment, one of the normal power generation mode, the low-temperature starting mode, and the stop sequence mode is selected according to a process similar to that shown in FIG. 17; thus, a flowchart showing the operation of the present embodiment is omitted.

The operation of each mode will be explained with reference to FIG. 18 (FIG. 15 is also referred to).

In the normal power generation mode, the valve VA is closed, while the valves VB and VC are opened. Therefore, the air supplied from the gas supply system 80 is supplied from the gas supply passage 16 and the oxidizing gas inlet communication hole 10 to the entire reaction gas passage C. This supplied air reacts with the hydrogen gas which is similarly supplied to the reaction gas passage at the anode (not shown), so that the entire plane generation using the entire plane of the membrane electrode assembly 5 is performed and electrical energy is generated. This electrical energy is supplied via the closed circuit 40 (see FIG. 15) to the load F and the driving motor M. The gas which has been used in the reaction is then discharged via the oxidizing gas outlet communication holes 212 and 213 from the two gas discharge passages 17 and 17 to the discharged gas processing system 90.

In the low-temperature starting mode, the valve VA is opened, while the valves VB and VC are closed. Therefore, the air supplied from the gas supply system 80 is supplied via the branch passage 112, the upper gas discharge passage 17, and the upper oxidizing gas outlet communication hole 212 to the U-shaped local generation reaction gas passage CC1. This supplied air reacts with the hydrogen gas which is similarly supplied to the local generation reaction gas passage at the anode (not shown), so that the local plane generation using a part of the generation plane of the membrane electrode assembly 5 is performed and electrical energy is generated. This electrical energy is supplied via the closed circuit 40 (see FIG. 15) to the loads F which include the motor for driving the supercharger S/C, which is necessary in the idle mode. The gas which has been used in the reaction is then discharged via the lower oxidizing gas outlet communication hole 213 from the lower gas discharge passage 17 to the discharged gas processing system 90.

In the above process, the reaction gas, whose amount is equal to that supplied in the entire generation, is concentratedly supplied to the local generation reaction gas passage CC1 which has a shorter passage. Therefore, self heating is concentratedly performed. In addition, the flow velocity in the reaction gas passage CC1 is increased because the shortened passage has less resistance. Therefore, the temperature in the relevant area quickly increases, and the high-temperature portion then expands over the entire generation plane, thereby increasing the fuel cell 1. In particular, a U-shaped passage CC having a smaller cross-sectional area is used as the local generation reaction gas passage CC1; thus, the flow velocity can be much more quickly increased.

When the increasing temperature of the fuel cell 1 exceeds a predetermined temperature (e.g., 0° C.), the operation mode is shifted to the normal power generation mode. When this mode shift is performed, the valve VB may be slightly opened so as to supply the reaction gas to the upstream of the reaction gas passage C (i.e., upstream relative to the bypass portion 123), so that the defrosted generated water in the corresponding portion of the passage can be drained.

In the stop sequence mode of the present embodiment, the valve VA is opened, the valve VB is closed or slightly opened, and the valve VC is closed. Accordingly, the flow velocity in the local generation reaction gas passage CC1 increases, so that the draining efficiency of the generated water is improved. Therefore, it is possible to reliably prevent the generated water in the reaction gas passage CC1 from freezing. In addition, the flow velocity of the reaction gas in the reaction gas passage CC1 can be controlled by controlling the degree of opening of the valve VB. Furthermore, the generated water generated at the lower side of the power generation plane of the membrane electrode assembly 5 can be drained by slightly opening the valve VB.

Since the present embodiment employs the U-shaped local generation reaction gas passage CC1 formed in the adjacent reaction gas passages CC via the bypass portion 123, the passage CC1 has a cross section smaller than that of the reaction gas passage C. The amount of the reaction gas supplied to the passage having such a smaller area is the same as that of the reaction gas supplied in the entire plane generation, so that self heating is concentratedly performed. In the low-temperature starting mode, the flow velocity of the reaction gas is increased and this reaction gas having an increased velocity flows through a shorter passage CC1. Therefore, the local generation can be further effectively performed.

In the present embodiment, the two oxidizing gas outlet communication holes 212 and 213 are effectively used as the inlet and outlet of the local generation reaction gas passage CC1 so as to supply and discharge the reaction gas; thus, the number of structural elements can be small. However, as shown by dashed lines in FIG. 18, two openings 124 may be respectively provided in the passages CC which are adjacent via the bypass portion 123. A branch passage is connected to the gas supply passage 16 and the end of this branch passage is connected to one of the openings, and another branch passage is connected to the junction passage 19 (for the gas discharge passages 17) and the end of this branch passage is connected to the other of the openings, thereby forming a local generation reaction gas passage. That is, in the embodiment employing the oxidizing gas outlet communication holes 212 and 213, these communication holes 212 and 213 function as the above-explained openings 24.

Seventh Embodiment

Figure 19:
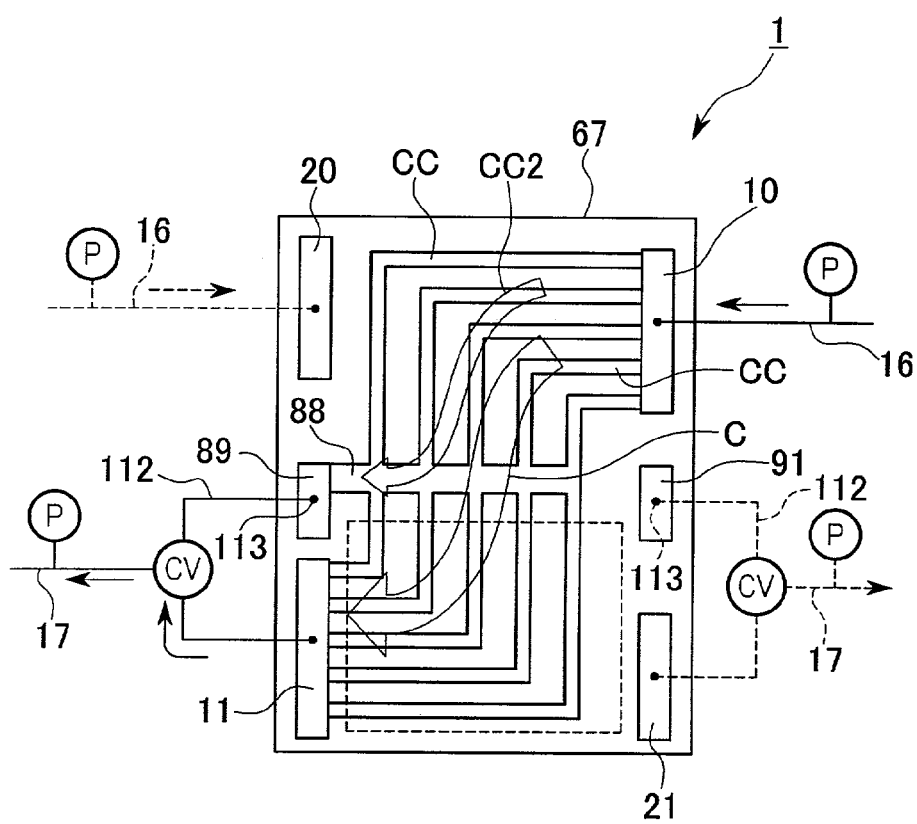
FIG. 19 is a diagram showing the general structure of the fuel cell as the seventh embodiment according to the present invention.

FIG. 19 shows the general structure of a separator 67 at the cathode of this embodiment.

The separator 67 has a crank-shaped (or S-shaped) reaction gas passage C, which consists of plural reaction gas passages CC. The separator 67 starts from the oxidizing gas inlet communication hole 10 provided in an upper portion at the right side of the separator, and ends at the oxidizing gas outlet communication hole 11 provided in a lower portion at the left side of the separator.

The separator at the anode (not shown) also has a reaction gas passage consisting of plural crank-shaped passages. That is, this reaction gas passage at the anode starts from the fuel gas inlet communication hole 20 provided in an upper portion at the left side of the separator, and ends at the fuel gas outlet communication hole 21 provided in a lower portion at the right side of the separator, so as to form a crossing positions relationship with the reaction gas passage C at the cathode. The cooling liquid system, the gas supply system, the discharged gas processing system and the like are not shown in FIG. 19.

A communication passage 88 is provided which crosses each passage CC and makes the passages CC communicate with each other. This communication passage 88 is connected to an opening 89 (corresponding to an opening 91 at the anode) which is provided between the oxidizing gas inlet communication hole 10 and the oxidizing gas outlet communication hole 11. The portion between the opening 89 and the oxidizing gas inlet communication hole 10 functions as a local generation reaction gas passage CC2.

Gas supply passages 16 are respectively connected to the oxidizing gas inlet communication hole 10 and the fuel gas inlet communication hole 20, whereas gas discharge passages 17 are respectively connected to the oxidizing gas outlet communication hole 11 and the fuel gas outlet communication hole 21. In addition, a branch passage 112 is connected to each gas discharge passage 17, and the (branch) end 113 of the branch passage 112 is connected to each of the openings 89 and 91.

A valve CV is provided at each junction of the gas supply passage 17, where the passages connected to each valve CV are switchable by operating the valve CV. In FIG. 19, reference symbols P indicate pressure gages.

The function of the present embodiment will be explained below.

In the low-temperature starting mode, if the temperature of the fuel cell is equal to or below a predetermined value (e.g., 0° C.), the valves CV are controlled to make the openings 89 and 91 communicable. Under these conditions, when the reaction gas is supplied via the gas supply passage 16 at the cathode, the reaction gas is made to flow into the reaction gas passage C from the oxidizing gas inlet communication hole 10, and this reaction gas is discharged via the communication passage 88 and the opening 89 from the gas discharge passage 17, without reaching the oxidizing gas outlet communication hole 11. Therefore, the reaction gas is concentratedly supplied to the local generation reaction gas passage CC2 which substantially has a shorter passage length, so that power generation is performed in the corresponding local area of the membrane electrode assembly 5 and the temperature of the fuel cell 1 is increased.

During the operation, when the temperature in the fuel cell 1, measured by a temperature sensor (not shown), exceeds a predetermined value (e.g., 0° C.), the valve CV for switching the passage is switched so as to close the opening 89. Accordingly, the normal power generation mode in which the reaction gas flows through the entire reaction gas passage C is started. In the present embodiment, the pressure gages P are used for detecting pressure loss between the gas supply passage 16 and the gas discharge passage 17, so that the state of the frozen generated water in the lower portion of the reaction gas passages CC can be estimated.

According to the present embodiment, in addition to the effects obtained by the above embodiments, the local generation reaction gas passage CC2 can be formed without using the oxidizing gas outlet communication hole 11 and the fuel gas outlet communication hole 21 which are positioned in a lower area of each separator, so that the reaction gas passage CC2 is not formed in an area where water tends to be generated. Therefore, the probability of generation of water is very low in the reaction gas passage CC2, thereby considerably improving the reliability of the fuel cell.

Eighth Embodiment

Figure 20:
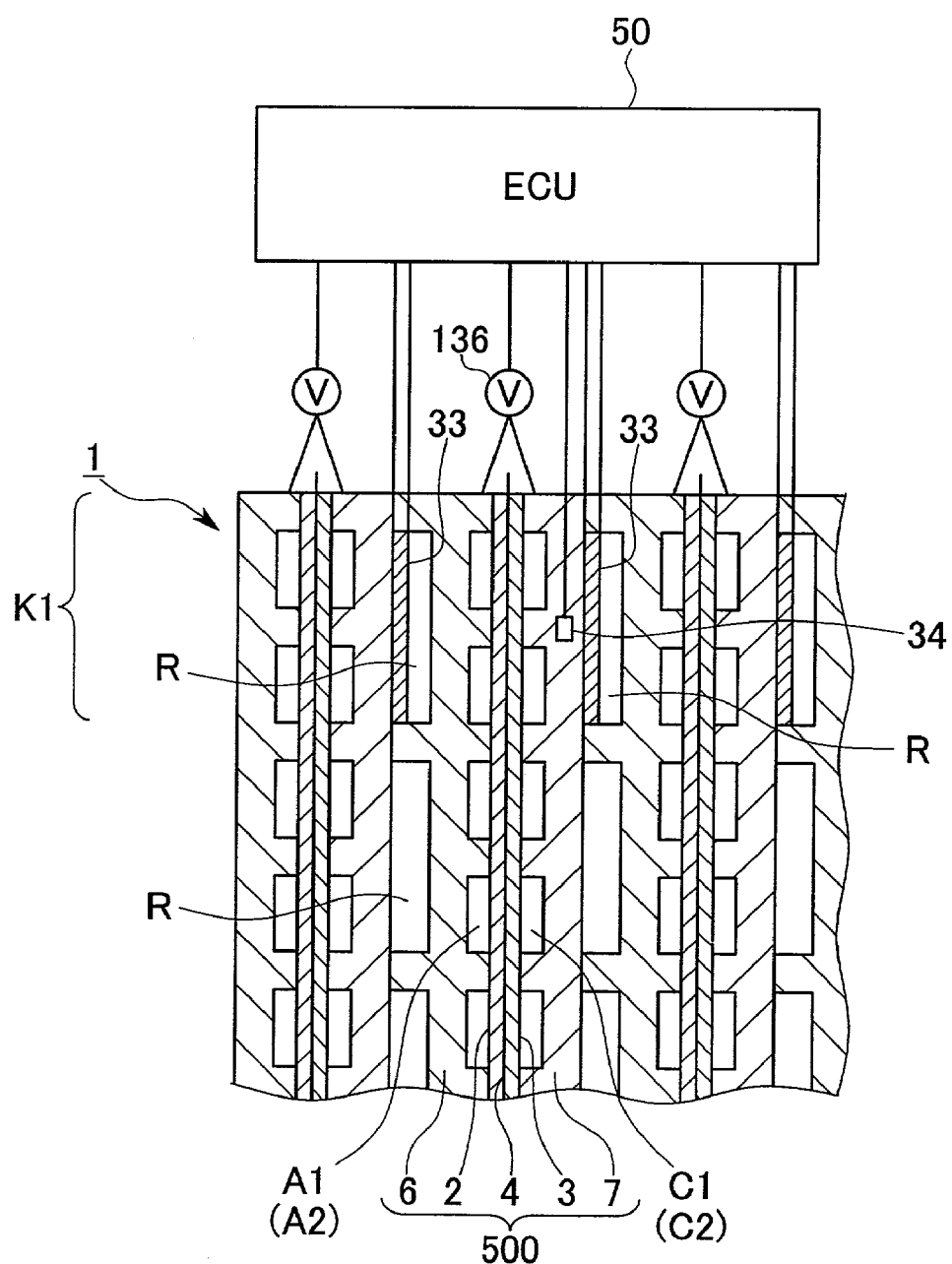
FIG. 20 is a longitudinal sectional view of the fuel cell as the eighth embodiment according to the present invention.

The basic structure of this embodiment is also shown in FIG. 1. Therefore, a part of the cathode 3 and the anode 2, which corresponds to the reaction gas passages C1 and A1, is defined as a local generation area K1. In the present embodiment, as shown in FIG. 20 (a longitudinal sectional view of a portion of the fuel cell 1), an electric heater 33 (i.e., heating device) is provided at a portion of each cooling liquid passage R, where the portion corresponds to the local generation area K1. The electric heater 33 comprises a thin film heater which is printed or deposited on a surface of each separator 7, on which the reaction gas passages C1 and C2 are not formed.

In FIG. 20, reference numeral 500 indicates a cell consisting of a separator 6, an anode 2, a solid polymer electrolyte membrane 4, a cathode 3, and a separator 7. In the fuel cell 1 having plural stacked cells 500, terminals (not shown) are respectively connected to the separator 7 at the outermost cathode and the separator 6 at the outermost anode, so as to form a closed circuit for outputting power from the fuel cell 1. In addition to the driving motor and the other loads connected to the fuel cell, an electric heater explained below is also driven by the output of the fuel cell 1.

As shown in FIG. 20, a temperature sensor 34 for detecting a typical temperature in the fuel cell 1 is attached to a predetermined position of the separator 7 of one of the cells 500. The predetermined position is in the local generation area K1, preferably at the center of the area K1. The temperature sensor 34 includes, for example, a thermistor, and the output signal from the temperature sensor 34 is input into the ECU 50.

Also in this fuel cell 1, a pressure sensor 136 is attached to the pair of the separators 6 and 7 of each cell 500, and the output signal from the pressure sensor 136 is also input into the ECU 50.

The ECU 50 is also connected to the hydrogen tank H2, the motor "m" of the supercharger S/C, the valve 24 of the supply passage 23 which is connected to the hydrogen tank H2, and the valve 14 of the supply passage 13 which is connected to the supercharger S/C. The ECU 50 is operated using the electric power stored in a battery (not shown).

In addition to the above-explained local generation operation in the basic embodiment, the electric heater 33 is switched on while only the reaction gas passages C1 and A1 are used and no cooling liquid is made to flow through the cooling liquid passages R.

Accordingly, current flows through the electric heater 33, and the heat by the heating of the electric heater 33 is conducted via the separators 6 and 7 to the anode 2, the cathode 3, and the solid polymer electrolyte membrane 4, thereby quickly heating these portions. Therefore, the local generation in the area K1 is quickly performed, thereby promoting the self heating.

The operation of the electric heater 33 is controlled so as to satisfy the above-explained formula (2). That is, the temperature of the local generation area K1 of each cell 500 can be increased to 0° C. or above before the operation of the fuel cell 1 is stopped due to decrease of the output voltage of the fuel cell 1, which is caused by freezing of the generated water. Accordingly, power generation in the local generation area K1 can be maintained and thus the operation of the fuel cell 1 can be maintained even if the temperature of the other area (e.g., the lower half of each cell 500) is below the freezing point. In addition, the minimum energy necessary for operating the fuel cell 1, which corresponds to power necessary for driving auxiliary machines such as the supercharger S/C, can be obtained by the generation of the fuel cell 1. Furthermore, in comparison with the case of proving a heater for heating the entire plane of the cell 500, less energy is necessary, thereby suppressing power consumption in the local plane power generation.

A preprocess before starting the low-temperature mode includes purging in the reaction gas passages C1 and C2, preheating using the electric heater 33, and the like. In the present embodiment, only the local generation area K1 must be prepared for starting the low-temperature mode; thus, energy consumption for the preprocess can be reduced.

Figure 21:
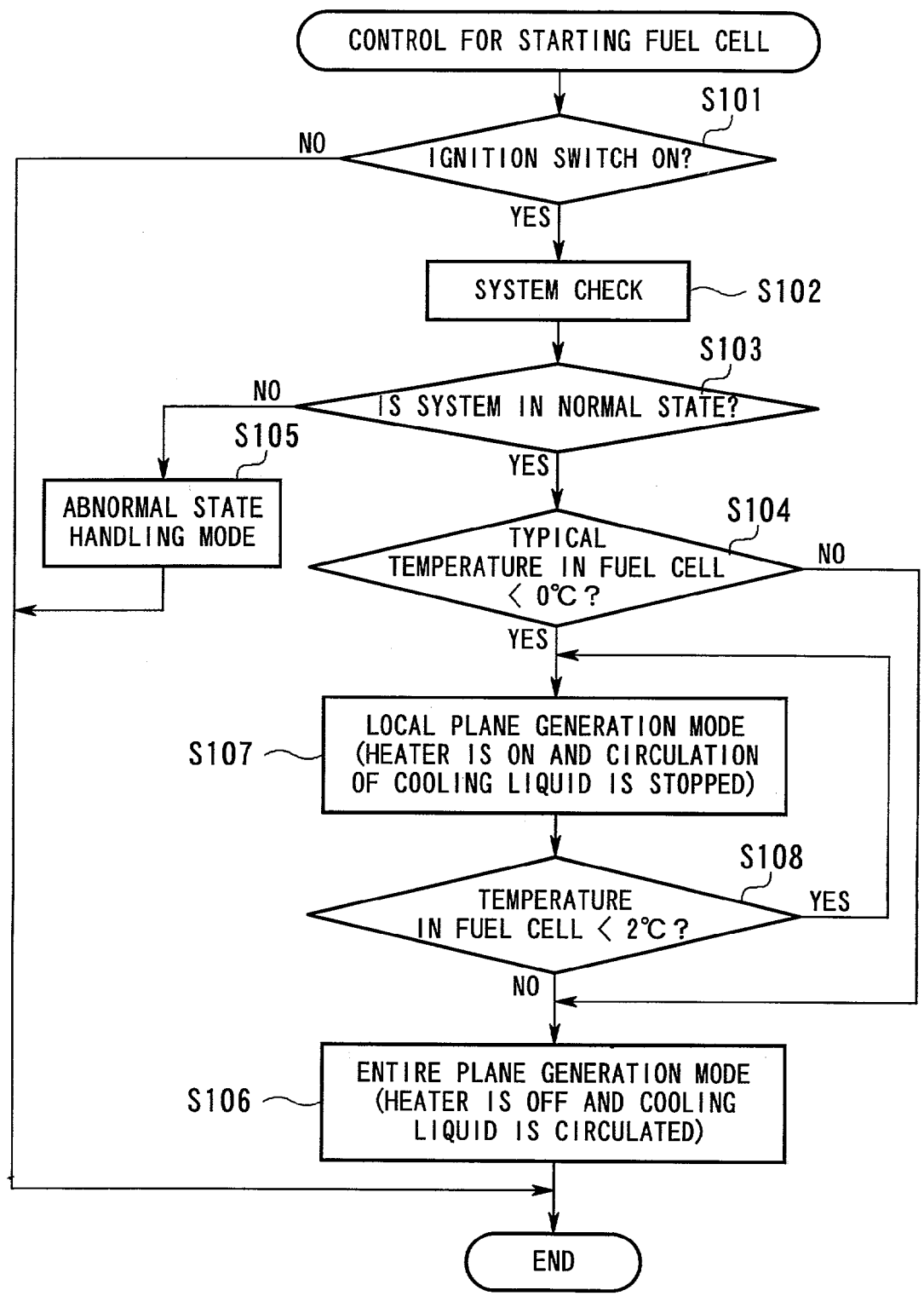
FIG. 21 is a flowchart showing an example of the control operation for starting the fuel cell in the eighth embodiment.

An example of the control for starting the fuel cell 1 will be explained with reference to the flowchart in FIG. 21.

In the first step S101, it is determined whether the ignition switch is on. If the result of the determination is "YES" (i.e., the ignition switch is on), the operation proceeds to step S102, while if the result of the determination is "NO" (i.e., the ignition switch is off), the operation of this flow is terminated.

After step S102 in which the system is checked, it is determined in step S103 whether the system is in the normal state. If the result of the determination is "YES" (i.e., no abnormal state has been found), the operation proceeds to step S104, while if the result of the determination is "NO" (i.e., the system is in an abnormal state), the operation proceeds to step S105.

In step S104, it is determined whether a typical temperature in the fuel cell 1, measured by the temperature sensor 34, is lower than 0° C. If the result of the determination is "NO" (i.e., the temperature is equal to or above 0° C.), the operation proceeds to step S106 so as to shift the operation mode to the entire plane generation. If the result of the determination in step S104 is "YES" (i.e., the temperature is below 0° C.), the operation proceeds to step S107 so as to shift the operation mode to the local plane generation mode.

In the local plane generation mode performed in step S107, the local generation using the local generation area K1 as explained above is performed. In the following step S108, it is determined whether the typical temperature in the fuel cell 1 is lower than a predetermined temperature which is 0° C. or above. Here, this predetermined temperature is 2° C. If the result of the determination is "YES" (i.e., below 2° C.), the operation returns to step S107, while if the result of the determination is "NO" (i.e., equal to or above 2° C.), the operation proceeds to step S106. That is, while the typical temperature in the fuel cell 1 is lower than the predetermined temperature (i.e., 2° C.), the local plane generation of the fuel cell 1 is continued, and when the typical temperature reaches the predetermined temperature (i.e., 2° C.), the local plane generation mode is switched to the entire plane generation mode. When the local plane generation mode is terminated, the electric heater 33 is switched off.

In the entire plane generation mode in step S106, the entire plane power generation as explained above is performed. When the operation proceeds to step S105, the operation mode is shifted to an abnormal state handling mode, and the operation of this flow is then terminated.

In the above control for starting the fuel cell, the typical temperature in the fuel cell 1 is referred to for determining whether the local plane generation mode is started, and whether the mode is shifted to the entire plane generation mode. However, these determinations may be performed based on the entire output voltage of the fuel cell 1.

Also in the above control, the electric heaters 33 of all cells 500 are switched on when the local plane generation mode is started. However, the determination whether the electric heater 33 should be switched on may be performed for each cell 500, or each group (or module) of plural cells 500. In this case, the cells 500 which require heating by the electric heater 33 can be detected, thereby reducing energy consumption in the local plane generation mode.

If the determination whether the electric heater 33 should be switched on is performed for each cell 500, a temperature sensor 34 is provided in each cell 500. Accordingly, the temperature of the local generation area K1 of each cell 500 is independently measured, and only for the cell(s) whose temperature of the local generation area K1 is determined to be below 0° C., the electric heater 33 is switched on. When the temperature of the local generation area K1 of the relevant cell reaches 2° C., the electric heater 33 is switched off.

If the determination whether the electric heater 33 should be switched on is performed for each cell group including plural cells, a temperature sensor 34 is provided in each cell group. Accordingly, only for the group(s) whose temperature of the local generation area K1 is determined to be below 0° C., the electric heater 33 of each cell 500 which belongs to the relevant groups is switched on. When the temperature of the local generation area K1 of each relevant group reaches 2° C., the corresponding electric heaters 33 are switched off.

If the temperature sensor 34 is provided for each cell 500 or each cell group as explained above, an energy saving mode as explained below may be used for controlling the ON/OFF operation of the electric heater 33 based on the remaining power of a battery (not shown).

First, when the local plane generation mode is started, it is determined whether the battery stores electric power sufficient for maintaining the operation of the fuel cell 1 even if all the electric heaters 33 are switched on. If the result of the determination is "YES", the electric heaters 33 are controlled using a normal control method, while the result of the determination is "NO", the electric heaters 33 are controlled using an energy saving mode.

In the energy saving mode, typically, the rate of the voltage decrease is calculated for each cell 500. If each cell 500 is independently controlled, the electric heater 33 of each cell 500 whose rate of the voltage decrease is positive (i.e., the voltage has decreased) is switched on, and the electric heater 33 of each cell whose rate of the voltage decrease is negative (i.e., the voltage has not decreased) is switched off.

If each cell group (consisting of plural cells) is independently controlled, the electric heaters 33 of the cells of each cell group, which includes at least one cell 500 whose rate of the voltage decrease is positive (i.e., the voltage has decreased), are switched on, and the electric heaters 33 of the cells of each cell group, in which all the cells have a negative rate of the voltage decrease, are switched off. According to the above control, the energy consumption in the local plane generation mode can be further reduced.

In the above explanation, the area of the electric heater 33 is provided over the area where the reaction gas passages C1 and A1 overlap with each other. However, the electric heater 33 may be provided for only a portion of the above overlap area, for example, a central portion.

The position of each electric heater 33 is also not limited to be in the cooling liquid passage R, and the electric heater 33 may be embedded in each separator (6 or 7).

In the local plane generation mode, the hydrogen gas may be supplied to both the upper and lower reaction gas passages A1 and A2, and air may be supplied to both the upper and lower reaction gas passages C1 and C2. In this case, the power generation is started from the local generation area K1 whose temperature is increased by the electric heater 33, and the corresponding self heating and the heat by the electric heater 33 are conducted over the entire generation plane, thereby starting the generation of the lower area.

Figure 22:
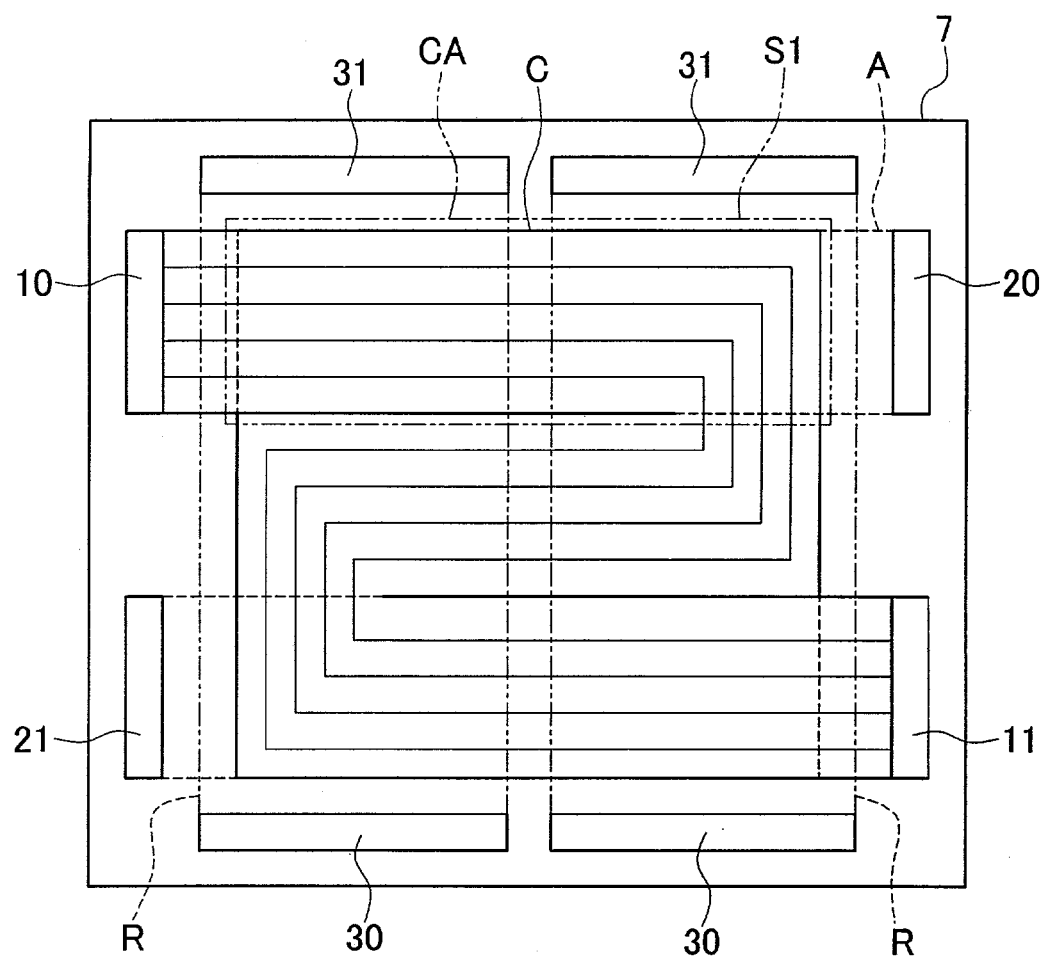
FIG. 22 is a plan view showing a separator of the fuel cell as a variation of the eighth embodiment.

Instead of the structure shown in FIG. 1, a structure shown by FIG. 22 may be employed. This structure has reaction gas passages C and A formed in a zigzag, and the reaction gas passages C and A have a crossing positional relationship (refer to FIG. 14). Here, the oxidizing gas inlet communication hole 10 and the fuel gas inlet communication hole 20 are provided in an upper portion, while the oxidizing gas outlet communication hole 11 and the fuel gas outlet communication hole 21 are provided in a lower portion. In this case, the local generation area K1 including an electric heater 33 may be an area where the reaction gas passages C and A overlap with each other in an upper horizontal section (see a rectangle CA enclosed by a chain double-dashed line). In addition, the local generation area K1 may be defined to be smaller or wider, so as to obtain similar effects.

Ninth Embodiment

The ninth embodiment will be explained with reference to FIGS. 23 and 24. The distinctive feature of this embodiment in comparison with the previous embodiment is the position of each electric heater.

Instead of providing the electric heater 33 in a part of the cooling liquid passage R, an electric heater is built in a stud bolt for fastening the stacked cells in the present embodiment.

Figure 23:
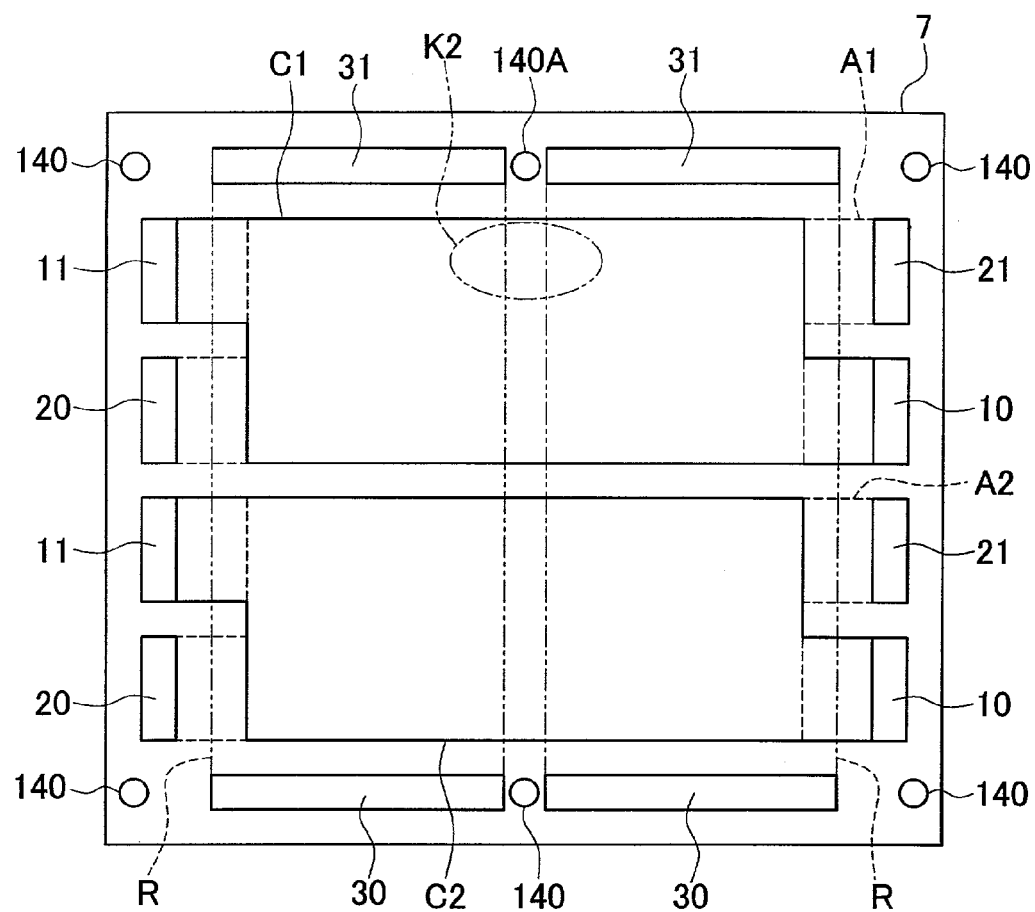
FIG. 23 is a plan view showing a separator of the fuel cell in the ninth embodiment according to the present invention.

FIG. 23 is a plan view of the separator 7 at the cathode. In the present embodiment, the stacked cells are fastened using stud bolts 140 (i.e., fastening bolts), which are provided at three positions in the upper side and the other three positions at the lower side. Among these six stud bolts 140, only one positioned at the center on the upper side, which is indicated by reference numeral 140A, includes an electric heater.

Figure 24:
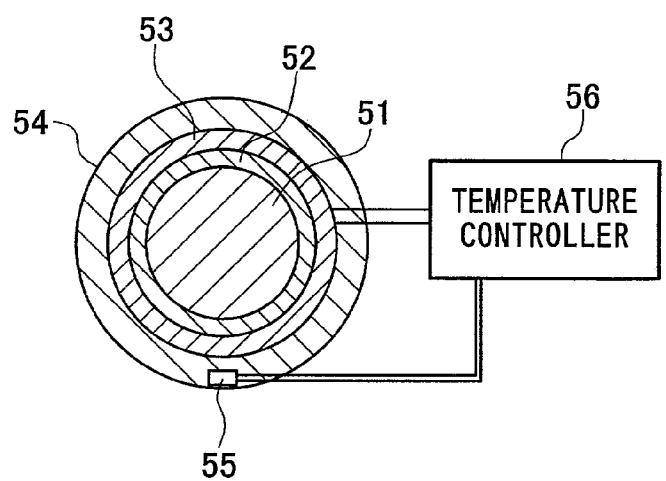
FIG. 24 is a cross-sectional view of the stud bolt in the fuel cell of the ninth embodiment.

FIG. 24 is a cross-sectional view of a stud bolt 140A. Reference numeral 51 indicates a base of the stud bolt, and an insulating layer 52 is formed around the outer-peripheral surface of the base 51. An electric heater 53 (i.e., heating device) is provided around the insulating layer 52, and another insulating layer 54 is further provided around the electric heater 53. The insulating layers 52 and 54 are provided for insulating between the electric heater 53, the base 51, and external portions (corresponding to the fuel cell 1 and the like), and for providing sufficient durability to the stud bolt; therefore, these insulating layers have a glass-fiber base and are formed using Teflon (a registered trademark, which is a resin) or the like. The outer insulating layer 54 includes a temperature sensor 55. The electric heater 53 and the temperature sensor 55 are connected to a temperature controller 56 for controlling the electric heater 53 in a manner such that the surface temperature of the stud bolt 140A, that is, the surface temperature of the insulating layer 54 is always within a predetermined temperature range (e.g., 50 to 70° C.).

In the local plane generation mode of the present embodiment, the electric heater 53 of the stud bolt 140A is switched on so as to heat the stud bolt 140A, so that in each cell 500, the peripheral area around the stud bolt 140A is heated. Therefore, the vicinity of the stud bolt 140A is defined as a local generation area K2.

In this embodiment in which the quick heating of the local generation area K2 generates a high-temperature portion, heat is generally conducted from the area K2 to the upper half of the entire generation plane, so that the local generation is performed and similar effects as obtained in the above embodiments can be obtained.

The number of the stud bolts 140A (which include electric heaters) may be 2 or more, and the position of the stud bolt 140A is not limited. Also in this case, the reaction gas passages may be formed in a zigzag (refer to FIG. 22).

Tenth Embodiment

The tenth embodiment will be explained with reference to FIGS. 25 and 26. The distinctive feature of this embodiment in comparison with the above eighth embodiment is a heating device for locally heating each cell 500. In the present embodiment, instead of the electric heater 33 in the eighth embodiment, a catalytic combustor is provided at a specific position in each cell, and catalytic combustion of oxygen (in the air) and hydrogen is performed in the catalytic combustor, so as to locally heat the vicinity of the catalytic combustor in cell 500.

Figure 25:
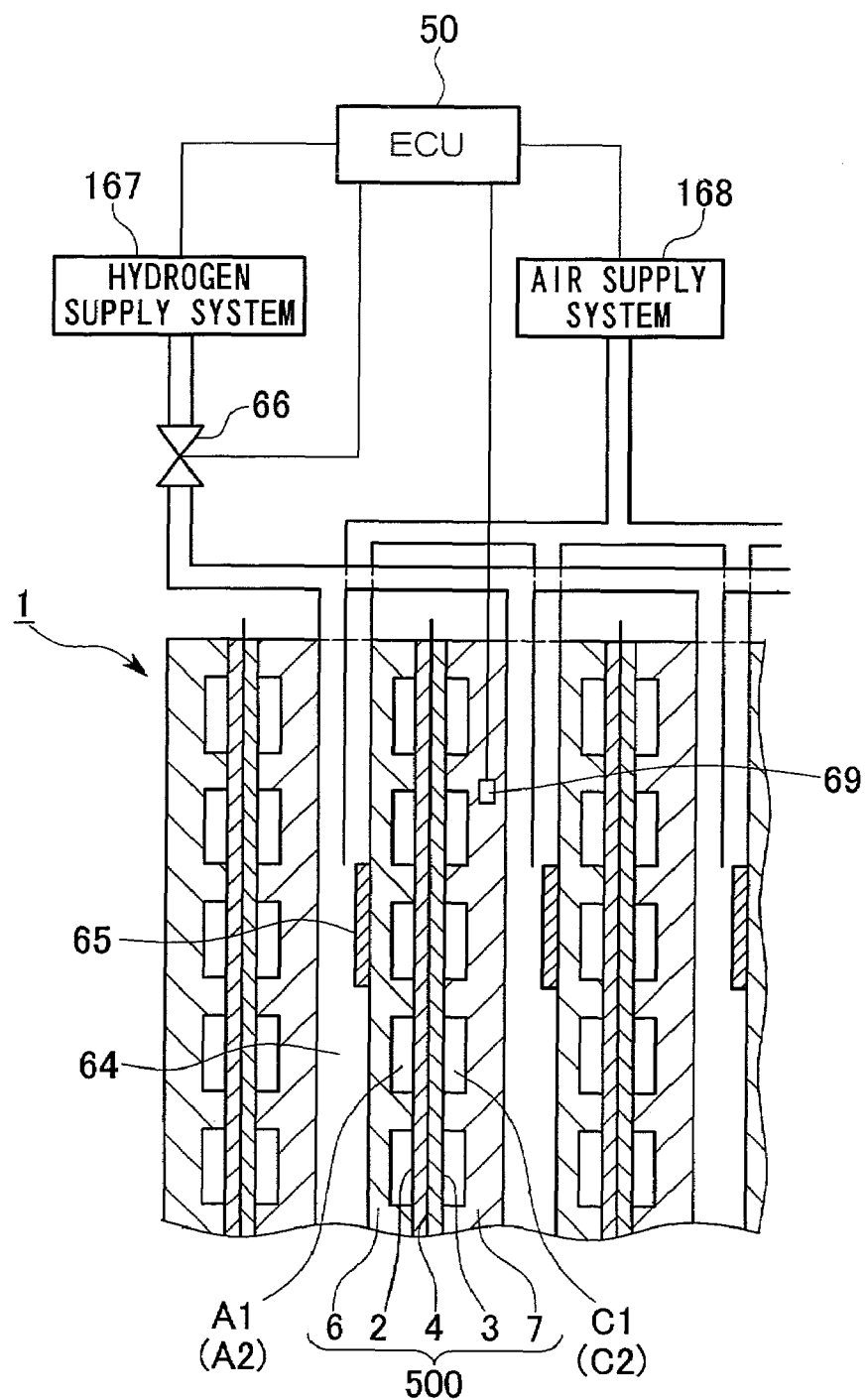
FIG. 25 is a longitudinal sectional view of the fuel cell as the tenth embodiment according to the present invention.
Figure 26:
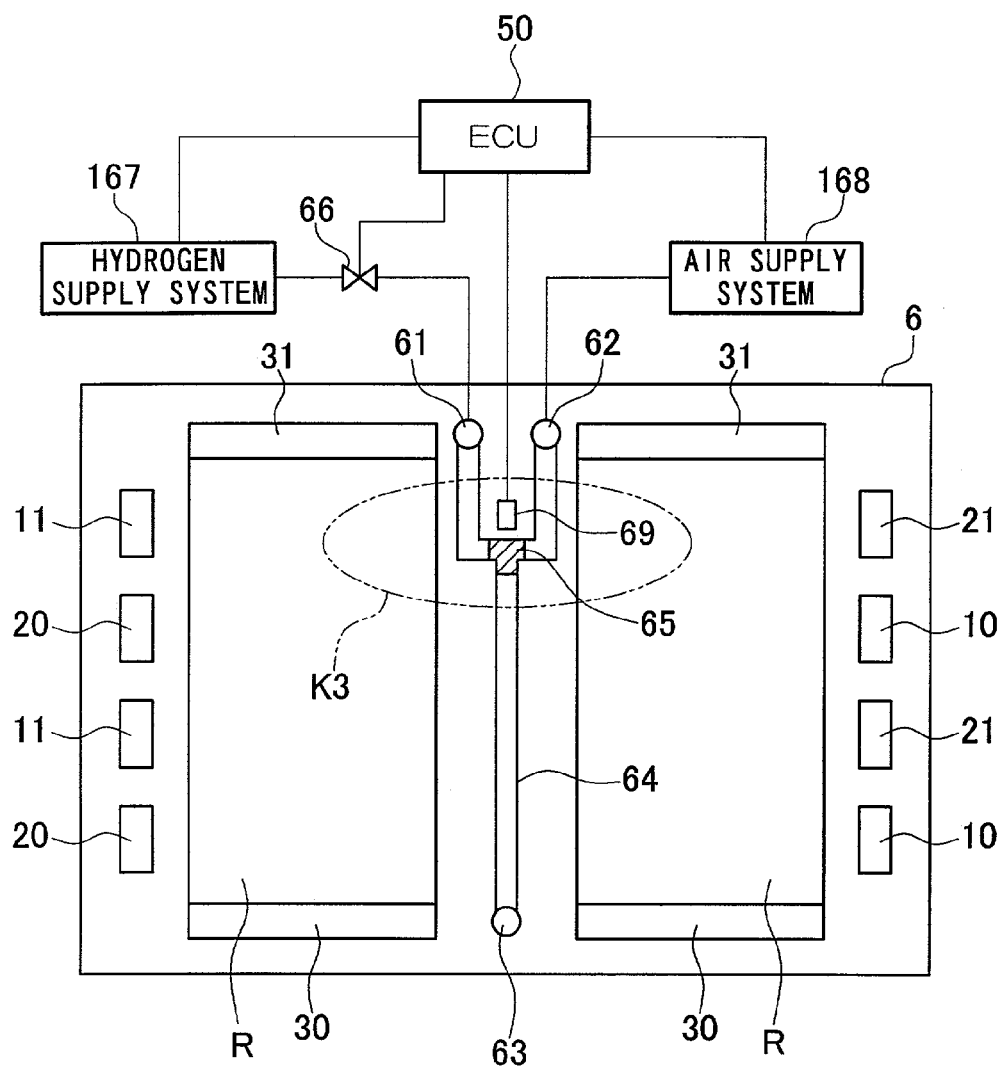
FIG. 26 is a plan view showing a separator of the fuel cell in the tenth embodiment.

FIG. 25 is a longitudinal sectional view of a portion of the fuel cell 1, which corresponds to FIG. 20. FIG. 26 is a plan view of the separator 6 at the anode, observed from the side where the cooling liquid passages R are formed.

Also in this embodiment, the fuel cell 1 has oxidizing gas inlet communication holes 10, oxidizing gas outlet communication holes 11, fuel gas inlet communication holes 20, fuel gas outlet communication holes 21, cooling liquid inlet communication holes 30, and cooling liquid outlet communication holes 31, and cooling liquid passages R and R are formed on one face of the separator 6. The other face of the separator 6 includes reaction gas passages A1 and A2, and the separator 7 has reaction gas passages C1 and C2, as explained in the eighth embodiment.

In the present embodiment, two communication holes 61 and 62 are formed between the cooling liquid outlet communication holes 31 and 31, where the communication holes 61 and 62 pass through the cell 500. In addition, a communication hole 63 is formed between the cooling liquid inlet communication holes 30 and 30, which also passes through the cell 500. The communication hole 61 is a hydrogen gas communication hole for supplying hydrogen, while the communication hole 62 is an air communication hole for supplying air. The communication hole 63 is a discharge communication hole for discharging combustion gas.

In the separator 6 of each cell 500, a gas passage 64 for communicating the hydrogen gas communication hole 61, the air communication hole 62, and the discharge communication hole 63 is provided between the cooling liquid passages R and R and in the face on which the passages R and R are formed. The gas passage 64 is formed in a manner such that the passages connected to the hydrogen gas communication hole 61 and the air communication hole 62 are joined, and the unified passage is connected to the discharge communication hole 63. On the inner wall surface of the joining portion of these passages (see the hatched portion in FIG. 26), a catalyst 65 (which functions as a catalytic combustor or a heating device) is adhered.

In addition, in one of the separators 7, a temperature sensor 69 for detecting a typical temperature of the fuel cell 1 is provided in the vicinity of the position (of the anode) at which the catalyst 65 is adhered. The temperature sensor 69 includes a thermistor or the like, and the signal output from the sensor is input into the ECU 50.

The hydrogen gas communication hole 61 is connected via a control valve 66 to a hydrogen supply system 167, and the air communication hole 62 is connected to an air supply system 168. The control valve 66, the hydrogen supply system 167, and the air supply system 168 are controlled by the ECU 50.

In comparison with the low-temperature starting mode of the above eighth embodiment, which uses the electric heater 33, in the low-temperature starting mode of the present embodiment, the hydrogen gas is supplied from the hydrogen supply system 167 to the hydrogen communication hole 61, while the air is supplied from the air supply system 168 to the air communication hole 62, so that the hydrogen gas drawn from the communication hole 61 into the gas passage 64 and the air drawn from the communication hole 62 into the gas passage 64 react by the catalyst 65 at the conjunction of the gas passage. According to the heat generated by the reaction, the vicinity of the conjunction is concentratedly heated. Therefore, a local generation area K3 can also be formed in the present embodiment, and similar function and effects can be obtained.

In addition, in the present embodiment of employing the catalytic combustion, a large quantity of thermal energy can be obtained, and the temperature increases very sharply. Therefore, in comparison with using the electric heater 33, quicker heating can be performed. Furthermore, hydrogen also functions as the fuel of the fuel cell 1; thus, a centralized fuel supply system can be established, thereby simplifying the system structure.

An example of the control for starting the fuel cell 1 will be explained with reference to the flowchart in FIG. 27.

Figure 27:
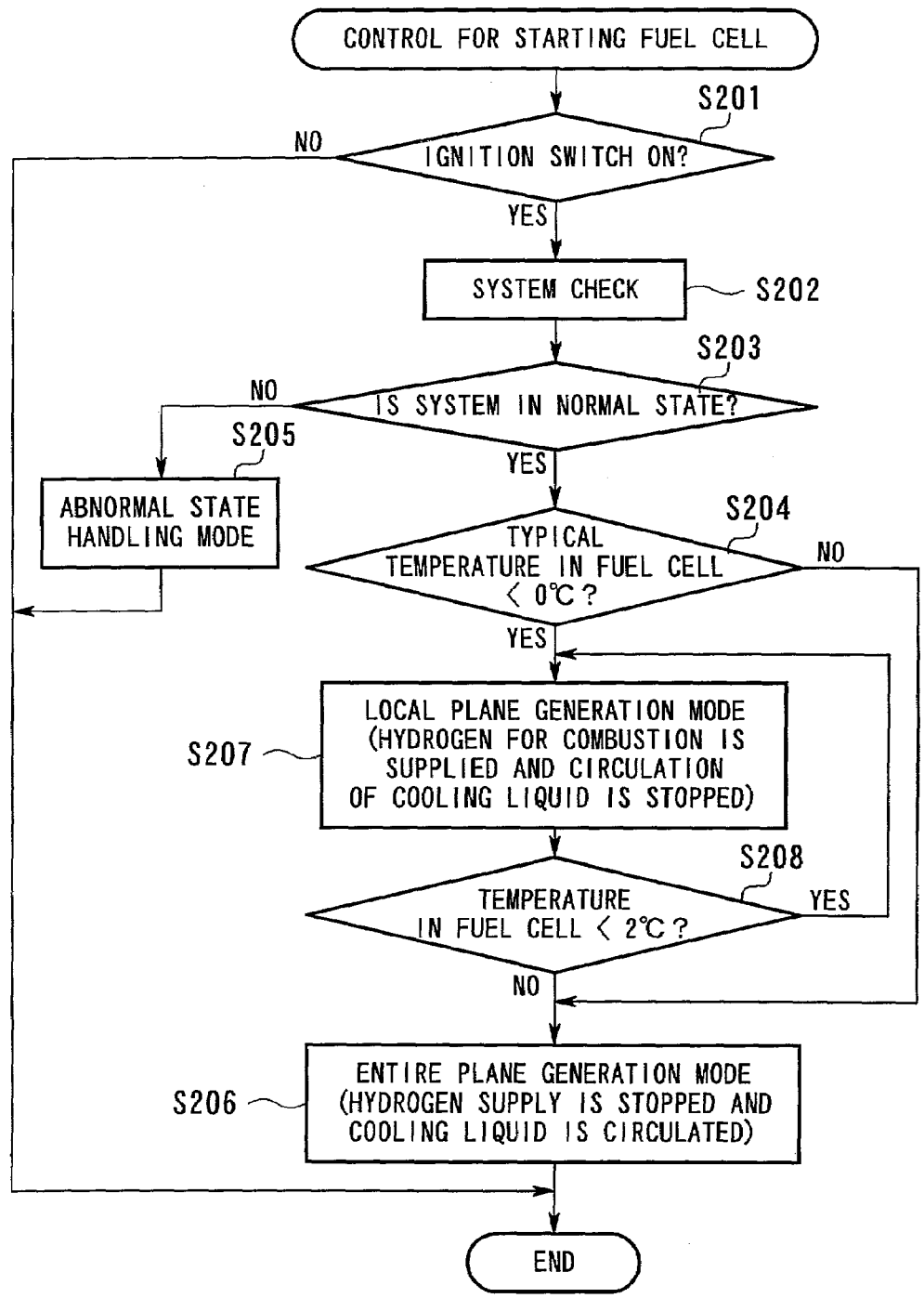
FIG. 27 is a flowchart showing an example of the control operation for starting the fuel cell in the tenth embodiment.

Steps S201 to S205 in FIG. 27 are the same as steps S101 to S105 in the eighth embodiment; thus, explanations thereof are omitted.

In the present embodiment, if the result of the determination in step S204 is "NO" and the entire plane generation mode is started in step S206, the supply of hydrogen for combustion from the hydrogen supply system 167 to the hydrogen gas communication hole 61 is stopped and the supply of air from the air supply system 168 to the air communication hole 62 is also stopped. Simultaneously, cooling liquid is made to flow through the cooling liquid passages R and R, the hydrogen gas is supplied to the reaction gas passages A1 and A2, and the air is supplied to the reaction gas passages C1 and C2, so that power generation using the entire generation plane of each cell 500 is performed.

If the result of the determination in step S204 is "YES" and the local plane generation mode is started in step S207, no cooling liquid is made to flow through the cooling liquid passages R and R, and hydrogen and air are respectively supplied to only the reaction gas passages A1 and C1 formed in the upper half of each cell 500. Simultaneously, air for combustion is supplied from the air supply system 168 to the air communication hole 62 and hydrogen for combustion is supplied from the hydrogen supply system 167 to the hydrogen communication hole 61, thereby performing the local generation in the local generation area K3. In accordance with the typical temperature in the fuel cell 1, the amount of hydrogen supplied for combustion is determined by the ECU 50 which refers to a data map which is defined and stored in a memory in advance. Based on the determined amount of hydrogen supply, the ECU 50 performs flow control using the control valve 66.

In step S208, it is determined whether the typical temperature in the fuel cell 1 is lower than a predetermined temperature which is 0° C. or above. Here, this predetermined temperature is 2° C. If the result of the determination is "YES" (i.e., below 2° C.), the operation returns to step S207 and the local plane generation is continued, while if the result of the determination is "NO" (i.e., equal to or above 2° C.), the operation proceeds to step S206 and the entire plane generation is performed.

In the above control for starting the fuel cell 1, the typical temperature in the fuel cell 1 is referred to for determining whether the local plane generation mode is started, and whether the mode is shifted to the entire plane generation mode. However, these determinations may be performed based on the entire output voltage of the fuel cell 1. This variation may also be applied to a similar embodiment which employs a local plane generation mode.

Also in the above control, the entire plane generation mode is started if the typical temperature of the fuel cell 1 is higher than 0° C. However, even when the typical temperature of the fuel cell 1 is above 0° C., if the temperature is relatively low (e.g., 15° C. or below), gentle warming up of the fuel cell 1 may be performed by supplying a small amount of hydrogen and air for combustion to the gas passage 64, so as to increase the temperature of the fuel cell 1. Such gentle warming up may be performed when at least one cell 500 has voltage decrease, in addition to the above condition for executing the gentle warming up.

Similar to the eighth embodiment, hydrogen and air may be supplied to the entire reaction gas passages (A1, A2, C1, and C2) in the local plane generation mode, and the shape of each reaction gas passage may be freely modified.

Eleventh Embodiment

The eleventh embodiment will be explained with reference to FIGS. 28 and 29. The structure of this embodiment is very similar to that of the previous embodiment. The distinctive feature of the present invention in comparison with the previous (i.e., tenth) embodiment is that an oxidizing and reducing agent is provided at a specific area of each cell 500, so as to locally heat the cell 500 by using heat generated when the oxidizing and reducing agent is oxidized by oxygen.

Figure 28:
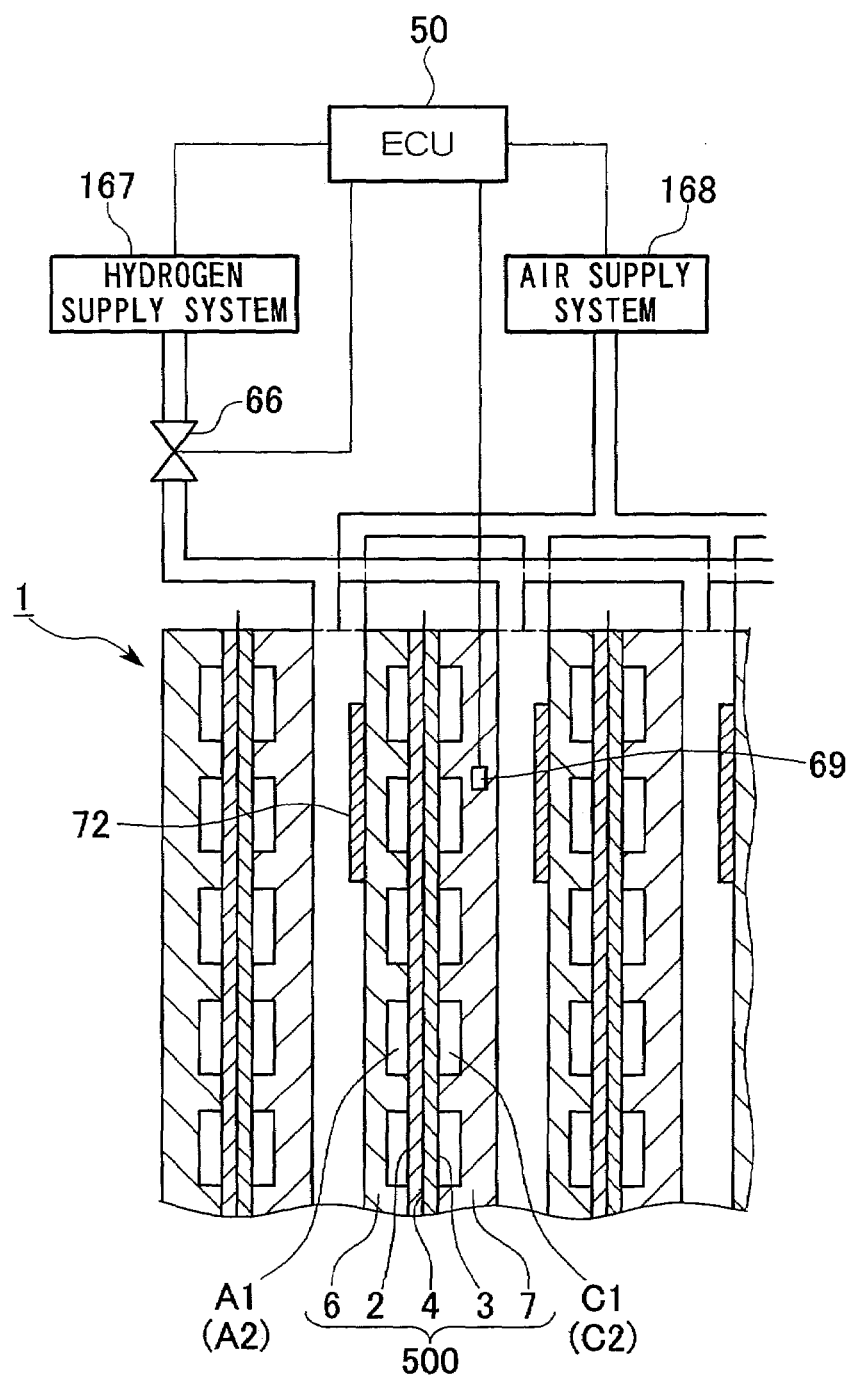
FIG. 28 is a longitudinal sectional view of the fuel cell as the eleventh embodiment according to the present invention.
Figure 29:
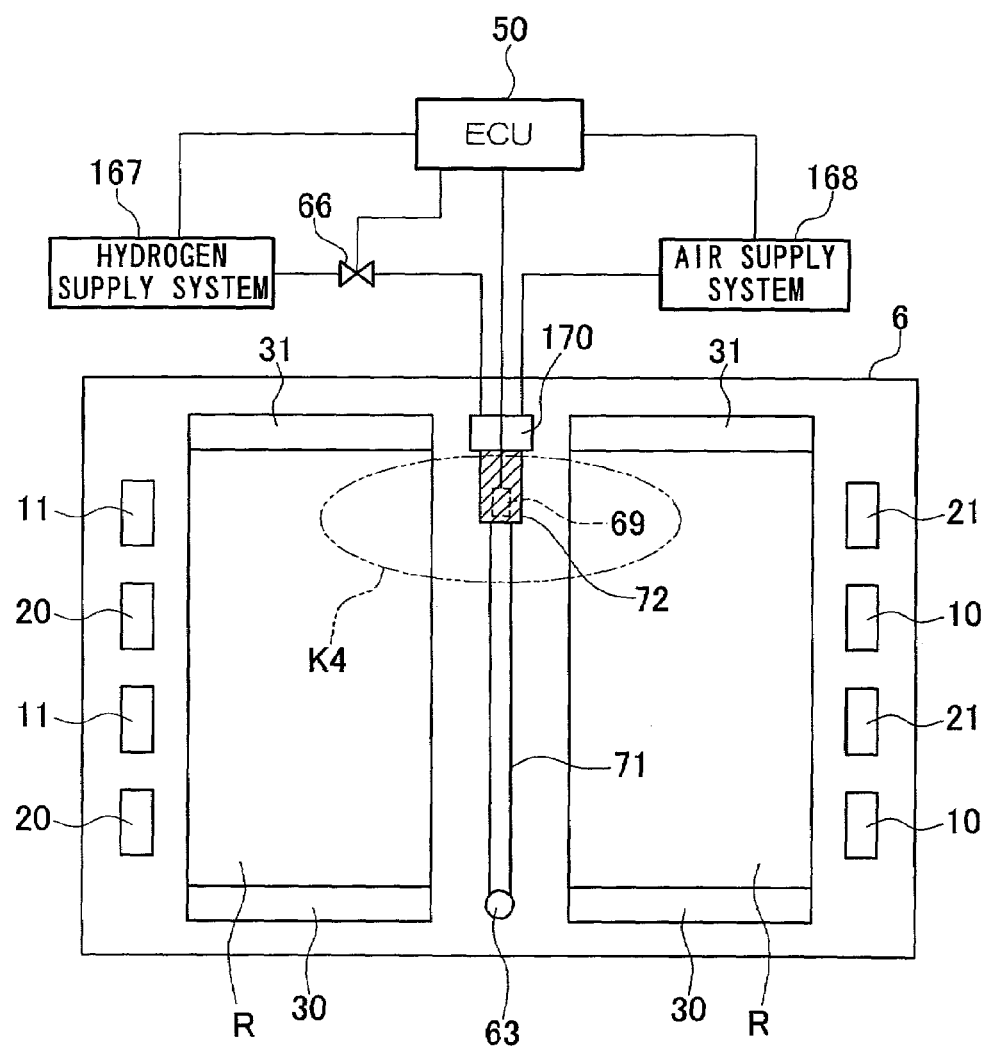
FIG. 29 is a plan view showing a separator of the fuel cell in the eleventh embodiment.

FIG. 28 is a longitudinal sectional view corresponding to FIG. 25 in the tenth embodiment, which shows a portion of the fuel cell 1 of the present embodiment. FIG. 29 also corresponds to FIG. 26 in the tenth embodiment.

In the present embodiment, a communication hole 170 passing through the cell 500 is formed between the cooling liquid outlet communication holes 31 and 31. This gas communication hole 170 is connected to the hydrogen supply system 167 and the air supply system 168. In the separator 6, a gas passage 71 for connecting the gas communication hole 170 and the discharge communication hole 63 is provided between the cooling liquid passages R and R. On the inner wall surface of a portion of the upstream of the gas passage 71, that is, in the vicinity of the gas communication hole 170, an the oxidizing and reducing agent 72 (i.e., heating device) is adhered (see the hatched portion in FIG. 29).

In the local generation mode of the previous embodiment, hydrogen and air are simultaneously supplied to the gas passage 64 so as to make them react by the catalyst at the junction of the passage. However, in the local generation mode of this embodiment, only air is supplied to the gas communication hole 170 from the air supply system 168, that is, hydrogen is not supplied to the communication hole 170. Accordingly, the air supplied to the gas communication hole 170 is drawn into the gas passage 71 of each cell 500, and the oxidizing and reducing agent 72 at the upstream of the passage 71 reacts with oxygen in the supplied air, so that heat, which is generated by the reaction, locally heats the vicinity of the area where the oxidizing and reducing agent 72 is adhered in the upstream of the gas passage 71. Therefore, also in the eleventh embodiment, a local generation area K4 can be provided and similar effects to those obtained by the tenth embodiment can be obtained.

In the eleventh embodiment, when the local plane generation mode is terminated, the air supply to the gas communication hole 170 is stopped, and a specific amount of hydrogen is supplied from the hydrogen supply system 167 to the gas communication hole 170. Accordingly, the oxidizing and reducing agent 72 reacts with hydrogen and returns to the original agent. In this process, the oxidizing and reducing agent 72 receives heat.

Twelfth Embodiment

Figure 30:
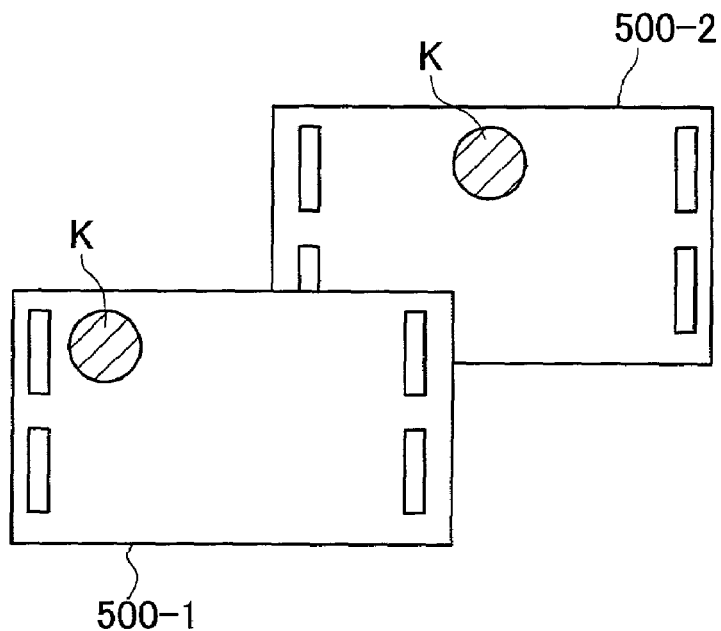
FIG. 30 is a plan view showing a positional relationship of the local generation area K between the adjacent cells in the twelfth embodiment according to the present invention.
Figure 31:
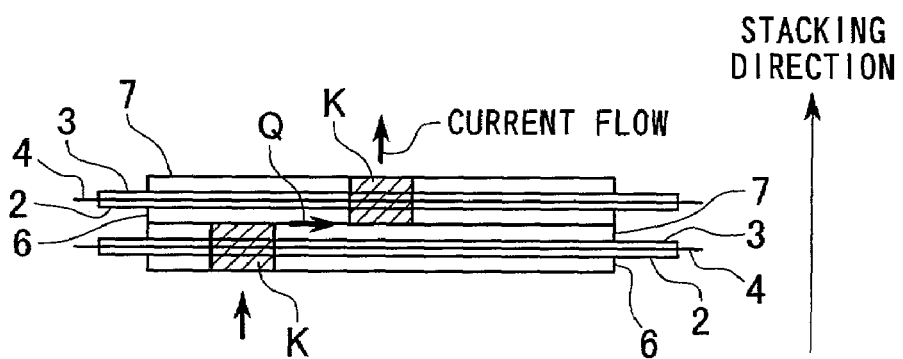
FIG. 31 is a sectional view showing the direction of current which flows between the adjacent cells in the twelfth embodiment.

The twelfth embodiment will be explained with reference to FIGS. 30 and 31.

In the above embodiments, the local generation area is defined at the same position in each cell 500. However, in this embodiment, the local generation area K is defined at a different position between the adjacent cells 500. In FIG. 30, reference numeral 500-1 indicates an Xth cell 500, and reference numeral 500-2 indicates an (X+1)th cell 500. Accordingly, when current flows between these cells 500 in the local plane generation mode, the current flows between the separators 6 and 7 in a direction perpendicular to the stacking direction of the cells 500 (i.e., the direction in which the cells are stacked), as shown by arrow Q in FIG. 31. Therefore, Joule heat corresponding to a (thermal) loss produced by the electric resistance of the separators 6 and 7 is generated, thereby further promoting the warming up of the fuel cell 1.

The method of providing the local generation area K is not limited; however, using an electric heater as is used in the eighth embodiment is most preferable, and a catalytic combustor or an oxidizing and reducing agent may be used, as is used in the tenth and eleventh embodiments.

All the adjacent cells may define a different position for the local generation area K, or the position may be different for each group or module of cells.

Thirteenth Embodiment

Figure 33:
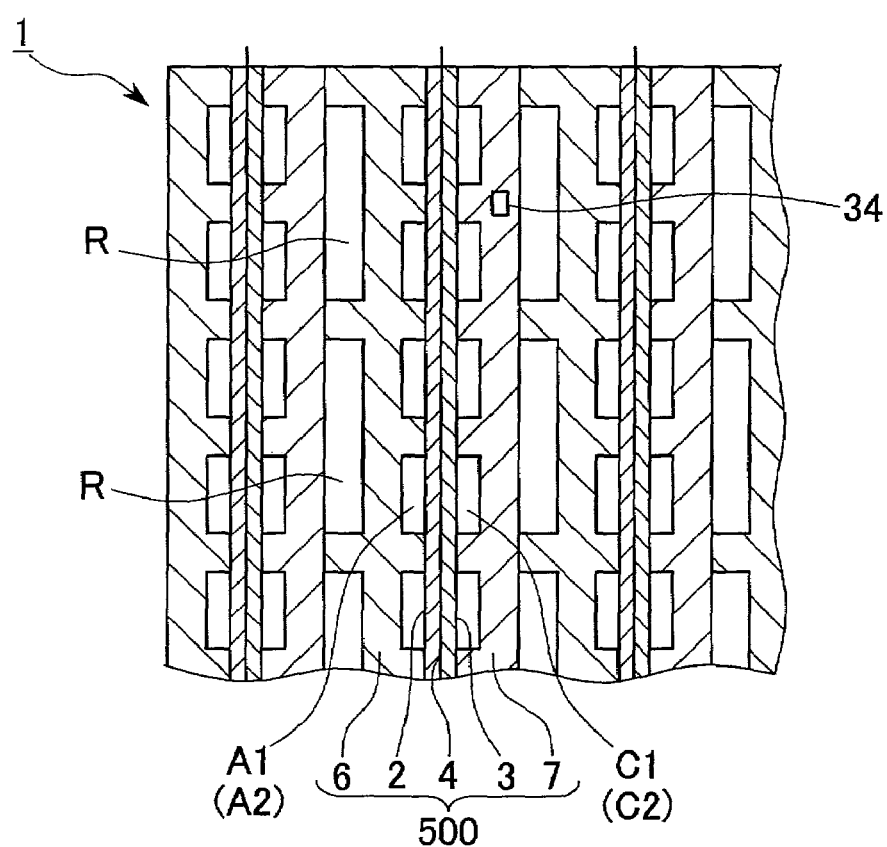
FIG. 33 is a longitudinal sectional view of the fuel cell in the thirteenth embodiment.
Figure 34:
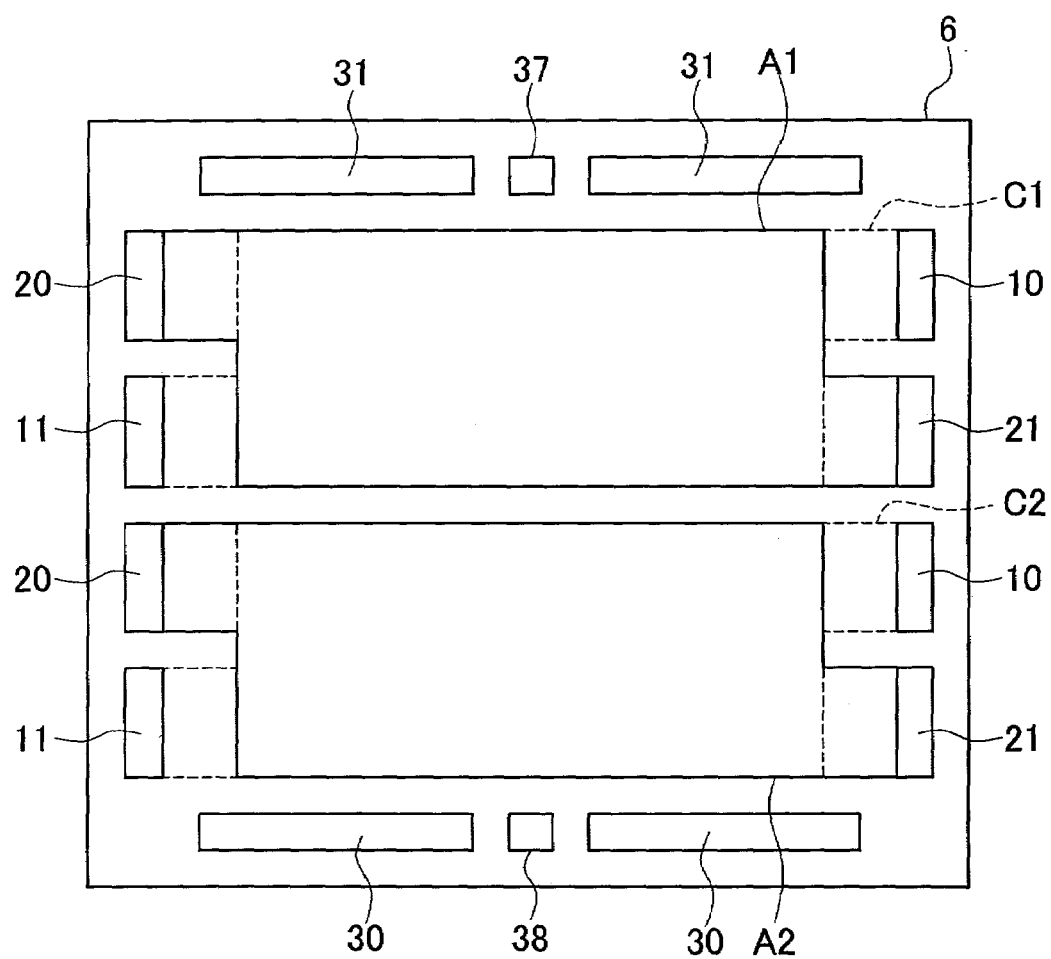
FIG. 34 is a rear view showing the separator at the anode in the thirteenth embodiment.

The structure of the thirteenth embodiment will be explained with reference to FIGS. 32 to 34.

Figure 32:
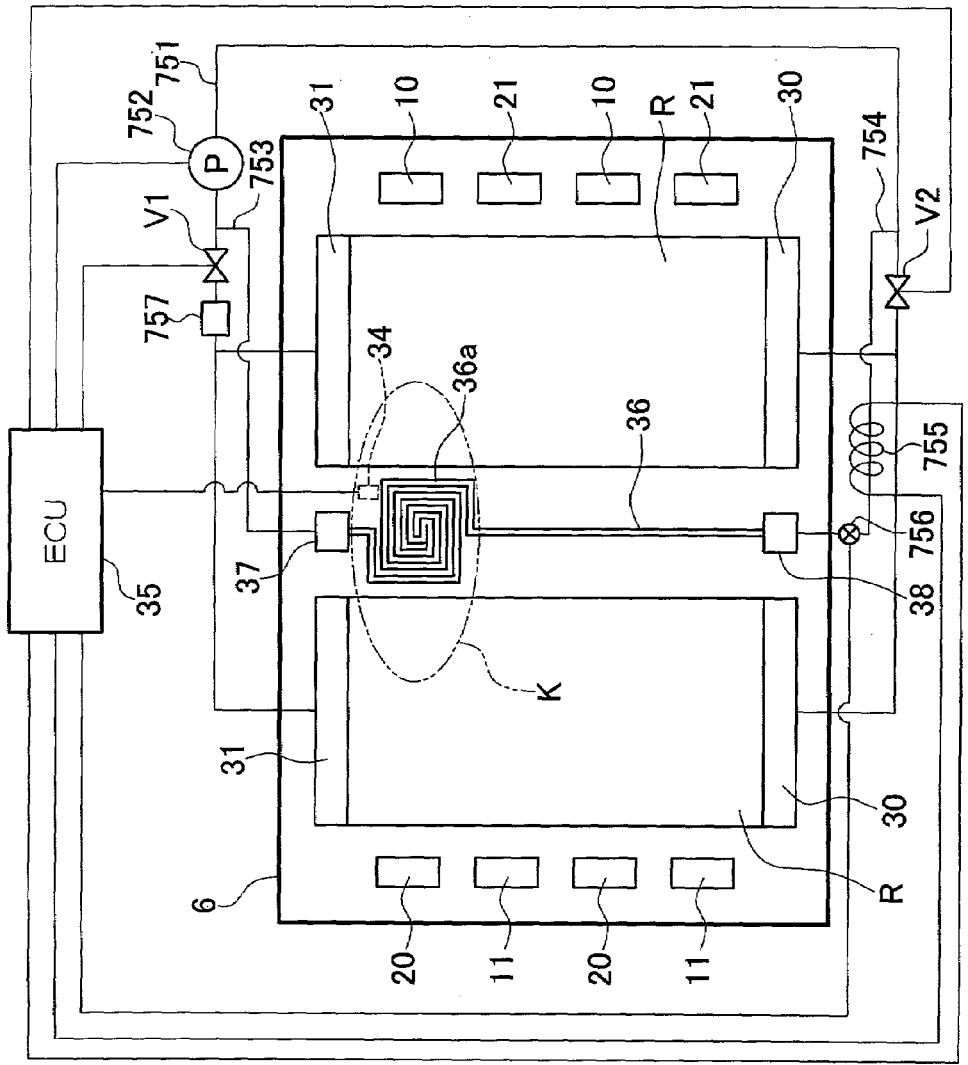
FIG. 32 is a plan view showing a separator at the anode of the fuel cell in the thirteenth embodiment according to the present invention.

FIG. 32 is a plan view of the separator 6 at the anode, observed from the side where the cooling liquid passages R and R are formed. FIG. 33 is a longitudinal sectional view of a portion of the fuel cell 1. FIG. 34 is a plan view of the separator 6, observed from the side where the reaction gas passages A1 and A2 are formed. A cooling liquid circuit and a control system are also shown in FIG. 32, and the reaction gas passages C1 and C2 corresponding to the reaction gas passages A1 and A2 are also shown by dashed lines in FIG. 34.

In the fuel cell 1, the oxidizing gas inlet communication holes 10, the oxidizing gas outlet communication holes 11, the fuel gas inlet communication holes 20, the fuel gas inlet communication holes 21, the cooling liquid inlet communication holes 30, and the cooling liquid outlet communication holes 31 pass through the cells 500 in the stacking direction of the cells.

In this embodiment, in addition to the cooling liquid passages R and R, a second cooling liquid passage 36 is formed on the same face of the anode of each cell 500. The cooling liquid may be pure water, ethylene glycol, oil or the like. As shown in FIG. 33, cooling liquid passes along both the back faces of the separators 6 and 7.

A cooling liquid inlet communication hole 38 and a cooling liquid outlet communication hole 39, provided at either side of the second cooling liquid passage 36, also pass through the cells 500. Therefore, three cooling liquid passages (i.e., right, center, and left) are formed in this fuel cell 11, and cooling liquid supplied to each of the inlet communication holes 30, 38, and 30 are drained from each of the outlet communication holes 31, 37, and 31.

The second cooling liquid passage 36 between the cooling liquid passages R and R has a labyrinth passage 36a having a spiral form in the vicinity of the cooling liquid outlet communication hole 37. This labyrinth passage 36a is provided for increasing the passage length of this area and increasing the residence time of the cooling liquid. The position of the labyrinth passage 36a is in the upper half of the separator 6, that is, in an area corresponding to the upper reaction gas passages A1 and C1.

The cooling liquid passages R and R, and the second cooling liquid passage 36 cover almost the entirety of the area where the reaction gas passages A1 and C1 overlap with each other and the reaction gas passages A2 and C2 overlap with each other. This overlap area functions as the generation plane.

In the present embodiment, a temperature sensor 34 is provided in each unit module which includes a specific number of cells. As shown in FIG. 33, the temperature sensor 34 is provided in the separator 7 of one cell in the unit module. As shown in FIG. 32, the temperature sensor 34 is positioned in the vicinity of the labyrinth passage 36a, so as to measure the temperature of the vicinity of the labyrinth passage 36a. The signal output from the temperature sensor 34 is input into an ECU 35 for controlling the fuel cell 1. The ECU 35 is operated by electric power stored in a battery (not shown).

The cooling liquid inlet communication holes 30 and 30 are connected via a first cooling liquid (circulating) circuit 751 to the cooling liquid outlet communication holes 31 and 31. The first cooling liquid circuit 751 has a pump 752, control valves V1 and V2 attached at the upstream and downstream of the pump 752, and a radiator 757 provided between the control valve V2 and the cooling liquid outlet communication holes 31 and 31.

The control valves V1 and V2 function as switching devices for controlling the passages for cooling liquid. When the control valves V1 and V2 are opened, the circulation of the cooling liquid through the communication holes 30 and 31 is permitted, so that the cooling liquid passes through the cooling liquid passages R and R. When the control valves V1 and V2 are closed, the circulation of the cooling liquid through the communication holes 30 and 31 is prohibited, so that the cooling liquid does not pass through the cooling liquid passages R and R.

A cooling liquid passage 753 is connected between the pump 752 and the control valve V1, and the cooling liquid passage 753 is connected to the cooling liquid outlet communication hole 37. In addition, a cooling liquid passage 754 is connected between the pump 752 and the control valve V2, and the cooling liquid passage 754 is connected to the cooling liquid inlet communication hole 38. Accordingly, the second cooling liquid passage 36 is connected via the communication holes 37 and 38 and the cooling liquid passages 753 and 754 to the first cooling liquid circuit 751 in parallel to the cooling liquid passages R and R.

The cooling liquid can always pass through the cooling liquid passages 753 and 754 regardless of the opening/closing states of the control valves V1 and V2; thus, while the pump 752 is driven, the cooling liquid flows through the second cooling liquid passage 36 via the communication holes 38 and 37. In the present embodiment, the cooling liquid passages 753 and 754 are constituents of a second cooling liquid (circulating) circuit.

An electric heater 755 (i.e., heating device) is provided at a portion of the cooling liquid passage 754, so that the cooling liquid passing through the cooling liquid passage 754 can be heated by switching on the electric heater 755. This electric heater 755 is controlled by the ECU 35 so that the temperature of the cooling liquid which flows through the cooling liquid passage 754 can be controlled.

In addition, a temperature sensor 756 for detecting the temperature of the cooling liquid which flows through the cooling liquid passage 754 is attached to the cooling liquid passage 754, where the position of the temperature sensor 756 is between the electric heater 755 and the cooling liquid inlet communication hole 38. The signal output from the temperature sensor 756 is input into the ECU 35.

In the entire plane generation mode of the present embodiment, while the entire plane generation as explained above is performed, the cooling liquid is made to flow through all the cooling liquid passages R and R, and the second cooling liquid passage 36. That is, the pump 752 is driven and the control valves V1 and V2 are opened so as to supply cooling liquid to the cooling liquid inlet communication holes 30, 38, and 30. The flows of the cooling liquid pass through the cooling liquid passages R, 36, and R and are then discharged from the corresponding outlet communication holes 31, 37, and 31. Accordingly, the entire generation plane of each cell is cooled by the cooling liquid during the entire plane generation.

In this entire plane generation mode, the radiator 757 provided in the first cooling liquid circuit 751 is driven so as to cool the cooling liquid, and the electric heater 755 is switched off so as not to heat the cooling liquid flowing through the cooling liquid passage 754.

On the other hand, in the local plane generation mode of the present embodiment, while the local plane generation as explained above is performed by using only the upper half of the entire plane, the pump 752 is driven and the control valves V1 and V2 are closed, so that the cooling liquid cannot pass through the cooling liquid inlet and outlet communication holes 30 and 31. Therefore, no cooling liquid flows through the cooling liquid passages R and R, and the cooling liquid in the first cooling liquid circuit 751 circulates in a closed circuit of "pump 752→first cooling liquid circuit 751→cooling liquid passage 754→cooling liquid inlet communication hole 38→second cooling liquid passage 36→cooling liquid outlet communication hole 37→cooling liquid passage 753→first cooling liquid circuit 751→pump 752". Therefore, in this process, no cooling liquid passes through the radiator 757; thus, the cooling liquid is not cooled. Also in this local plane generation mode, the electric heater 755 is switched on, so as to heat the cooling liquid passing through the cooling liquid passage 754.

Accordingly, the cooling liquid heated by the electric heater 755 flows upward only through the second cooling liquid passage 36, so that the vicinity of the labyrinth passage 36a, where the residence time of the cooling liquid is long, is concentratedly heated. The heat is conducted via the separators 6 and 7 to the relevant areas of the anode 2, the cathode 3, and the solid polymer electrolyte membrane 4, and these areas are quickly heated. Therefore, also in the present embodiment, a local generation area K is formed in the vicinity of the labyrinth passage 36a.

The quantity of heating using the electric heater 755 for heating the cooling liquid is controlled so as to satisfy the above-explained formula (2), thereby avoiding freezing of water generated in the fuel cell during power generation. Therefore, the temperature of the local generation area K of each cell 500 can be 0° C. or more before the fuel cell 1 is stopped due to voltage decrease caused by the frozen generated water, that is, before the output voltage of the fuel cell 1 decreases to the limit voltage at which the fuel cell can operate. Accordingly, the power generation in the local generation are K can be maintained; thus, the generation of the fuel cell 1 can be continued even if the temperature of the other portion (e.g., the lower half of each cell 500) is below the freezing point.

The heat generated by the self heating of the local generation area K and the heat of the heated cooling liquid in the labyrinth passage 36a gradually expand, so that the area where the power generation can be performed increases and the fuel cell 1 can be quickly warmed up, as explained in the above embodiments.

Additionally, in comparison with the case in which heated cooling liquid is made to flow through the cooling liquid passages R and R so as to heat the entire plane of each cell 500, the local plane generation mode which targets the local generation area K requires less energy, thereby suppressing power consumption in the local plane generation mode.

When a preprocess (such as preheating) performed before starting the operation of the fuel cell is executed, only the local generation area K must be prepared; thus, energy consumption for the preprocess can be reduced.

Also in this embodiment, only one pump 752 is necessary; thus, the increase of the number of necessary parts and the cost can be suppressed.

An example of the control for starting the fuel cell 1 in this embodiment will be explained with reference to the flowchart in FIG. 35.

Figure 35:
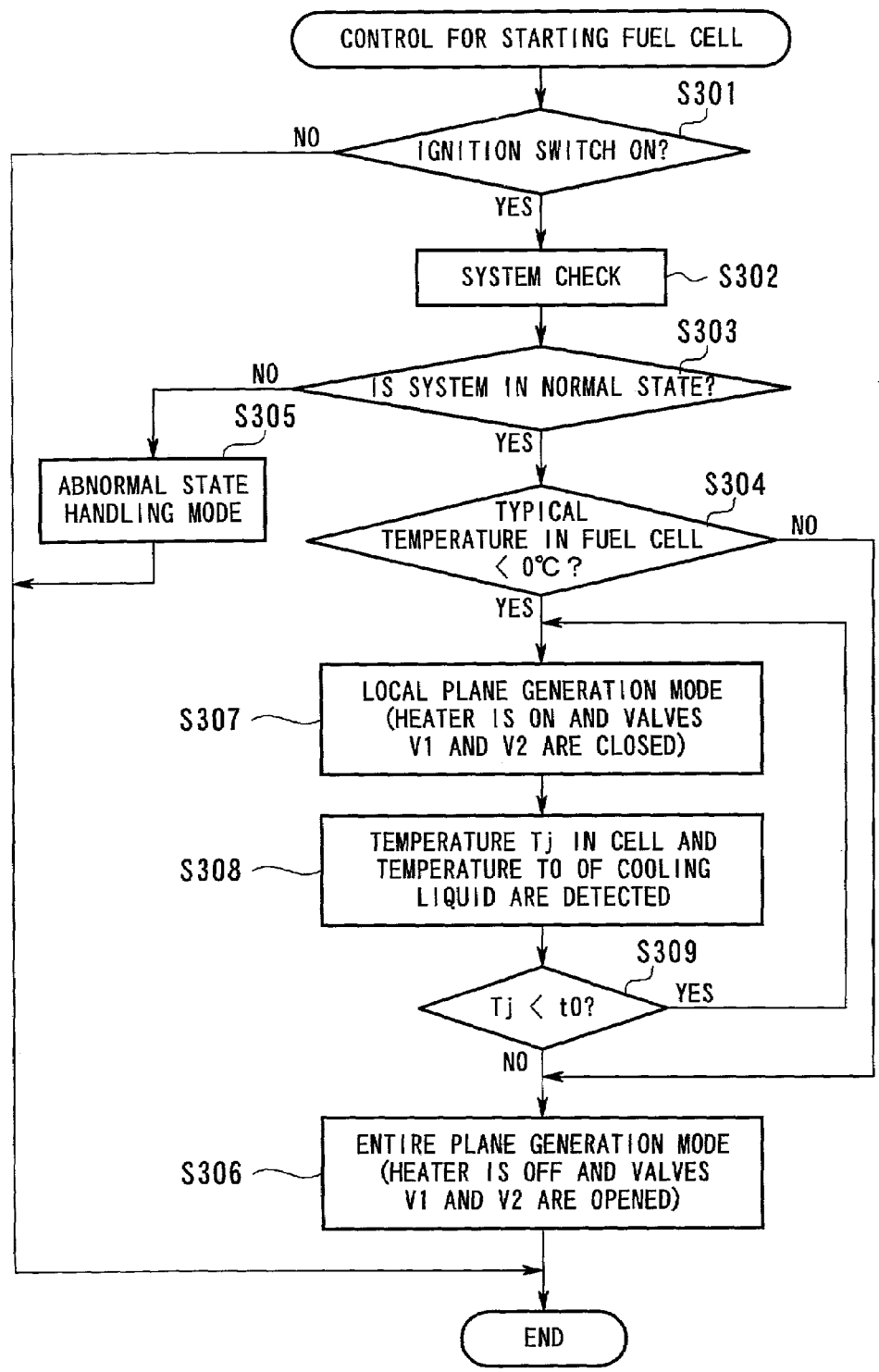
FIG. 35 is a flowchart showing an example of the control operation for starting the fuel cell in the thirteenth embodiment.

Steps S301 to S303, and S305 in FIG. 35 are the same as steps S101 to S103, and S105 in the eighth embodiment; thus, explanations thereof are omitted.

In step S304, a temperature Tjt detected by one of the temperature sensors 34 provided for each unit module (of the cells) is referred to as a typical temperature in the local generation area K of the fuel cell 1, and it is determined whether this temperature Tjt is below 0° C. If the result of the determination is "NO" (i.e., 0° C. or above), the operation proceeds to step S304 and the entire plane generation mode is started.

If the result of the determination in step S304 is "YES" (i.e., below 0° C.), the local plane generation mode is started in step S307 and the above-explained local plane generation is performed, in which (i) hydrogen and air are supplied to only the upper reaction gas passages A1 and C1, (ii) the control valves V1 and V2 are closed so as to make the cooling liquid not to flow through the cooling liquid passages R and R but to flow only through the second cooling liquid passage 36, and (iii) the electric heater 755 is switched on so as to circulate the heated cooling liquid through the second cooling liquid passage 36. The output of the electric heater 755 is controlled by ECU 35 so as to set the temperature of the cooling liquid supplied to the second cooling liquid passage 36 to a predetermined temperature (e.g., 70° C.) or below.

In the following step S308, temperature T0 of the cooling liquid, measured by the temperature sensor 756, and temperature Tj of the local generation area K in each unit module (of the cells), measured by the temperature sensor 34, are stored in a memory of ECU 35, and the operation proceeds to step S309.

In step S309, it is determined whether the temperature Tj of the local generation area K of each unit module is lower than the temperature T0 of the cooling liquid. If the result of the determination is "YES" (i.e., Tj<T0), the operation returns to step S307, while if the result of the determination is "NO" (i.e., Tj≧T0), the operation proceeds to step S306. That is, the local power generation for warming up the fuel cell 1 is continued until the temperature Tj of the local generation area K of each unit module reaches the temperature T0 of the cooling liquid which passes through the second cooling liquid passage 36. When the temperature Tj of the local generation area K of each unit module reaches the temperature T0, the local plane generation mode is terminated and the mode is shifted to the entire plane generation mode. When the local plane generation mode is terminated, the electric heater 755 is switched off and the control valves V1 and V2 are opened.

In the entire plane generation mode in step S306, the above-explained entire plane generation is performed, that is, (i) the control valves V1 and V2 are opened so as to make the cooling liquid pass through the three cooling liquid passages R, 36, and R, (ii) hydrogen and air is supplied all the reaction gas passages A1, A2, C1, and C2, and (iii) the electric heater 755 is switched off.

Instead of comparing the temperature Tj of the local generation area K of each module with the temperature T0 of the cooling liquid, the typical temperature in the fuel cell 1 may be compared with a specific temperature so as to determine whether the local plane generation mode is continued or whether the mode is shifted to the entire plane generation mode.

In addition, the temperature sensor 34 may be provided for each cell 500, and the selection between the continuation of the local plane generation mode and the mode shift to the entire plane generation mode may be performed by determining whether the temperature of the local generation area K of each cell 500 is below a predetermined temperature (e.g., temperature T0 of the cooling liquid or another specific temperature).

In the above explanation, the second cooling liquid passage 36 is arranged at the center in the width direction of the cell 500. However, the position of the second cooling liquid passage 36 is not limited, that is, the position can be suitably defined based on the form of each reaction gas passage (for hydrogen or air in this embodiment) or the like.

In the local plane generation mode of this embodiment, each reaction gas may be supplied to the upper and lower reaction gas passages. Also in this case, power generation starts in the local generation are K by the heated cooling liquid, and the heat, generated by the self heating and the heated cooling liquid, gradually expands so that the entire plane generation starts according to the increase of the temperature of the entire generation plane.

Figure 36:
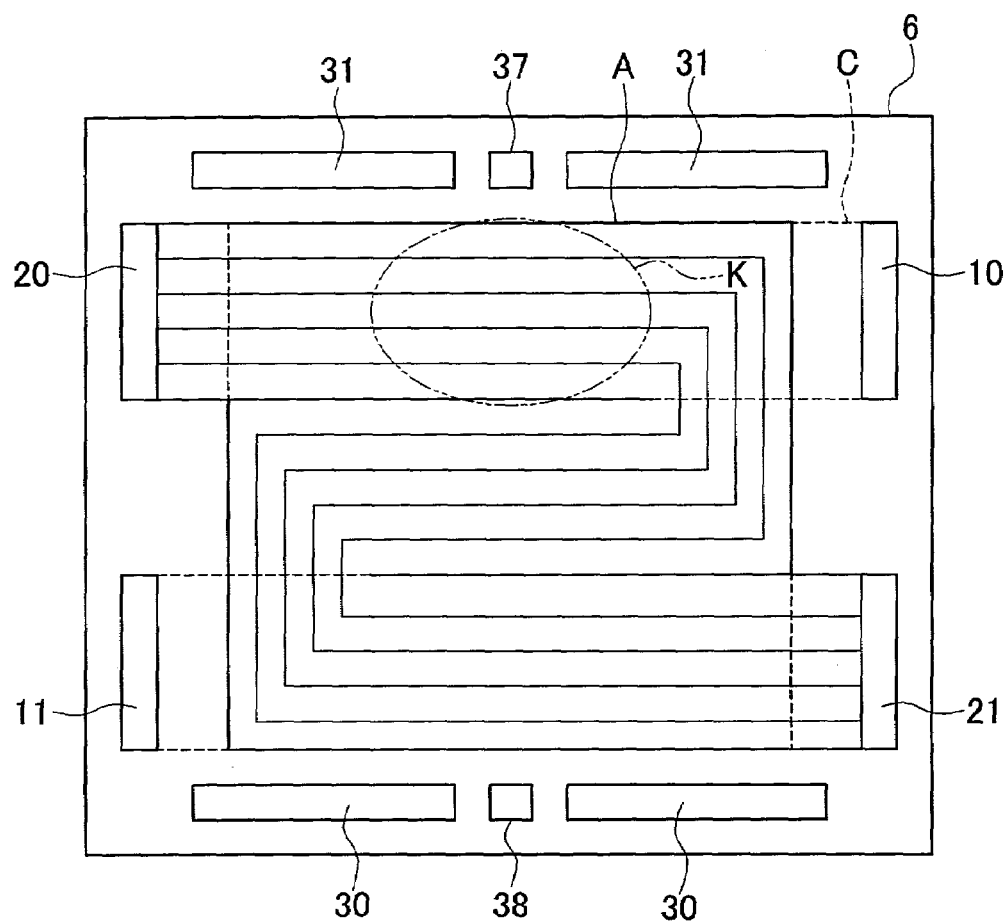
FIG. 36 is a rear view showing a separator at the anode in a variation of the thirteenth embodiment.

In addition, reaction gas passages A and C formed in a zigzag (refer to FIG. 22 in the eighth embodiment) may be employed also in this case (see FIG. 36). In this structure, each of the hydrogen gas and the air flows downward in a zigzag. Preferably, a labyrinth passage 36a is formed at the center in an area where the reaction gas passages A and C overlap in an upper horizontal section. Accordingly, a local generation area K enclosed by a chain double-dashed line in FIG. 36 can be defined. Also in this case, another arrangement of the local generation area K is possible by providing the labyrinth passage 36a at a different position. In either arrangement of the present embodiment, functions and effects which are similar to those of the above embodiments can be obtained.

Fourteenth Embodiment

The structure of the fourteenth embodiment will be explained with reference to FIGS. 37 and 38. The basic structure of the fuel cell 1 of this embodiment is the same as that of the previous (i.e., thirteenth) embodiment. The distinctive feature of the present embodiment in comparison with the previous embodiment is to have a cooling liquid circuit which is used in the local plane generation and is independent of the first cooling liquid circuit. Below, this distinctive feature will be explained in detail.

FIG. 37 is a plan view of the separator 6 at the anode, observed from the side where the cooling liquid passages R and R and the second cooling liquid passage 36 are formed. FIG. 37 also shows a cooling liquid circuit and a control system; thus, FIG. 37 corresponds to FIG. 32.

In the present embodiment, the cooling liquid inlet communication holes 30 and 30 are connected via a first cooling liquid (circulating) circuit 861 to the cooling liquid outlet communication holes 31 and 31. The first cooling liquid circuit 861 has a pump 863 (i.e., "P1" in FIG. 37) and a radiator 867. On the other hand, the cooling liquid inlet communication hole 38 is connected via a third cooling liquid circuit 862 to the cooling liquid outlet communication hole 37, and the third cooling liquid circuit 862 has a pump 864 (i.e., "P2" in FIG. 37). The first and third cooling liquid circuits 861 and 862 are independent of each other, and no cooling liquid communicates between the first and third cooling liquid circuits 861 and 862.

An electric heater 865 (i.e., heating device) for heating the cooling liquid flowing through the third cooling liquid circuit 862 is provided in the middle of the third cooling liquid circuit 862. In addition, a temperature sensor 866 for detecting the temperature of the cooling liquid flowing through the third cooling liquid circuit 862 is attached to the third cooling liquid circuit 862. The electric heater 865 and the temperature sensor 866 correspond to the electric heater 755 and the temperature sensor 756. In the present embodiment, the first and third cooling liquid circuits 861 and 862 are independent of each other, and each circuit has a pump (863 or 864). Therefore, the control valves V1 and V2 provided in the previous embodiment are not used in this embodiment. The other structural elements are the same as those in the previous embodiment.

In the entire plane generation mode of this embodiment, the electric heater 865 is switched off and the pumps 863 and 864 are driven so as to circulate the cooling liquid through the first and third cooling liquid circuits 861 and 862, so that the cooling liquid flows through the cooling liquid passages R and R, and the second cooling liquid passage 36, thereby cooling the entire generation plane.

In local plane generation mode of this embodiment, the electric heater 865 is switched on and only the pump 864 (among two pumps) is driven so as to circulate the cooling liquid through the third cooling liquid circuit 862. The other pump 863 is stopped so as not to circulate the cooling liquid through the first cooling liquid circuit 861. Accordingly, in the local plane generation mode, no cooling liquid flows through the cooling liquid passages R and R, and the cooling liquid heated by the electric heater 865 flows only through the second cooling liquid passage 36. Therefore, similar to the first embodiment, the vicinity of the labyrinth passage 36a can be concentratedly heated, thereby forming a local generation area K.

Therefore, functions and effects which are similar to those of the previous embodiment can also be obtained in the present embodiment. Additionally, according to the present structure having independent (i.e., first and third) cooling liquid circuits 861 and 862, the amount of the cooling liquid maintained in the local plane generation mode is less than that in the previous embodiment; thus, the cooling liquid supplied to the second cooling liquid passage 36 can be rapidly heated, thereby quickly executing the local power generation.

An example of the control for starting the fuel cell 1 in this embodiment will be explained with reference to the flowchart in FIG. 38.

Steps S401 to S405 in FIG. 38 are the same as steps S301 to S305 in the previous embodiment (see FIG. 35); thus, explanations thereof are omitted.

In the present embodiment, if the result of the determination in step S404 is "NO" and the entire plane generation mode is started in step S406, both pumps 863 and 864 are driven so that the cooling liquid is made to flow through the cooling liquid passages R and R, and the second cooling liquid passage 36. Simultaneously, the reaction gases are supplied to all the reaction gas passages (i.e., A1, A2, C1, and C2), thereby performing the entire plane generation using the entire generation plane of the fuel cell 1. In this process, the cooling liquid flowing through the first cooling liquid circuit 861 is cooled by the radiator 867. In addition, the electric heater 865 is switched off, so that the cooling liquid flowing through the third cooling liquid circuit 862 is not heated.

If the result of the determination in step S404 is "YES" and the local plane generation mode is started in step S407, hydrogen and air are supplied only to the reaction gas passages positioned in the upper half of the generation plane (i.e., A1 and C1), and the pump 863 is stopped so as not to make the cooling liquid flow through the cooling liquid passages R and R. Simultaneously, the pump 864 is driven so as to make the cooling liquid flow only through the second cooling liquid passage 36, and the electric heater 865 is switched on so as to heat the cooling liquid and to circulate the heated cooling liquid through the second cooling liquid passage 36. Accordingly, the local power generation in the local generation area K is performed. In this process, the output of the electric heater 865 is controlled by the ECU 35, so that the cooling liquid has a specific temperature (e.g., 70° C.) or below.

In step S408, temperature T0 of the cooling liquid, measured by the temperature sensor 866, and temperature Tj of the local generation area K in each unit module, measured by the temperature sensor 34, are stored in ECU 35, and the operation proceeds to step S409.

In step S409, it is determined whether the temperature Tj of the local generation area K of each unit module is lower than the temperature T0 of the cooling liquid. If the result of the determination is "YES" (i.e., Tj<T0), the operation returns to step S407, while if the result of the determination is "NO" (i.e., Tj≧T0), the operation proceeds to step S406, so that the operation mode is shifted to the entire plane generation mode. According to this mode shift, the electric heater 865 is switched off and the pumps 863 and 864 are driven.

Also in this embodiment, the form of each reaction gas passage is not limited, for example, the reaction gas passages may be formed in a zigzag (refer to FIG. 36).

What is claimed is:

1. A solid polymer electrolyte fuel cell stack including a plurality of cell units, each cell unit comprising:
   a membrane electrode assembly in which an anode and a cathode are provided on either side of a solid polymer electrolyte membrane;
   a pair of separators between which the membrane electrode assembly is placed, the membrane electrode assembly being supported by the separators;
   a first reaction gas passage defined by the membrane electrode assembly and first grooves that are formed in the pair of separators and extend along surfaces of the membrane electrode assembly; and
   a second reaction gas passage defined by the membrane electrode assembly and second grooves that are formed in the pair of separators and extend along surfaces of the membrane electrode assembly;
   wherein in a starting-mode a reaction gas is supplied through the first reaction gas passage so as to locally generate power thereby performing self-heating of the solid polymer electrolyte fuel cell stack; and
   in a normal-mode a reaction gas is supplied through the first reaction gas passage and the second reaction gas passage so as to normally generate power,
   wherein one of the starting-mode and the normal-mode is switchably selected.

2. A solid polymer electrolyte fuel cell as claimed in claim 1, wherein:
   one of the starting-mode and the normal-mode is switchably selected based on a temperature of a generation plane for outputting power from the membrane electrode assembly.

3. A solid polymer electrolyte fuel cell stack having a plurality of cell units, each cell unit comprising:
   a membrane electrode assembly in which an anode and a cathode are provided on either side of a solid polymer electrolyte membrane,
   a pair of separators between which the membrane electrode assembly is placed, the membrane electrode assembly being supported by the separators,
   a reaction gas passage formed at each side of the membrane electrode assembly, and
   a heating device connected to one of the pair of the separators while being housed in the fuel cell stack for locally heating only a portion of the fuel cell stack, the portion substantially extending alone the membrane electrode assembly, when the fuel cell stack operates, wherein the heating device is an electric heater.

4. A fuel cell system comprising:
   a solid polymer electrolyte fuel cell stack as claimed in claim 3; and
   a controller for controlling the heating device according to a temperature in the fuel cell.

5. A fuel cell system comprising:
   a solid polymer electrolyte fuel cell stack as claimed in claim 3; and
   a controller for controlling the heating device according to an output voltage of the fuel cell.

6. A fuel cell system comprising:
   a solid polymer electrolyte fuel cell stack as claimed in claim 3, including a plurality of the cells which are stacked; and
   a controller for controlling the heating device according to a temperature of each cell.

7. A fuel cell system comprising:
   a solid polymer electrolyte fuel cell stack as claimed in claim 3, including a plurality of the cells which are stacked; and
   a controller for controlling the heating device according to an output voltage of each cell.

8. A fuel cell system comprising:
   a solid polymer electrolyte fuel cell stack as claimed in claim 3; and
   a controller for controlling the heating device to generate a quantity of heat by which refreezing of generated water in the fuel cell is avoided.

* * * * *